(12) United States Patent
Giuliano

(10) Patent No.: US 11,316,424 B2
(45) Date of Patent: *Apr. 26, 2022

(54) DIES WITH SWITCHES FOR OPERATING A SWITCHED-CAPACITOR POWER CONVERTER

(71) Applicant: pSemi Corporation, San Diego, CA (US)

(72) Inventor: David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,060

(22) Filed: Jun. 28, 2019

(65) Prior Publication Data

US 2019/0393777 A1 Dec. 26, 2019

Related U.S. Application Data

(60) Division of application No. 15/590,562, filed on May 9, 2017, now Pat. No. 10,389,235, which is a
(Continued)

(51) Int. Cl.
*H02M 3/07* (2006.01)
*H02M 3/158* (2006.01)
(Continued)

(52) U.S. Cl.
CPC ............... *H02M 3/07* (2013.01); *H02M 1/42* (2013.01); *H02M 3/1582* (2013.01);
(Continued)

(58) Field of Classification Search
CPC ............... H02M 3/07; H02M 3/1582; H02M 2003/077; H02M 1/42; H02M 7/003; H02M 2001/007
See application file for complete search history.

(56) References Cited

U.S. PATENT DOCUMENTS 3,370,215 A 2/1968 Light
3,745,437 A 7/1973 Brown
(Continued)

FOREIGN PATENT DOCUMENTS

CN 1132959 10/1996
CN 101563845 10/2009
(Continued)

OTHER PUBLICATIONS

O. Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.
(Continued)

*Primary Examiner* — Kyle J Moody
*Assistant Examiner* — Jye-June Lee
(74) *Attorney, Agent, or Firm* — Berkeley Law & Technology Group, LLP

(57) ABSTRACT

An apparatus for power conversion includes a transformation stage for transforming a first voltage into a second voltage. The transformation stage includes a switching network, a filter, and a controller. The filter is configured to connect the transformation stage to a regulator. The controller controls the switching network.

21 Claims, 51 Drawing Sheets

Related U.S. Application Data continuation-in-part of application No. 15/138,692, filed on Apr. 26, 2016, now Pat. No. 9,712,051, which is a continuation of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 62/333,402, filed on May 9, 2016, provisional application No. 62/333,432, filed on May 9, 2016, provisional application No. 61/482,838, filed on May 5, 2011, provisional application No. 61/548,360, filed on Oct. 18, 2011, provisional application No. 61/577,271, filed on Dec. 19, 2011.

(51) Int. Cl.
*H02M 1/42* (2007.01)
*H02M 7/00* (2006.01)
*H02M 1/00* (2006.01)

(52) U.S. Cl.
CPC ...... *H02M 7/003* (2013.01); *H02M 2001/007* (2013.01); *H02M 2003/077* (2013.01)

(56) References Cited

U.S. PATENT DOCUMENTS

| | | |
|---|---|---|
| 3,818,306 A | 6/1974 | Marini |
| 3,818,360 A | 6/1974 | Boutmy |
| 4,214,174 A | 7/1980 | Dickson |
| 4,408,268 A | 10/1983 | Peters |
| 4,513,364 A | 4/1985 | Nilssen |
| 4,812,961 A | 3/1989 | Essaff et al. |
| 4,903,181 A | 2/1990 | Seidel |
| 5,006,782 A | 4/1991 | Pelly |
| 5,057,986 A | 10/1991 | Henze |
| 5,119,283 A | 6/1992 | Steigerwald |
| 5,132,606 A | 7/1992 | Herbert |
| 5,159,539 A | 10/1992 | Koyama |
| 5,198,970 A | 3/1993 | Kawabata |
| 5,268,832 A | 12/1993 | Kandatsu |
| 5,301,097 A | 4/1994 | McDaniel |
| 5,331,303 A | 7/1994 | Shiota |
| 5,345,376 A | 9/1994 | Nourbakhsh |
| 5,402,329 A | 3/1995 | Wittenbreder, Jr. |
| 5,548,206 A | 8/1996 | Soo |
| 5,557,193 A | 9/1996 | Kajimoto |
| 5,661,348 A | 8/1997 | Brown |
| 5,717,581 A | 2/1998 | Canclini |
| 5,737,201 A | 4/1998 | Meynard et al. |
| 5,761,058 A | 6/1998 | Kanda et al. |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel |
| 5,907,484 A | 5/1999 | Kowshik et al. |
| 5,956,243 A | 9/1999 | Mao |
| 5,959,565 A | 9/1999 | Taniuchi |
| 5,959,585 A | 9/1999 | Miltz |
| 5,978,283 A | 11/1999 | Hsu et al. |
| 5,982,645 A | 11/1999 | Levran |
| 6,107,864 A | 8/2000 | Fukushima et al. |
| 6,133,788 A | 10/2000 | Dent |
| 6,140,807 A | 10/2000 | Vannatta |
| 6,154,380 A | 11/2000 | Assow |
| 6,157,253 A | 12/2000 | Sigmon |
| 6,178,102 B1 | 1/2001 | Stanley |
| 6,198,645 B1 | 3/2001 | Kotowski |
| 6,255,906 B1 | 7/2001 | Eidson |
| 6,275,018 B1 | 8/2001 | Telefus |
| 6,327,462 B1 | 12/2001 | Loke |
| 6,339,538 B1 | 1/2002 | Handleman |
| 6,377,117 B2 | 4/2002 | Oskowsky |
| 6,396,341 B1 | 5/2002 | Pehlke |
| 6,400,579 B2 | 6/2002 | Cuk |
| 6,429,632 B1 | 8/2002 | Forbes |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,507,503 B2 | 1/2003 | Norrga |
| 6,515,612 B1 | 2/2003 | Abel |
| 6,563,235 B1 | 5/2003 | Mcintyre |
| 6,650,552 B2 | 11/2003 | Takagi et al. |
| 6,657,876 B2 | 12/2003 | Satoh |
| 6,700,803 B2 | 3/2004 | Krein |
| 6,738,277 B2 | 5/2004 | Odell |
| 6,738,432 B2 | 5/2004 | Pehlke |
| 6,759,766 B2 | 7/2004 | Hiratsuka et al. |
| 6,791,298 B2 | 9/2004 | Shenal |
| 6,798,177 B1 | 9/2004 | Liu |
| 6,927,441 B2 | 8/2005 | Pappalardo et al. |
| 6,934,167 B2 | 8/2005 | Jang |
| 6,980,181 B2 | 12/2005 | Sudo |
| 6,995,995 B2 | 2/2006 | Zeng |
| 7,071,660 B2 | 7/2006 | Ming |
| 7,072,195 B2 | 7/2006 | Xu |
| 7,091,778 B2 | 8/2006 | Gan |
| 7,103,114 B2 | 9/2006 | Lapierre |
| 7,135,847 B2 | 11/2006 | Taurand |
| 7,145,382 B2 | 12/2006 | Ker et al. |
| 7,157,956 B2 | 1/2007 | Wei |
| 7,161,816 B2 | 1/2007 | Shteynberg |
| 7,190,210 B2 | 3/2007 | Azrai et al. |
| 7,224,062 B2 | 5/2007 | Hsu |
| 7,236,542 B2 | 6/2007 | Matero |
| 7,239,194 B2 | 7/2007 | Azrai et al. |
| 7,250,810 B1 | 7/2007 | Tsen |
| 7,259,974 B2 | 8/2007 | Donaldson |
| 7,269,036 B2 | 9/2007 | Deng |
| 7,330,070 B2 | 2/2008 | Vaisanen |
| 7,362,251 B2 | 4/2008 | Jensen |
| 7,375,992 B2 | 5/2008 | Mok |
| 7,382,113 B2 | 6/2008 | Wai |
| 7,382,634 B2 | 6/2008 | Buchmann |
| 7,408,330 B2 | 8/2008 | Zhao |
| 7,443,705 B2 | 10/2008 | Ito |
| 7,511,978 B2 | 3/2009 | Chen et al. |
| 7,521,914 B2 | 4/2009 | Dickerson |
| 7,535,133 B2 | 5/2009 | Perreault |
| 7,589,605 B2 | 9/2009 | Perreault |
| 7,595,682 B2 | 9/2009 | Lin et al. |
| 7,616,467 B2 | 11/2009 | Mallwitz |
| 7,633,778 B2 | 12/2009 | Mok |
| 7,696,735 B2 | 4/2010 | Oraw |
| 7,705,681 B2 | 4/2010 | Ilkov |
| 7,724,551 B2 | 5/2010 | Yanagida et al. |
| 7,768,800 B2 | 8/2010 | Mazumduer |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,889,519 B2 | 2/2011 | Perreault |
| 7,907,429 B2 | 3/2011 | Ramadass |
| 7,907,430 B2 | 3/2011 | Kularatna et al. |
| 7,928,705 B2 | 4/2011 | Hooijschuur et al. |
| 7,940,038 B2 | 5/2011 | Silva |
| 7,956,572 B2 | 6/2011 | Zane |
| 7,977,921 B2 | 7/2011 | Bahai et al. |
| 7,999,601 B2 | 8/2011 | Schlueter et al. |
| 8,000,117 B2 | 8/2011 | Petricek |
| 8,018,216 B2 | 9/2011 | Kakehi |
| 8,026,763 B2 | 9/2011 | Dawson |
| 8,031,003 B2 | 10/2011 | Dishop |
| 8,040,174 B2 | 10/2011 | Likhterov |
| 8,048,766 B2 | 11/2011 | Joly et al. |
| 8,076,915 B2 | 12/2011 | Nakazawa |

(56) References Cited

U.S. PATENT DOCUMENTS

| | | |
|---|---|---|
| 8,085,524 B2 | 12/2011 | Roozeboom |
| 8,089,788 B2 | 1/2012 | Jain |
| 8,106,597 B2 | 1/2012 | Mednik et al. |
| 8,111,052 B2 | 2/2012 | Glovinsky |
| 8,111,054 B2 | 2/2012 | Yen et al. |
| 8,130,518 B2 | 3/2012 | Fishman |
| 8,159,091 B2 | 4/2012 | Yeates |
| 8,164,384 B2 | 4/2012 | Dawson |
| 8,169,797 B2 | 5/2012 | Coccia |
| 8,193,604 B2 | 6/2012 | Lin et al. |
| 8,212,541 B2 | 7/2012 | Perreault et al. |
| 8,276,002 B2 | 9/2012 | Dennard |
| 8,330,436 B2 | 12/2012 | Oraw et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,423,800 B2 | 4/2013 | Huang et al. |
| 8,451,053 B2 | 5/2013 | Nguyen |
| 8,456,874 B2 | 6/2013 | Singer et al. |
| 8,503,203 B1 | 8/2013 | Szczeszynski et al. |
| 8,542,169 B2 | 9/2013 | Senda |
| 8,582,333 B2 | 11/2013 | Oraw et al. |
| 8,629,666 B2 | 1/2014 | Carroll |
| 8,643,347 B2 | 2/2014 | Perreault |
| 8,659,353 B2 | 2/2014 | Dawson |
| 8,670,254 B2 | 3/2014 | Perreault |
| 8,699,248 B2 | 4/2014 | Perreault |
| 8,718,188 B2 | 5/2014 | Balteanu |
| 8,729,819 B2 | 5/2014 | Zhao |
| 8,824,978 B2 | 9/2014 | Briffa |
| 8,829,993 B2 | 9/2014 | Briffa |
| 8,830,709 B2 | 9/2014 | Perreault |
| 8,830,710 B2 | 9/2014 | Perreault |
| 8,854,019 B1 | 10/2014 | Levesque |
| 8,856,562 B2 | 10/2014 | Huang et al. |
| 8,860,396 B2 | 10/2014 | Giuliano |
| 8,957,727 B2 | 2/2015 | Dawson |
| 9,048,727 B2 | 6/2015 | Giuliano |
| 9,209,758 B2 | 12/2015 | Briffa |
| 9,362,826 B2 | 6/2016 | Giuliano |
| 9,450,506 B2 | 9/2016 | Perreault |
| 9,577,590 B2 | 2/2017 | Levesque |
| 9,634,577 B2 | 4/2017 | Perreault |
| 9,712,051 B2 | 7/2017 | Giuliano |
| 9,755,672 B2 | 9/2017 | Perreault |
| 9,882,471 B2 | 1/2018 | Giuliano |
| 10,326,358 B2 | 6/2019 | Giuliano |
| 10,381,924 B2 | 8/2019 | Giuliano |
| 10,389,235 B2 * | 8/2019 | Giuliano ............... H02M 3/07 |
| 10,404,162 B2 | 9/2019 | Giuliano |
| 10,541,611 B2 | 1/2020 | Giuliano |
| 10,680,515 B2 | 6/2020 | Giuliano |
| 10,917,007 B2 | 2/2021 | Giuliano |
| 10,938,300 B2 | 3/2021 | Giuliano |
| 2002/0158660 A1 | 10/2002 | Jang et al. |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2004/0222775 A1 | 11/2004 | Muramatsu |
| 2005/0007184 A1 | 1/2005 | Kamijo |
| 2005/0024125 A1 | 2/2005 | McNitt et al. |
| 2005/0088865 A1 | 4/2005 | Lopez |
| 2005/0207133 A1 | 9/2005 | Pavier et al. |
| 2005/0213267 A1 | 9/2005 | Azrai |
| 2005/0286278 A1 | 12/2005 | Perreault |
| 2006/0139021 A1 | 6/2006 | Taurand |
| 2006/0213890 A1 | 9/2006 | Kooken |
| 2006/0226130 A1 | 10/2006 | Kooken |
| 2007/0035977 A1 | 2/2007 | Odell |
| 2007/0051712 A1 | 3/2007 | Kooken |
| 2007/0066224 A1 | 3/2007 | D'Hont |
| 2007/0066250 A1 | 3/2007 | Takahashi |
| 2007/0069818 A1 | 3/2007 | Bhatti |
| 2007/0091655 A1 | 4/2007 | Oyama |
| 2007/0123184 A1 | 5/2007 | Nesimoglu |
| 2007/0146020 A1 | 6/2007 | Williams |
| 2007/0146090 A1 | 6/2007 | Carey |
| 2007/0159257 A1 | 7/2007 | Lee |
| 2007/0171680 A1 | 7/2007 | Perreault |
| 2007/0210774 A1 | 9/2007 | Kimura et al. |
| 2007/0230221 A1 | 10/2007 | Lim et al. |
| 2007/0247222 A1 | 10/2007 | Sorrells |
| 2007/0247253 A1 | 10/2007 | Carey |
| 2007/0281635 A1 | 12/2007 | McCallister |
| 2007/0290747 A1 | 12/2007 | Traylor |
| 2007/0291718 A1 | 12/2007 | Chan |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee |
| 2008/0012637 A1 | 1/2008 | Aridas |
| 2008/0013236 A1 | 1/2008 | Weng |
| 2008/0019459 A1 | 1/2008 | Chen |
| 2008/0031023 A1 | 2/2008 | Kitagawa |
| 2008/0055946 A1 | 3/2008 | Lesso |
| 2008/0062724 A1 | 3/2008 | Feng |
| 2008/0136500 A1 * | 6/2008 | Frulio .................... H02M 3/07 327/536 |
| 2008/0136991 A1 | 6/2008 | Senda |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0239772 A1 * | 10/2008 | Oraw .................... H02M 3/07 363/60 |
| 2009/0033293 A1 | 2/2009 | Xing |
| 2009/0059630 A1 | 3/2009 | Williams |
| 2009/0072800 A1 | 3/2009 | Ramadass |
| 2009/0102439 A1 | 4/2009 | Williams |
| 2009/0147554 A1 | 6/2009 | Adest |
| 2009/0196082 A1 | 8/2009 | Mazumder |
| 2009/0257211 A1 | 10/2009 | Kontani et al. |
| 2009/0273955 A1 | 11/2009 | Tseng |
| 2009/0278520 A1 | 11/2009 | Perreault |
| 2009/0302686 A1 | 12/2009 | Fishman |
| 2009/0303753 A1 | 12/2009 | Fu |
| 2009/0322304 A1 | 12/2009 | Oraw |
| 2009/0323380 A1 | 12/2009 | Harrison |
| 2010/0073084 A1 | 3/2010 | Hur |
| 2010/0085786 A1 | 4/2010 | Chiu |
| 2010/0110741 A1 | 5/2010 | Lin et al. |
| 2010/0117612 A1 | 5/2010 | Klootwijk |
| 2010/0140736 A1 | 6/2010 | Lin et al. |
| 2010/0142239 A1 | 6/2010 | Hopper |
| 2010/0201441 A1 | 8/2010 | Gustavsson |
| 2010/0202161 A1 | 8/2010 | Sims et al. |
| 2010/0214746 A1 | 8/2010 | Lotfi et al. |
| 2010/0244189 A1 | 9/2010 | Klootwijk |
| 2010/0244585 A1 | 9/2010 | Tan et al. |
| 2010/0291888 A1 | 11/2010 | Hadjichristos |
| 2010/0308751 A1 | 12/2010 | Nerone |
| 2011/0001542 A1 | 1/2011 | Ranta |
| 2011/0089483 A1 | 4/2011 | Reynes |
| 2011/0101884 A1 | 5/2011 | Kim |
| 2011/0148518 A1 | 6/2011 | Lejon |
| 2011/0163414 A1 | 7/2011 | Lin et al. |
| 2011/0175591 A1 * | 7/2011 | Cuk ...................... H02M 3/07 323/311 |
| 2011/0181128 A1 | 7/2011 | Perreault |
| 2012/0043818 A1 | 2/2012 | Stratakos |
| 2012/0064953 A1 | 3/2012 | Dagher |
| 2012/0146177 A1 | 6/2012 | Choi et al. |
| 2012/0153907 A1 | 6/2012 | Carobolante |
| 2012/0170334 A1 | 7/2012 | Menegoli |
| 2012/0176195 A1 | 7/2012 | Dawson |
| 2012/0243267 A1 | 9/2012 | Kassayan |
| 2012/0249096 A1 | 10/2012 | Enenkel |
| 2012/0252382 A1 | 10/2012 | Bashir |
| 2012/0313602 A1 | 12/2012 | Perreault et al. |
| 2012/0326684 A1 | 12/2012 | Perreault et al. |
| 2013/0005286 A1 | 1/2013 | Chan |
| 2013/0049714 A1 | 2/2013 | Chiu |

(56) References Cited

U.S. PATENT DOCUMENTS

| | | |
|---|---|---|
| 2013/0049885 A1 | 2/2013 | Rozman |
| 2013/0058049 A1 | 3/2013 | Roth |
| 2013/0058141 A1 | 3/2013 | Oraw et al. |
| 2013/0094157 A1 | 4/2013 | Giuliano |
| 2013/0106380 A1 | 5/2013 | Marsili |
| 2013/0154600 A1 | 6/2013 | Giuliano |
| 2013/0181521 A1 | 7/2013 | Khlat |
| 2013/0187612 A1 | 7/2013 | Aiura |
| 2013/0229841 A1 | 9/2013 | Giuliano |
| 2013/0241625 A1 | 9/2013 | Perreault |
| 2013/0343106 A1 | 12/2013 | Perreault |
| 2013/0343107 A1 | 12/2013 | Perreault |
| 2014/0015731 A1 | 1/2014 | Khlat |
| 2014/0118065 A1 | 5/2014 | Briffa |
| 2014/0118072 A1 | 5/2014 | Briffa |
| 2014/0120854 A1 | 5/2014 | Briffa |
| 2014/0159681 A1 | 6/2014 | Oraw et al. |
| 2014/0167513 A1 | 6/2014 | Chang |
| 2014/0225581 A1 | 8/2014 | Giuliano |
| 2014/0226378 A1 | 8/2014 | Perreault |
| 2014/0306648 A1 | 10/2014 | Le |
| 2014/0306673 A1 | 10/2014 | Le |
| 2014/0313781 A1 | 10/2014 | Perreault |
| 2014/0335805 A1 | 11/2014 | Briffa |
| 2014/0339918 A1 | 11/2014 | Perreault |
| 2014/0355322 A1 | 12/2014 | Perreault |
| 2015/0022173 A1 | 1/2015 | Le |
| 2015/0023063 A1 | 1/2015 | Perreault |
| 2015/0084701 A1 | 3/2015 | Perreault |
| 2015/0097538 A1 | 4/2015 | Le |
| 2015/0102798 A1 | 4/2015 | Giuliano |
| 2015/0155895 A1 | 6/2015 | Perreault |
| 2015/0280553 A1 | 10/2015 | Giuliano |
| 2015/0295497 A1 | 10/2015 | Perreault |
| 2015/0357912 A1 | 12/2015 | Perreault |
| 2015/0364991 A1 | 12/2015 | Chung |
| 2016/0093948 A1 | 3/2016 | Lehtola |
| 2016/0094126 A1 | 3/2016 | Liu |
| 2016/0111356 A1 | 4/2016 | Cho |
| 2016/0197552 A1 | 7/2016 | Giuliano |
| 2016/0254754 A1 | 9/2016 | Perreault |
| 2016/0322894 A1 | 11/2016 | Giuliano |
| 2017/0237351 A1 | 8/2017 | Giuliano |
| 2017/0244318 A1 | 8/2017 | Giuliano |
| 2017/0279374 A1 | 9/2017 | Friebe |
| 2017/0300078 A1 | 10/2017 | Puggelli |
| 2017/0302093 A1 | 10/2017 | Peterson |
| 2018/0034363 A1 | 2/2018 | Giuliano |
| 2018/0145587 A1 | 5/2018 | Giuliano |
| 2018/0205315 A1 | 7/2018 | Giuliano |
| 2019/0027468 A1 | 1/2019 | Giuliano |
| 2019/0028018 A1 | 1/2019 | Datta |
| 2019/0115830 A1 | 4/2019 | Giuliano |
| 2019/0207513 A1 | 7/2019 | Ramadass |
| 2019/0393777 A1 | 12/2019 | Giuliano |
| 2020/0021187 A1 | 1/2020 | Chang |
| 2020/0036286 A1 | 1/2020 | Giuliano |
| 2020/0083805 A1 | 3/2020 | Mauri |
| 2020/0112247 A1 | 4/2020 | Giuliano |
| 2020/0127557 A1 | 4/2020 | Giuliano |
| 2020/0136494 A1 | 4/2020 | Kazama |
| 2020/0195136 A1 | 6/2020 | Huang |
| 2020/0204172 A1 | 6/2020 | Geng |
| 2020/0246626 A1 | 8/2020 | Labbe |
| 2020/0253520 A1 | 8/2020 | Wang |
| 2021/0013798 A1 | 1/2021 | Giuliano |

FOREIGN PATENT DOCUMENTS

| | | |
|---|---|---|
| CN | 101636702 | 1/2010 |
| CN | 101647182 | 2/2010 |
| CN | 101662208 | 3/2010 |
| CN | 101976953 | 2/2011 |
| CN | 102055328 | 5/2011 |
| CN | 102769986 | 11/2012 |
| CN | 103650313 | 3/2014 |
| CN | 103650314 | 3/2014 |
| CN | 103975433 | 8/2014 |
| CN | 104011985 | 8/2014 |
| CN | 105229909 | 1/2016 |
| CN | 107580748 | 1/2018 |
| CN | 108964442 | 12/2018 |
| CN | 109219919 | 1/2019 |
| CN | 109478845 | 3/2019 |
| CN | 112838760 | 5/2021 |
| DE | 10358299 | 7/2005 |
| DE | 112016001188 | 3/2018 |
| DE | 112017002374 | 1/2019 |
| EP | 0513920 | 11/1992 |
| EP | 1199788 | 4/2002 |
| EP | 1750366 | 2/2007 |
| EP | 2705597 | 8/2018 |
| EP | 3425784 | 1/2019 |
| FR | 2852748 | 9/2004 |
| GB | 2505371 | 2/2014 |
| JP | 10327573 | 12/1998 |
| JP | 11235053 | 8/1999 |
| JP | 2000134095 | 5/2000 |
| JP | 2002062858 | 2/2002 |
| JP | 2002-233139 | 8/2002 |
| JP | 2010045943 | 2/2010 |
| JP | 2018508178 | 3/2018 |
| KR | 20110053681 | 5/2011 |
| KR | 20140015528 | 2/2014 |
| KR | 20150085072 | 7/2015 |
| KR | 101556838 | 10/2015 |
| KR | 20180004116 | 1/2018 |
| KR | 20180118234 | 10/2018 |
| TW | 201644164 | 12/2016 |
| WO | 2006093600 | 9/2006 |
| WO | WO2007136919 | 11/2007 |
| WO | 2009112900 | 9/2009 |
| WO | WO2012151466 | 11/2012 |
| WO | 2013059446 | 4/2013 |
| WO | 2013096416 | 6/2013 |
| WO | WO2013086445 | 6/2013 |
| WO | WO2014070998 | 5/2014 |
| WO | 2014/154390 | 10/2014 |
| WO | 2014/169186 | 10/2014 |
| WO | WO2014168911 | 10/2014 |
| WO | WO2014169186 | 10/2014 |
| WO | WO2016149105 | 9/2016 |
| WO | WO2017196826 | 11/2017 |

OTHER PUBLICATIONS

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Axelrod et al. "Single-switch single-stage switched-capacitor buck converter", *Proc. of NORPIE 2004, 4th Nordic Workshop on Power and Industrial Electronics*, Jun. 2004.

Sun et al. "High Power Density, High Efficiency System Two-Stage Power Architecture for Laptop Computers", *Power Electronics Specialists Conference*, pp. 1-7, Jun. 2006.

R. D. Middlebrook, "Transformerless DC-to-DC Converters with Large Conversion Ratios" *IEEE Transactions on Power Electronics*, vol. 3, No. 4, pp. 484-488, Oct. 1988.

Wood et al, "Design, Fabrication and Initial Results of a 2g Autonomous Glider" *IEEE Industrial Electronics Society*, pp. 1870-1877, Nov. 2005.

T. A. Meynard, H. Foch, "Multi-Level Conversion: High Voltage Choppers and Voltage-Source Inverters," *IEEE Power Electronics Specialists Conference*, pp. 397-403, 1992.

Pilawa-Podgurski et al. "Merged Two-Stage Power Converter Architecture with Soft Charging Switched-Capacitor Energy Transfer" *39th IEEE Power Electronics Specialists Conference*, 2008.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

(56) References Cited

OTHER PUBLICATIONS

Lei et al. "Analysis of Switched-capacitor DC-DC Converters in Soft-charging Operation" *14th IEEE Workshop on Control and Modeling for Power Electronics*, pp. 1-7, Jun. 23, 2013.
Ng et al. "Switched Capacitor DC-DC Converter: Superior where the Buck Converter has Dominated" *PhD Thesis, UC Berkeley*, Aug. 17, 2011.
R. Pilawa-Podgurski and D. Perreault, "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.
Ottman et al, "Optimized Piezoelectric Energy Harvesting Circuit using Step-Down Converter in Discontinuous Conduction Mode", IEEE Power Electronics Specialists Conference, pp. 1988-1994, 2002.
Ma et al, "Design and Optimization of Dynamic Power System for Self-Powered Integrated Wireless Sensing Nodes" ACM ISLPED '05 conference (published at pp. 303-306 of the proceedings).
Xu et al., "Voltage Divider and its Application in Two-stage Power Architecture," IEEE Twenty-First Annual IEEE Applied Power Electronics Conference and Exposition, pp. 499-504, Mar. 2006.
Markowski, "Performance Limits of Switched-Capacitor DC-DC Converters", IEEE PESC'95 Conference, 1995.
Texas Instruments data sheet for part TPS54310, "3-V to 6-V input, 3-A output synchronous-buck PWM switcher with integrated FETs", dated 2002-2005.
Linear Technology data sheet for part LTC3402, "2A, 3MHz Micropower Synchronous Boost Converter", 2000.
Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.
Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.
Giuliano—"Architectures and Topologies for Power Delivery", Biannual Review of MIT Center for Integrated Circuits; Power Point Presentation, May 9, 2007, 17 slides.
Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages.
U.S. Appl. No. 13/771,904 / U.S. Patent Application filed Feb. 20, 2013, 62 pages.
U.S. Appl. No. 13/771,904 / Filing Receipt and Notice to File Corrected Application Papers dated Mar. 20, 2013, 6 pages.
U.S. Appl. No. 13/771,904 / Response to Notice to File Corrected Application Papers filed May 20, 2013, 30 pages.
U.S. Appl. No. 13/771,904 / Updated Filing Receipt and Informational Notice dated May 28, 2013, 4 pages.
U.S. Appl. No. 13/771,904 / Notice of Publication dated Sep. 5, 2013, 1 page.
U.S. Appl. No. 13/771,904 / Nonfinal Office Action dated Sep. 13, 2013, 12 pages.
U.S. Appl. No. 13/771,904 / Amendment filed Mar. 13, 2014, 11 pages.
U.S. Appl. No. 13/771,904 / Final Office Action dated Apr. 8, 2014, 16 pages.
U.S. Appl. No. 13/771,904 / Amendment filed May 23, 2014, 11 pages.
U.S. Appl. No. 13/771,904 / Notice of Allowance dated Jun. 9, 2014, 12 pages.
U.S. Appl. No. 13/771,904 / Issue Fee Payment and 312 Amendment filed Aug. 29, 2014, 14 pages.
U.S. Appl. No. 13/771,904/ Examiner Response to 312 Amendment dated Sep. 11, 2014, 3 pages.
U.S. Appl. No. 13/771,904 / Issue Notification dated Sep. 24, 2014, 1 page.
U.S. Appl. No. 14/513,747 / U.S. Patent Application filed Oct. 14, 2014, 76 pages.
U.S. Appl. No. 14/513,747 / Filing Receipt and Notice to File Corrected Application Papers dated Oct. 22, 2014, 5 pages.
U.S. Appl. No. 14/513,747 / Response to Notice to File Corrected Application Papers with Amendment dated Dec. 22, 2014, 47 pages.
U.S. Appl. No. 14/513,747 / Updated Filing Receipt dated Jan. 5, 2015, 3 pages.
U.S. Appl. No. 14/513,747 / Notice of Publication dated Apr. 16, 2015, 1 page.
U.S. Appl. No. 14/513,747 / Petition to Make Special Under Patent Prosecution Highway dated Apr. 22, 2015, 4 pages.
U.S. Appl. No. 14/513,747 / Decision Granting Petition to Make Special Under Patent Prosecution Highway dated Apr. 22, 2015, 5 pages.
U.S. Appl. No. 14/513,747 / Non-final Office Action dated Jun. 17, 2015, 19 pages.
U.S. Appl. No. 14/513,747 / Amendment filed Sep. 17, 2015, 13 pages.
U.S. Appl. No. 14/513,747 / Final Office Action dated Oct. 14, 2015, 17 pages.
U.S. Appl. No. 14/513,747/ Amendment filed Jan. 14, 2016, 12 pages.
U.S. Appl. No. 14/513,747/ Notice of Allowance dated Jan. 26, 2016, 12 pages.
U.S. Appl. No. 14/513,747 / Issue Fee Payment filed Apr. 26, 2016, 1 page.
U.S. Appl. No. 14/513,747/ Issue Notification dated May 10, 2016, 1 page.
U.S. Appl. No. 15/138,692 / U.S. Patent Application filed Apr. 26, 2016, 60 pages.
U.S. Appl. No. 15/138,692 / Filing Receipt and Notice to File Missing Parts dated May 13, 2016, 6 pages.
U.S. Appl. No. 15/138,692 / Response to Notice to File Missing Parts and Amendment dated Jul. 13, 2016, 14 pages.
U.S. Appl. No. 15/138,692 / Updated Filing Receipt dated Jul. 13, 2016, 4 pages.
U.S. Appl. No. 15/138,692/ Notice of Publication dated Nov. 3, 2016, 1 page.
U.S. Appl. No. 15/138,692 / Notice of Allowance and Allowability dated Mar. 10, 2017, 24 pages.
U.S. Appl. No. 15/138,692/ Supplemental Notice of Allowability dated Apr. 11, 2017, 5 pages.
U.S. Appl. No. 15/138,692 / Issue Fee Payment and 312 Amendment filed Jun. 9, 2017, 10 pages.
U.S. Appl. No. 15/138,692 / Examiner Response to 312 Amendment and Corrected Filing Receipt dated Jun. 21, 2017, 6 pages.
U.S. Appl. No. 15/138,692 / Issue Notification dated Jun. 28, 2017, 1 page.
U.S. Appl. No. 15/618,481 / U.S. Patent Application filed Jun. 9, 2017, 63 pages.
U.S. Appl. No. 15/618,481 / Filing Receipt and Notice to File Missing Parts dated Jun. 20, 2017, 6 pages.
U.S. Appl. No. 15/618,481 / Response to Notice to File Missing Parts and Preliminary Amendment filed Oct. 20, 2017, 21 pages.
U.S. Appl. No. 15/618,481 / Request to Update Name of Applicant filed Oct. 24, 2017, 11 pages.
U.S. Appl. No. 15/618,481 / Updated Filing Receipt dated Oct. 24, 2017, 5 pages.
U.S. Appl. No. 15/618,481 / Corrected Filing Receipt and Acceptance of Power of Attorney dated Oct. 26, 2017, 5 pages.
U.S. Appl. No. 15/618,481 / Notice of Publication dated Feb. 1, 2018, 1 page.
U.S. Appl. No. 15/618,481 / Request to Update Name of Applicant filed Feb. 23, 2018, 12 pages.

(56) References Cited

OTHER PUBLICATIONS

U.S. Appl. No. 15/618,481 / Corrected Filing Receipt dated May 14, 2018, 4 pages.
U.S. Appl. No. 15/618,481 / Notice of Allowance and Allowability dated Feb. 6, 2019, 27 pages.
U.S. Appl. No. 15/618,481 / Issue Fee Payment dated May 3, 2019, 6 pages.
U.S. Appl. No. 15/618,481 / Issue Notification dated May 29, 2019, 1 page.
U.S. Appl. No. 16/444,428 / U.S. Patent Application filed Jun. 18, 2019, 59 pages.
U.S. Appl. No. 16/444,428 / Filing Receipt and Notice to File Missing Parts dated Jun. 26, 2019, 7 pages.
U.S. Appl. No. 16/444,428 / Response to Notice to File Missing Parts dated Dec. 26, 2019, 15 pages.
U.S. Appl. No. 16/444,428 / Updated Filing dated Dec. 30, 2019, 6 pages.
U.S. Appl. No. 16/444,428 / Notice of Publication dated Apr. 9, 2020, 1 page.
U.S. Appl. No. 16/444,428 / Preliminary Amendment dated May 8, 2020, 13 pages.
U.S. Appl. No. 16/444,428 / Supplemental Amendment dated Jul. 29, 2020, 13 pages.
U.S. Appl. No. 16/444,428 / Notice of Allowance and Allowability dated Aug. 24, 2020, 33 pages.
U.S. Appl. No. 16/444,428 / Request for Continued Examination filed Sep. 8, 2020, 14 pages.
U.S. Appl. No. 16/444,428 / Notice of Allowance and Allowability dated Sep. 16, 2020, 33 pages.
U.S. Appl. No. 16/444,428 / Notice of Allowance and Allowability dated Oct. 30, 2020, 36 pages.
U.S. Appl. No. 16/444,428 / Request for Continued Examination and Amendment filed Nov. 23, 2020, 13 pages.
U.S. Appl. No. 16/444,428 / Notice of Allowance and Allowability dated Dec. 7, 2020, 10 pages.
U.S. Appl. No. 16/444,428 / Corrected Notice Allowability dated Dec. 28, 2020, 11 pages.
U.S. Appl. No. 16/444,428 / Issue Fee Payment and After Final Response filed Dec. 30, 2020, 6 pages.
U.S. Appl. No. 16/444,428 / Issue Notification dated Jan. 20, 2021, 1 page.
U.S. Appl. No. 16/919,033 / U.S. Patent Application filed Jul. 1, 2020, 73 pages.
U.S. Appl. No. 16/919,033 / Amended Application Data Sheet filed Jul. 2, 2020, 7 page.
U.S. Appl. No. 16/919,033 / Filing Receipt and Notice of Missing Parts dated Jul. 15, 2020, 12 pages.
U.S. Appl. No. 16/919,033 / Petition for Express Abandonment filed Sep. 8, 2020, 4 pages.
U.S. Appl. No. 16/919,033 / Decision Granting Petition for Express Abandonment dated Oct. 16, 2020, 2 pages.
U.S. Appl. No. 16/931,768 / U.S. Patent Application filed Jul. 17, 2020, 73 pages.
U.S. Appl. No. 16/931,768 / Filing Receipt dated Jul. 29, 2020, 6 pages.
U.S. Appl. No. 16/931,768 / Acceptance of Track One dated Jul. 30, 2020, 2 pages.
U.S. Appl. No. 16/931,768 / Notice of Allowance and Allowability dated Aug. 25, 2020, 26 pages.
U.S. Appl. No. 16/931,768 / Corrected Notice of Allowability dated Sep. 14, 2020, 7 pages.
U.S. Appl. No. 16/931,768 / Corrected Notice of Allowability dated Oct. 15, 2020, 11 pages.
U.S. Appl. No. 16/931,768 / Notice of Publication dated Nov. 5, 2020, 1 page.
U.S. Appl. No. 16/931,768 / Request for Continued Examination filed Nov. 5, 2020, 14 pages.
U.S. Appl. No. 16/931,768 / Notice of Allowance and Notice of Allowability dated Dec. 3, 2020, 26 pages.
U.S. Appl. No. 16/931,768 / Issue Fee Payment and 312 Response filed Dec. 30, 2020, 13 pages.
U.S. Appl. No. 16/931,768 / Issue Notification dated Feb. 10, 2021, 13 pages.
U.S. Appl. No. 17/187,664, filed Feb. 26, 2021 / U.S. Appl. No. 17/187,664, filed Feb. 26, 2021, 56 pages.
U.S. Appl. No. 17/187,664 / Filing Receipt and Notice to File Missing Parts dated Mar. 10, 2021, 7 pages.
U.S. Appl. No. 15/068,985 / Patent Application filed Mar. 14, 2016, 90 pages.
U.S. Appl. No. 15/068,985 / Filing Receipt and Informational Notice dated Mar. 29, 2016, 5 pages.
U.S. Appl. No. 15/068,985 / Request for Corrected filed Apr. 29, 2016, 8 pages.
U.S. Appl. No. 15/068,985 / Preliminary Amendment filed Apr. 29, 2016, 3 pages.
U.S. Appl. No. 15/068,985 / Corrected Filing Receipt dated May 9, 2016, 3 pages.
U.S. Appl. No. 15/068,985 / Request for Corrected Filing Receipt dated May 31, 2016, 1 page.
U.S. Appl. No. 15/068,985 / Corrected Filing Receipt dated Jun. 8, 2016, 4 pages.
U.S. Appl. No. 15/068,985 / Notice of Publication dated Jul. 7, 2016, 1 page.
U.S. Appl. No. 15/068,985 / Non-final Office Action dated Mar. 7, 2017, 20 pages.
U.S. Appl. No. 15/068,985 / Response to Non-final Office Action filed Jul. 7, 2017, 20 pages.
U.S. Appl. No. 15/068,985 / Notice of Allowance dated Aug. 11, 2017, 17 pages.
U.S. Appl. No. 15/068,985 / Issue Fee Payment and 312 Amendment filed Nov. 9, 2017, 16 pages.
U.S. Appl. No. 15/068,985 / Request to Expedite Petition to Correct Priority filed Nov. 14, 2017, 5 pages.
U.S. Appl. No. 15/068,985 / Order Granting Petition to Correct Priority and Corrected Filing Receipt dated Nov. 28, 2017, 6 pages.
U.S. Appl. No. 15/068,985 / Issue Notification dated Jan. 10, 2018, 1 page.
U.S. Appl. No. 15/813,546 / Application as filed Nov. 15, 2017, 77 pages.
U.S. Appl. No. 15/813,546 / Filing Receipt and Notice to File Missing Parts dated Dec. 13, 2017, 7 pages.
U.S. Appl. No. 15/813,546 / Response to Notice to File Missing Parts and Preliminary Amendment filed Feb. 12, 2018, 12 pages.
U.S. Appl. No. 15/813,546 / Updated Filing Receipt dated Feb. 15, 2018, 5 pages.
U.S. Appl. No. 15/813,546 / Amended Application Data Sheet filed Feb. 28, 2018, 12 pages.
U.S. Appl. No. 15/813,546 / Notice of Publication dated May 24, 2018, 1 page.
U.S. Appl. No. 15/813,546 / Non-final Office Action dated Jun. 1, 2018, 17 pages.
U.S. Appl. No. 15/813,546 / Amendment and Terminal Disclaimer filed Aug. 30, 2018, 15 pages.
U.S. Appl. No. 15/813,546 / Request to Change Applicant Name filed Sep. 5, 2018, 13 pages.
U.S. Appl. No. 15/813,546 / Updated Filing Receipt dated Jan. 9, 2019, 4 pages.
U.S. Appl. No. 15/813,546 / Final Rejection dated Mar. 11, 2019, 10 pages.
U.S. Appl. No. 15/813,546 / Response to Final Rejection and Terminal Disclaimer dated Mar. 20, 2019, 10 pages.
U.S. Appl. No. 15/813,546 / Approval Terminal Disclaimer dated Mar. 22, 2019, 1 page.
U.S. Appl. No. 15/813,546 / Notice of Allowance and Allowability dated Apr. 3, 2019, 16 pages.
U.S. Appl. No. 15/813,546 / Supplemental Notice of Allowability dated Jun. 25, 2019, 3 pages.
U.S. Appl. No. 15/813,546 / Issue Fee Payment and 312 Amendment dated Jul. 3, 2019, 15 pages.
U.S. Appl. No. 15/813,546 / Response to 312 Amendment dated Aug. 6, 2019, 3 pages.

(56) References Cited

OTHER PUBLICATIONS

U.S. Appl. No. 15/813,546 / Issue Notification dated Aug. 14, 2019, 1 page.
U.S. Appl. No. 16/534,196 / Patent Application filed Aug. 7, 2019, 81 pages.
U.S. Appl. No. 16/534,196 / Filing Receipt and Notice to File Missing Parts dated Aug. 21, 2019, 7 pages.
U.S. Appl. No. 16/534,196 / Response to Notice to File Missing Parts dated Jan. 14, 2020, 12 pages.
U.S. Appl. No. 16/534,196 / Updated Filing Receipt dated Jan. 14, 2020, 5 pages.
U.S. Appl. No. 16/534,196 / Updated Filing Receipt dated Jan. 27, 2020, 4 pages.
U.S. Appl. No. 16/534,196 / Non-final Office Action dated Jan. 27, 2020, 14 pages.
U.S. Appl. No. 16/534,196 / Notice of Publication dated Apr. 23, 2020, 1 page.
U.S. Appl. No. 16/534,196 / Amendment filed Jul. 30, 2020, 15 pages.
U.S. Appl. No. 16/534,196 / Final Office Action dated Oct. 28, 2020, 10 pages.
U.S. Appl. No. 16/534,196 / Office Action dated Jan. 29, 2021, 10 pages.
U.S. Appl. No. 16/085,680 / Patent Application filed Sep. 17, 2018, 391 pages.
U.S. Appl. No. 16/085,680 / Filing Receipt dated Jan. 9, 2019, 7 pages.
U.S. Appl. No. 16/085,680 / Notice of Allowance and Allowability dated Mar. 8, 2019, 17 pages.
U.S. Appl. No. 16/085,680 / Notice of Publication dated Apr. 18, 2019, 1 page.
U.S. Appl. No. 16/085,680 / Replacement Figures filed Apr. 23, 2019, 8 pages.
U.S. Appl. No. 16/085,680 / Examiner Interview Summary dated May 14, 2019, 5 pages.
U.S. Appl. No. 16/085,680 / Examiner Interview Summary dated May 16, 2019, 5 pages.
U.S. Appl. No. 16/085,680 / Supplemental Notice of Allowability dated May 24, 2019, 20 pages.
U.S. Appl. No. 16/085,680 / Issue Fee Payment filed Jun. 10, 2019, 7 pages.
U.S. Appl. No. 16/085,680 / Issue Notification dated Jul. 24, 2019, 1 page.
U.S. Appl. No. 16/538,068 / Patent Application filed Aug. 12, 2019, 105 pages.
U.S. Appl. No. 16/538,068 / Filing Receipt and Notice to File Missing Parts dated Aug. 23, 2019, 7 pages.
U.S. Appl. No. 16/538,068 / Response to Notice to File Missing Parts dated Oct. 23, 2019, 6 pages.
U.S. Appl. No. 16/538,068 / Updated Filing Receipt dated Oct. 25, 2019, 5 pages.
U.S. Appl. No. 16/538,068 / Notice of Allowance and Allowability dated Jan. 29, 2020, 33 pages.
U.S. Appl. No. 16/538,068 / Notice of Publication dated Jan. 30, 2020, 1 pages.
U.S. Appl. No. 16/538,068 / Issue Fee Payment filed Apr. 29, 2020, 8 pages.
U.S. Appl. No. 16/538,068 / Issue Notification dated May 20, 2020, 1 page.
U.S. Appl. No. 16/862,351 / Patent Application filed Apr. 29, 2020, 98 pages.
U.S. Appl. No. 16/862,351 / Filing Receipt and Notice to File Missing Parts dated May 6, 2020, 9 pages.
U.S. Appl. No. 16/862,351 / Response to Missing Parts and Preliminary Amendment filed Oct. 6, 2020, 18 pages.
U.S. Appl. No. 16/862,351 / Notice of Publication dated Jan. 14, 2021, 1 page.
U.S. Appl. No. 15/590,562 / Patent Application filed May 9, 2017, 130 pages.
U.S. Appl. No. 15/590,562 / Filing Receipt and Informational Notice dated May 9, 2017, 7 pages.
U.S. Appl. No. 15/590,562 / Notice of Publication dated Aug. 24, 2017, 1 page.
U.S. Appl. No. 15/590,562 / Restriction Requirement dated Aug. 24, 2017, 7 pages.
U.S. Appl. No. 15/590,562 / Response to Restriction Requirement and Preliminary Amendment filed Mar. 12, 2018, 15 pages.
U.S. Appl. No. 15/590,562 / Non-final Office Action dated Sep. 20, 2018, 32 pages.
U.S. Appl. No. 15/590,562 / Amendment filed Dec. 18, 2018, 26 pages.
U.S. Appl. No. 15/590,562 / Applicant Summary of Interview with Examiner dated Mar. 22, 2019, 8 pages.
U.S. Appl. No. 15/590,562 / Notice of Allowance and Allowability dated Apr. 5, 2019, 19 pages.
U.S. Appl. No. 15/590,562 / Request to Change Applicant Name filed May 24, 2019, 13 pages.
U.S. Appl. No. 15/590,562 / Updated Filing Receipt dated Jun. 3, 2019, 9 pages.
U.S. Appl. No. 15/590,562 / Issue Fee Payment filed Jul. 3, 2019, 6 pages.
U.S. Appl. No. 15/590,562 / Issue Notification dated Jul. 31, 2019, 1 page.
U.S. Appl. No. 12/437,599 / MIT1: Patent Application filed May 8, 2009, 61 pages.
U.S. Appl. No. 12/437,599 / MIT1: Filing Receipt dated May 8, 2009, 3 pages.
U.S. Appl. No. 12/437,599 / MIT1: Notice of Publication dated Nov. 12, 2019, 1 page.
U.S. Appl. No. 12/437,599/ MIT1: Non-final Office Action dated Oct. 19, 2011, 35 pages.
U.S. Appl. No. 12/437,599/ MIT1: Amendment filed Apr. 13, 2012, 21 pages.
U.S. Appl. No. 12/437,599 / MIT1: Notice of Allowance and Allowability dated May 22, 2012, 16 pages.
U.S. Appl. No. 12/437,599/ MIT1: Examiner Initialed Interview Summary dated May 22, 2012, 1 page.
U.S. Appl. No. 12/437,599 / MIT1: Issue Fee Payment filed May 25, 2012, 5 pages.
U.S. Appl. No. 12/437,599 / MIT1: Issue Notification dated Jun. 13, 2012, 1 page.
U.S. Appl. No. 13/487,781 / MIT2: Patent Application filed Jun. 4, 2012, 51 pages.
U.S. Appl. No. 13/487,781 / MIT2: Filing Receipt and Notice to File Missing Parts dated Jun. 18, 2012, 5 pages.
U.S. Appl. No. 13/487,781 / MIT2: Response to Notice to File Missing Parts dated Aug. 20, 2012, 5 pages.
U.S. Appl. No. 13/487,781 / MIT2: Updated Filing Receipt dated Aug. 29, 2012, 5 pages.
U.S. Appl. No. 13/487,781 / MIT2: Preliminary Amendment filed Aug. 30, 2012, 14 pages.
U.S. Appl. No. 13/487,781 / MIT2: Updated Filing Receipt dated Sep. 6, 2012, 3 pages.
U.S. Appl. No. 13/487,781 / MIT2: Preliminary Amendment filed Sep. 21, 2012, 6 pages.
U.S. Appl. No. 13/487,781 / MIT2: Notice of Publication dated Dec. 13, 2012, 1 page.
U.S. Appl. No. 13/487,781 / MIT2: Notice of Allowance and Allowability dated Sep. 4, 2013, 22 pages.
U.S. Appl. No. 13/487,781 / MIT2: Issue Fee Payment and 312 Amendment filed Dec. 4, 2013, 23 pages.
U.S. Appl. No. 13/487,781 / MIT2: Response to 312 Amendment dated Dec. 27, 2013, 6 pages.
U.S. Appl. No. 13/487,781 / MIT2: Issue Notification dated Jan. 15, 2014, 1 page.
U.S. Appl. No. 13/599,037 / MIT3: Patent Application filed Aug. 30, 2012, 59 pages.
U.S. Appl. No. 13/599,037 / MIT3: Filing Receipt dated Sep. 17, 2012, 4 pages.
U.S. Appl. No. 13/599,037 / MIT3: Preliminary Amendment dated Sep. 21, 2012, 5 pages.

(56) References Cited

OTHER PUBLICATIONS

U.S. Appl. No. 13/599,037 / MIT3: Notice of Publication dated Dec. 27, 2012, 1 page.
U.S. Appl. No. 13/599,037 / MIT3: e-Terminal Disclaimer filed and accepted Dec. 5, 2013, 7 pages.
U.S. Appl. No. 13/599,037 / MIT3: Notice of Allowance and Allowability dated Jan. 2, 2014, 26 pages.
U.S. Appl. No. 13/599,037 / MIT3: Issue Fee Payment dated Feb. 28, 2014, 8 pages.
U.S. Appl. No. 13/599,037 / MIT3: Issue Notification dated Mar. 26, 2014, 1 page.
U.S. Appl. No. 14/251,917 / MIT4: Patent Application filed Apr. 14, 2014, 63 pages.
U.S. Appl. No. 14/251,917/ MIT4: Filing Receipt dated May 5, 2014, 3 pages.
U.S. Appl. No. 14/251,917 / MIT4: Notice of Publication dated Aug. 14, 2014, 1 page.
U.S. Appl. No. 14/251,917 / MIT4: 312 Amendment filed Apr. 22, 2015, 13 pages.
U.S. Appl. No. 14/251,917 / MIT4: Response to 312 Amendment filed Apr. 30, 2015, 3 pages.
U.S. Appl. No. 14/251,917/MIT4: Issue Fee Payment filed May 1, 2015, 8 pages.
U.S. Appl. No. 14/251,917/ MIT4: Issue Notification dated May 1, 2015, 8 pages.
U.S. Appl. No. 14/708,903 / MIT5: Patent Application filed May 11, 2015, 57 pages.
U.S. Appl. No. 14/708,903 / MIT5: Filing Receipt and Notice of Missing Parts filed May 19, 2015, 5 pages.
U.S. Appl. No. 14/708,903 / MIT5: Response to Notice of Missing Parts filed May 19, 2015, 3 pages.
U.S. Appl. No. 14/708,903 / MIT5: Notice of Publication dated Oct. 1, 2015, 1 page.
U.S. Appl. No. 14/708,903 / MIT5: Non-final Office Action filed Oct. 1, 2015, 36 pages.
U.S. Appl. No. 14/708,903 / MIT5: Amendment and e-Terminal Disclaimer filed Jan. 3, 2017, 23 pages.
U.S. Appl. No. 14/708,903 / MIT5: Notice of Allowance and Allowability dated Feb. 23, 2017, 31 pages.
U.S. Appl. No. 14/708,903 / MIT5: Issue Fee Payment filed Apr. 24, 2017, 7 pages.
U.S. Appl. No. 14/708,903 / MIT5: Issue Notification dated May 10, 2017, 1 page.
U.S. Appl. No. 14/708,903 / MIT5: Request for Certificate of Correction filed Apr. 14, 2018, 6 pages.
U.S. Appl. No. 14/708,903 / MIT5: Request for Certificate of Correction filed Apr. 14, 2018, 1 page.
U.S. Appl. No. 15/585,676 / MIT6: Patent Application filed May 3, 2017, 63 pages.
U.S. Appl. No. 15/585,676 / MIT6: Filing Receipt dated May 12, 2017, 4 pages.
U.S. Appl. No. 15/585,676 / MIT6: Notice of Publication dated Aug. 17, 2017, 1 page.
U.S. Appl. No. 15/585,676 / MIT6: Non-final Office Action dated Oct. 6, 2017, 34 pages.
U.S. Appl. No. 15/585,676 / MIT6: Amendment filed Apr. 5, 2018, 13 pages.
U.S. Appl. No. 15/585,676 / MIT6: Supplemental Amendment filed Apr. 5, 2018, 9 pages.
U.S. Appl. No. 15/585,676 / MIT6: Final Rejection dated Jul. 2, 2018, 9 pages.
U.S. Appl. No. 15/585,676 / MIT6: Notice of Abandonment dated Jan. 25, 2019, 2 pages.
PCT/US12/36455 / PCT Application filed May 4, 2012, 59 pages.
PCT/US12/36455 / International Search Report and Written Opinion dated Nov. 28, 2012, 7 pages.
PCT/US12/36455 / International Preliminary Report an Patentability dated Nov. 5, 2013, 5 pages.
CN201280033387 / First Search Report dated Jun. 24, 2015, 2 pages.
CN201280033387 / First Office Action dated Jul. 2, 2015, 18 pages.
CN201280033387 / Response to First Office Action dated Jan. 18, 2016, 11 pages.
CN201280033387.X / Supplementary Search Report dated Mar. 29, 2016, 1 page.
CN201280033387 / Second Office Action dated Apr. 7, 2016, 13 pages.
CN201280033387 / Response to Second Office Action filed Aug. 18, 2016, 25 pages.
CN201280033387 / Supplementary Search Report dated Jan. 16, 2017, 1 page.
CN201280033387 / Third Office Action dated Apr. 7, 2016, 22 pages.
CN201280033387 / Response to Third Office Action filed Jun. 1, 2017, 22 pages.
CN201280033387 / Fourth Office Action dated Sep. 8, 2017, 24 pages.
CN201280033387 / Response to Fourth Office Action filed Jan. 5, 2018, 11 pages.
CN201280033387 / Decision to Grant ON Patent dated Jun. 6, 2018, 11 pages.
CN201280033387 / Rectified Decision to Grant ON Patent dated Jun. 27, 2018, 4 pages.
CN201280033387 / Certificate of Patent dated Sep. 21, 2018, 2 pages.
CN201810954743 / CN Patent Application as filed Aug. 21, 2018, 59 pages.
CN201810954743 / Filing Receipt dated Aug. 21, 2018, 1 page.
CN201810954743 / Notice of Publication dated Dec. 7, 2018, 33 pages.
CN201810954743 / Search Report dated Dec. 19, 2019, 2 pages.
CN201810954743 / First Office Action dated Dec. 30, 2019, 23 pages.
CN201810954743 / Office Action dated Dec. 30, 2019, 24 pages.
CN201810954743 / Response to First Office Action dated Jul. 14, 2020, 34 pages.
CN201810954743 / Second Office Action dated Sep. 21, 2020, 21 pages.
CN201810954743 / Response to Second Office Action filed Feb. 7, 2020, 41 pages.
EP12780024 / EP Application as filed Dec. 3, 2013, 19 pages.
EP12780024 / Notice of Publication dated Feb. 12, 2014, 1 page.
EP12780024 / Search Report and Opinion dated Feb. 18, 2015, 7 pages.
EP12780024 / Rule 70 Communication dated Mar. 6, 2015, 1 page.
EP12780024 / Amendment filed Dec. 16, 2015, 13 pages.
EP12780024 / Article 94 Communication dated Feb. 23, 2016, 7 pages.
EP12780024 / Amendment in Response to Article 94 Communication filed Aug. 10, 2016, 23 pages.
EP12780024 / Article 94 Communication dated Jan. 3, 2017, 5 pages.
EP12780024 / Amendment in Response to Article 94 Communication filed Jun. 8, 2017, 5 pages.
EP12780024 / Intention to Grant dated Feb. 7, 2018, 103 pages.
EP12780024 / Request for Correction/Amendment of Granted Claims filed Mar. 13, 2018, 103 pages.
EP12780024 / Approval/Grant of Request for Correction/Amendment of Granted Claims dated Mar. 13, 2018, 3 pages.
EP12780024 / Revised Intention to Grant dated Jul. 4, 2018, 99 pages.
EP12780024 / Decision to Grant dated Jul. 19, 2018, 2 pages.
EP12780024 / Patent Certificate dated Aug. 15, 2018, 2. page.
EP18188795 / EP Patent Application as filed Aug. 13, 2018, 62 pages.
EP18188795 / European Search Report dated Sep. 26, 2018, 3 pages.
EP18188795 / Extended European Search Report and Opinion dated Oct. 9, 2018, 8 pages.
EP18188795 / Notice of Publication dated Dec. 12, 2018, 2 pages.
EP18188795 / Amendment and Request for Examination filed Jun. 17, 2019, 28 pages.

(56) References Cited

OTHER PUBLICATIONS

EP18188795 / Article 94(3) Communication dated Nov. 11, 2019, 7 pages.
EP18188795/ Amendment / Response to 94(3) Objection filed Aug. 21, 2020, 7 pages.
EP18188795 / Decision on the Request for Further Processing under 135(3) EPC Sep. 1, 2020, 1 page.
EP18188795 / Article 94(3) Communication dated Jan. 12, 2021, 5 pages.
KR20137032399 / KR Patent Application filed May 12, 2013, 136 pages.
KR20137032399 / Request for Amendment of Inventor Information filed Dec. 13, 2013, 2 pages.
KR20137032399 / Amendment of Biographic Data entered Dec. 23, 2013, 4 pages.
KR20137032399 / Office Action dated Nov. 18, 2014, 8 pages.
KR20137032399 / Amendment to Claims filed Jan. 15, 2015, 21 pages.
KR20137032399 / Response to Office Action dated Jan. 15, 2015, 15 pages.
KR20137032399 / Final Office Action dated May 22, 2015, 5 pages.
KR20137032399 / Amendment filed Jun. 17, 2015, 6 pages.
KR20137032399 / Response to Final Office Action filed Jun. 17, 2015, 5 pages.
KR20137032399 / Grant of Patent dated Jun. 24, 2015, 2 pages.
KR20137032399 / Patent Certificate dated Sep. 23, 2015, 2 pages.
PCT/US16/22040 / PCT Application filed Mar. 11, 2016, 71 pages.
PCT/US16/22040 / International Search Report and Written Opinion dated Jun. 20, 2016, 10 pages.
PCT/US16/22040 / Article 19 Amendment filed Sep. 22, 2016, 10 pages.
PCT/US16/22040 / International Preliminary Report on Patentability dated Sep. 19, 2017, 7 pages.
CN201680027105.3 / CN Application as filed Nov. 9, 2017, 167 pages.
CN201680027105.3 / First Office Action dated May 7, 2019, 22 pages.
CN201680027105.3 / Response to First Office Action filed Nov. 22, 2019, 25 pages.
CN201680027105.3 / Second Office Action dated Mar. 18, 2020, 12 pages.
CN201680027105.3 / Response to Second Office Action filed Aug. 3, 2020, 31 pages.
CN201680027105.3 / Third Office Action dated Feb. 3, 2021, 26 pages.
DE112016001188 / DE Application filed Sep. 13, 2017, 172 pages.
JP2017567041 / JP Application filed Sep. 12, 2017, 68 pages.
JP2017567041 / Office Action dated May 25, 2020, 30 pages.
JP2017567041 / Response to Office Action filed Oct. 26, 2020, 87 pages.
JP2017567041 / Final Office Action dated Mar. 29, 2021, 8 pages.
KR20177029575 / KR Application filed Oct. 13, 2017, 169 pages.
KR20177029575 / Request for Amendment to Signatory filed Oct. 23, 2017, 2 pages.
KR20177029575 / Allowed Amendment to Signatory dated Dec. 11, 2017, 4 pages.
KR20177029575 / Voluntary Amendment and Request for Examination filed Mar. 9, 2021, 38 pages.
TW105107546 / TW Application filed Mar. 11, 2016, 65 pages.
PCT/US2017/023191 / PCT Application filed Mar. 20, 2017, 94 pages.
PCT/US2017/023191 / Intl Search Report and Written Opinion dated Jun. 30, 2017, 9 pages.
CN 201780030693 / CN Patent Application filed Nov. 16, 2018, 129 pages.
CN 201780030693 / Office Action dated Apr. 28, 2020, 15 pages.
CN 201780030693 / Response to Office Action filed Nov. 12, 2020, 63 pages.
KR 10-2018-7030031 / KR Patent Application filed Oct. 17, 2018, 169.
pages.
KR20157016195 / KR Divisional Application filed Jun. 17, 2015, 126 pages.
KR20157016195 / Request for Amendment of Inventor Information filed Jul. 2, 2015, 2 pages.
KR20157016195 / Amendment of Bibliographic Data dated Jul. 3, 2015, 4 pages.
KR20157016195 / Amendment filed Feb. 29, 2015, 13 pages.
KR20157016195 / Amendment filed Apr. 13, 2017, 15 pages.
KR20157016195 / Request for Examination filed Apr. 20, 2017, 2 pages.
KR20157016195 / Office Action dated Jul. 5, 2017, 9 pages.
KR20157016195 / Final Office Action dated Dec. 20, 2017, 9 pages.
PCT/US2017/031726 / PCT Application filed May 9, 2017, 67 pages.
PCT/US2017/031726 / Intl Search Report and Written Opinion dated Aug. 8, 2017, 67 pages.
PCT/US2017/031726 / Intl Preliminary Report on Patentability dated Nov. 22, 2018, 67 pages.
CN201780042383 / CN Patent Application filed Jan. 7, 2019, 275 pages.
CN201780042383 / Office Action dated Apr. 28, 2020, 16 pages.
CN201780042383 / Response to Office Action filed Nov. 13, 2020, 19 pages.
CN201780042383 / Decision to Grant dated Dec. 14, 2020, 4 pages.
202110224392.X / Patent Application No. 202110224392.X filed Mar. 1, 2021, 128 pages.
DE112017002374 / DE Patent Application filed Nov. 8, 2018, 167 pages.
U.S. Appl. No. 17/187,664: Preliminary Amendment and Response to Notice to File Missing Parts filed Jul. 12, 2021, 17 pages.
CN201810954743: Decision on Rejection dated May 27, 2021, 7 pages.
CN201680027105.3: Response to Third Office Action filed Jun. 17, 2021, 14 pages.
CN 201780030693: Second Office Action dated Mar. 15, 2021, 19 pages.
CN201780042383: Patent Certificate dated Mar. 23, 2021, 4 pages.
202110224392.X: Request for Examination filed Apr. 30, 2021, 2 pages.
202110224392.X: Notice of Entry into Substantive Examination dated May 31, 2021, 3 pages.

* cited by examiner

DIES WITH SWITCHES FOR OPERATING A SWITCHED-CAPACITOR POWER CONVERTER

CROSS REFERENCE TO RELATED APPLICATIONS

Under 35 USC 120, this application is a divisional of U.S. application Ser. No. 15/590,562, filed May 9, 2017, which under 35 USC 119, claims the benefit of the priority date of U.S. Provisional Application 62/333,432, filed on May 9, 2016 and U.S. Provisional Application 62/333,402, filed on May 9, 2016, and under 35 USC 120, this application is a continuation-in-part of U.S. application Ser. No. 15/138,692, filed on Apr. 26, 2016, which is a continuation of Ser. No. 14/513,747, filed on Oct. 14, 2014, which is a continuation of U.S. application Ser. No. 13/771,904, filed on Feb. 20, 2013 and issued as U.S. Pat. No. 8,860,396 on Oct. 14, 2014, which is a continuation of international application PCT/US2012/036455, filed on May 4, 2012, which, under 35 USC 119, claims the benefit of the priority dates of U.S. Provisional Application No. 61/482,838, filed May 5, 2011, U.S. Provisional Application No. 61/548,360, filed Oct. 18, 2011, and U.S. Provisional Application No. 61/577,271, filed Dec. 19, 2011, the contents of which are all incorporated herein by reference.

FIELD OF INVENTION

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network.

Switched-capacitor converters are switch-mode power converters that primarily use capacitors to transfer energy. These converters transfer energy from an input to an output by using switches to cycle a network of capacitors through different topological states. A common converter of this type, known as a "charge pump," is commonly used to produce the high voltages in FLASH memories and other reprogrammable memories. Charge pumps have also been used in connection with overcoming the nuclear strong force to transform one element into another.

In a switched-capacitor converter, the number of capacitors and switches increases as the transformation ratio increases. Switches in the switch network are usually active devices that are implemented with transistors. The switch network may be integrated on a single or on multiple monolithic semiconductor substrates, or formed using discrete devices. Furthermore, since each switch in a power converter normally carries high current, it may be composed of numerous smaller switches connected in parallel.

SUMMARY

Typical DC-DC converters perform voltage transformation and output regulation. This is usually done in a single-stage converter such as a buck converter. However, it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

In those cases where the transformation stage and the regulating stage are close together, a direct connection is possible. However, in other cases, the regulating stage may be far from the transformation stage. Under these circumstances, it is useful to filter the output of the transformation stage to reduce loss.

In one aspect, the invention features a transformation stage for transforming a first voltage into a second voltage. Such a transformation stage includes a switching network, a filter, and a controller. The filter is configured to connect the transformation stage to a regulator, and the controller controls the switching network.

In some embodiments, the filter includes an LC filter.

In other embodiments, the filter includes an inductance that, in operation at a particular switching frequency, sustains a peak-to-peak voltage ripple and supports an inductor current that passes into a load, the inductor current defining an average inductor current. Among these are embodiments in which the inductance is selected by dividing the peak-to-peak voltage ripple by a product of the average inductor current and the switching frequency multiplied by 13/24.

Some embodiments include the regulating circuit.

Also among the embodiments are those in which the filter is configured to connect the transformation stage to more than one regulator.

Yet other embodiments include plural regulating circuits, wherein the filter connects the transformation stage to all of the regulators.

Also among the embodiments are those in which the transformation stage includes plural switching networks. In these embodiments, the filter connects to all of the switching networks to a regulating circuit.

Other embodiments include those in which the transformation stage includes a plurality of units in series. Each unit includes a switching network in series with a filter.

Typical DC-DC converters perform voltage transformation and output regulation. This is usually done in a single-stage converter such as a buck converter. However, it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

In those cases where the transformation stage and the regulating stage are close together, a direct connection is possible. However, in other cases, the regulating stage may be far from the transformation stage. Under these circumstances, it is useful to filter the output of the transformation stage to reduce loss.

In one aspect, the invention includes an apparatus having phase and stack switches for operating a switched-capacitor converter. The phase and stack switches are on respective first and second dies.

Some embodiments include a first controller that controls the switches on the first die and a second controller that controls switches on the second die. An inter-controller commissure provides a link between the first and second controllers to permit operation of the first switches to depend at least in part on operation of the second switches, and to permit operation of the second switches to depend at least in part on operation of the first switches. Among these are embodiments in which the first controller is on the first die, the second controller is on the second die, and the inter-controller commissure extends between the first die and the second die. Also among the embodiments are those that include a third die and a fourth die. In these embodiments, the first controller is on the third die, the second controller is on the fourth die, and the inter-controller commissure extends between the third die and the fourth die.

In some embodiments, the switched-capacitor converter is a two-phase converter. Some of these embodiments have third and fourth dies. The stack switches comprise first and second sets, each of which is associated with one of the two phases. The first set of stack switches is on the second die and the second set of stack switches is on the fourth die. Meanwhile, the phase switches comprise first and second sets of phase switches, each of which is associated with one of the two phases. The first set of phase switches is on the first die and the second set of phase switches is on the third die.

Also among the embodiments are those that include charge-transfer capacitors connected to the stack switches and to the phase switches. Among these are embodiments having a third die in which the charge-transfer capacitors are integrated. Also among these are embodiments in which the charge-transfer capacitors are discrete capacitors that connect to the first and second dies. In some of these embodiments, the first die and the second die are connected via an inter-die commissure having a length that corresponds to a distance between positive and negative terminals of the charge-transfer capacitors. Also among the embodiments are those that have an interdie commissure connecting the first and second dies, wherein the first and second dies have first terminals for connection to positive terminals of the charge-transfer capacitors, and second terminals for connection to negative terminals of the charge-transfer capacitors, with the first and second terminals and the second terminals being disposed on opposite ends of the interdie commissure, and with the charge-transfer capacitors being oriented such that positive terminals thereof lie closer to the first terminals than they do to the second terminals and negative terminals thereof lie closer to the second terminals than to the first terminals. Also among the embodiments are those in which interdie commissure has first and second regions such that, during operation, the first region carries more current than the second region. In these embodiments, the first region is wider than the second region.

In some embodiments, the charge-transfer capacitors have capacitances that are a function of voltage applied across the charge-transfer capacitors. In operation, the charge-transfer capacitors sustain different maximum voltages. The charge-transfer capacitors are selected such that, when at their respective maximum voltages, the charge-transfer capacitors all have the same capacitance.

Some embodiments include an interdie commissure connecting the first and second dies. As a result of a fold in the interdie commissure, the first and second dies lie on different planes. Other embodiments feature coplanar first and second dies.

Embodiments include those in which the switched-capacitor converter is a multi-phase converter, and the apparatus has a third die. In these embodiments, the phase switches comprise a first set of phase switches associated with a first phase and a second set of phase switches associated with a second phase, with the first set being on the first die and the second set on the second die. Among these are embodiments that have first and second sets of charge-transfer capacitors, with the first set of charge-transfer capacitors being connected between the first die and the second die, and the second set of charge-transfer capacitors being connected between the third die and the second die.

Other embodiments include a substrate and charge-transfer capacitors. In these embodiments, the substrate supports the charge-transfer capacitors, the first die, and the second die. Among these are embodiments in which the device faces of the first and second dies face the substrate, and conducting bumps between the device face and the substrate provide electrical communication between the dies and the charge-transfer capacitors. Also among these are embodiments that have a package, with the first and second dies being in the package and oriented so that they are either coplanar or non-coplanar.

Other embodiments include a substrate, a package, a third die, and charge-transfer capacitors. In these embodiments, the charge-transfer capacitors are integrated into the third die, the substrate supports the package, the package includes the first die, the second die, and the third die, and the first, second, and third dies are distributed among different layers of the package. Among these are embodiments in which the package comprises a first layer and a second layer. In these embodiments, the first and second dies are in the first layer and the third die is in the second layer. Also among these are embodiments in which the package comprises a first layer and a second layer. In these embodiments, the first and third dies are in the first layer and the second die is in the second layer. Also among these are embodiments in which the package comprises a first layer, a second layer, and a third layer. In these embodiments, each layer contains at most one die. In some of these embodiments, the second layer is between the first and third layers, and the third die is in the second layer.

Some embodiments include a substrate that supports a package. The package has an upper layer and a lower layer, with the lower layer being closer to the substrate than the upper layer. The lower layer contains a die and the upper layer contains charge-transfer capacitors. The inductor is on the substrate outside the package. Among these are embodiments in which the die's device face faces the substrate. The apparatus further includes first and second interconnect layers, and electrically conducting bumps. The first interconnect layer connects the charge-transfer capacitors to the die, and the second interconnect layer connects the die to the charge-transfer capacitors and to the electrical bumps. The electrical bumps connect the package with the inductor.

Also among these are embodiments in which a device face of the die faces away from the substrate. These embodiments include a heat sink, thermally-conducting bumps, a first interconnect layer, a second interconnect layer, and electrically-conducting bumps. The first interconnect layer connects the charge-transfer capacitors to the die. The second interconnect layer connects the die to the charge-transfer capacitors and to the electrically-conducting bumps. The electrically-conducting bumps connect the package with the inductor. In these embodiments, the heat sink faces the substrate, and the thermally-conducting bumps connect the heat sink to the substrate. These thermally-conducting bumps carry only heat. They are electrically disconnected from the circuit.

Also among these are embodiments in which a device face of the die faces away from the substrate. In these embodiments, a first interconnect layer connects charge-transfer capacitors to the die, and a second interconnect layer connects the die to the charge-transfer capacitors and to electrically conducting pads. The electrically conducting pads connect the package with the inductor. The thermally-conducting pad connects the heat sink, which faces the substrate, to the substrate. This thermally-conducting pad carries only heat. It is electrically isolated from the inductor, the charge-transfer capacitor, and the die.

Other embodiments also include a substrate that supports a package having upper and lower layers, with the lower layer being closer to the substrate that the upper layer. The inductor is in the package. The lower layer contains a die and upper layer contains charge-transfer capacitors are in the upper layer. Among these are embodiments in which the inductor is disposed in the upper layer. Also among these embodiments are those in which conductive traces around an inductor core in the layer form the inductor.

Among the foregoing embodiments are those in which a device face of the chip faces away from the substrate. In these embodiments, thermally-conducting bumps connect a heat sink to the substrate. These thermally-conducting bumps only carry heat. They are electrically isolated from the die, the charge-transfer capacitors, and the inductor.

Yet other embodiments include regulator switches in the first die.

These and other features of the invention will be apparent from the following detailed description and the accompanying figures, in which:

DETAILED DESCRIPTION

Some power converters carry out both regulation and transformation with a limited number of circuit components by commingling these functions into a single stage. As a result, certain components are used both for regulation and transformation. Sometimes the regulation stage is referred to as a regulating circuit and the transformation stage is referred to as a switching network. As used herein, these terms mean the same thing.

Figure 1:
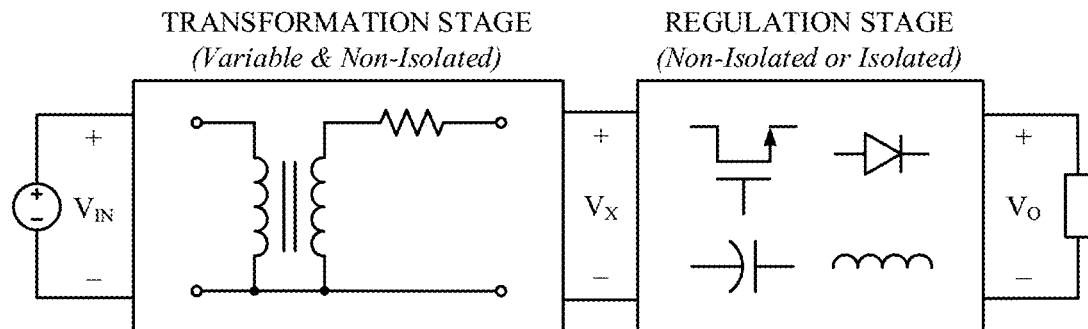
FIG. 1 shows a power converter with a separable transformation stage and regulation stage.

FIG. 1 shows a modular multi-stage power converter that separates the converter's transformation and regulation functions. These functions are no longer accomplished together as they would be in a single-stage converter design. As a result, in a multi-stage power converter, as shown in FIG. 1, it is possible to optimize a transformation stage and a regulation stage for their specific functions. The transformation stage and the regulation stage can be treated as either independent entities or coupled entities.

In the power converter of FIG. 1, a transformation stage receives an input voltage $V_{IN}$ across its two input terminals and outputs an intermediate voltage $V_X$ across its two output terminals at a fixed voltage conversion ratio. Therefore, the intermediate voltage $V_X$ changes in response to changes in the input voltage $V_{IN}$. The transformation stage is thus regarded as "variable" if the voltage conversion ratio can be varied. However, it is not required that a transformation stage be "variable".

Figure 37:
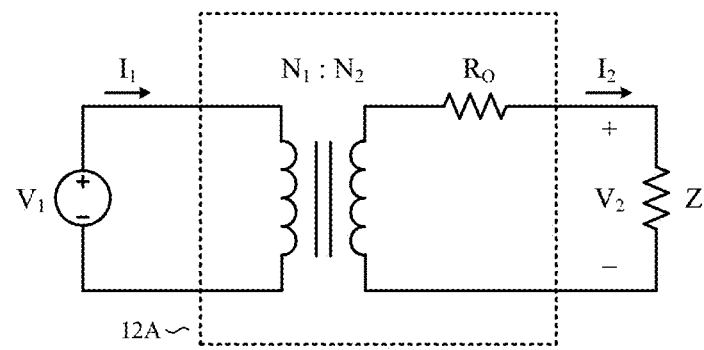
FIG. 37 shows an isolated variant of FIG. 36.

In the particular embodiment shown in FIG. 1, there exists an electrical connection between the transformation stage's negative input terminal and its negative output terminal. In this configuration, the transformation stage is said to be "non-isolated." In contrast, the embodiment shown in FIG. 2, no such connection exists between the transformation stage's negative input and its negative output. An example of such a transformation stage is shown in FIG. 37 with a voltage conversion ratio of $N_1:N_2$.

In general, two functional components of a circuit or system are said to be isolated, in a galvanic sense, if no direct conduction path exists between those two components, and yet energy and information can still be communicated between those components. The communication of such energy and information can be carried out in a variety of ways that do not require actual current flow. Examples include communication via waves, whether electromagnetic, mechanical, or sonic. Electromagnetic waves in this context include waves in the visible range, as well as just outside the visible range. Such communication can also be implemented via static or quasi-static electric or magnetic fields, capacitively, inductively, or by mechanical means.

Galvanic isolation is particularly useful for cases in which the two functional components have grounds that are at different potentials. Through galvanic isolation of components, it is possible to essentially foreclose the occurrence of ground loops. It is also possible to reduce the likelihood that current will reach ground through an unintended path, such as through a person's body.

Figure 28:
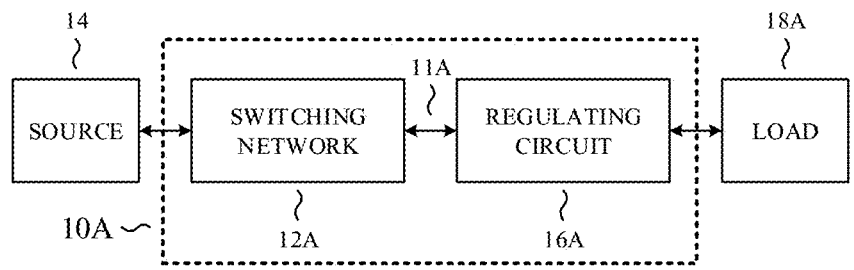
FIG. 28 shows a bidirectional version of FIG. 11.

The transformation stage efficiently provides an intermediate voltage $V_X$ that differs from the input voltage $V_{IN}$ and that varies over a much smaller range than the input voltage $V_{IN}$. In practice, the intermediate voltage $V_X$ varies during operation if there are changes at either the input or output of the transformation stage. These variations require correction to achieve the desired output voltage $V_O$. It is for this reason that a regulation stage is necessary. As shown in FIGS. 1 and 28, a regulation stage receives the intermediate voltage $V_X$ across its input terminals and provides a regulated voltage $V_O$ across its output terminals.

The architecture shown in FIG. 1 is flexible enough to permit designs with different requirements. For example, if magnetic isolation is required, a magnetic isolated fly-back converter can be used. Designs that require multiple regulated output voltages can be accomplished by using two separate regulation stages and a single transformation stage.

The architecture shown in FIG. 1 in effect creates a modular architecture for power converters in which fundamental building blocks can be mixed and matched in a variety of ways to achieve particular goals.

FIGS. 3-10 are block diagrams showing different ways to arrange the transformation stage and the regulation stage relative to a source or a load. The fact that these can even be represented as block diagrams at all stems from the modularity of the architecture. Such modularity is not present in a conventional single-stage converter. In such a converter, the functions of regulation and transformation are so intimately comingled that it is not possible to extract two separate circuits and to say that one carries out regulation and the other carries out transformation. Instead, in a conventional converter, if one attempts to extract two circuits, one of which is a regulator and the other of which is a voltage transformer, the usual result is two circuits that do not work.

Figure 3:
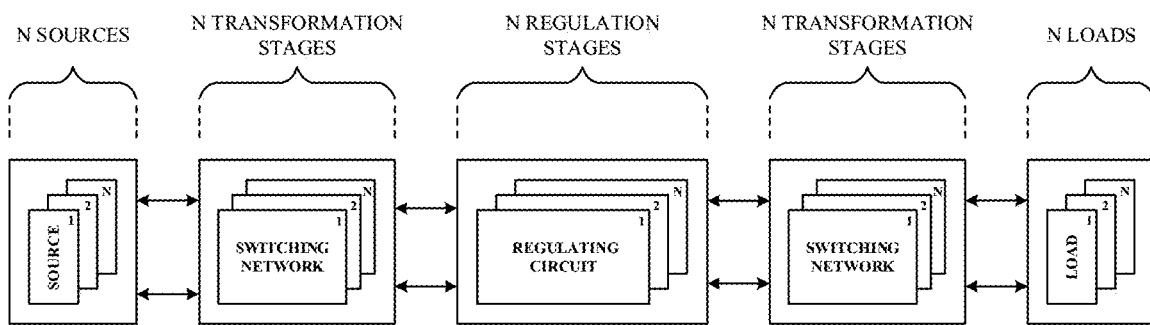
FIGS. 3 to 10 show different ways of connecting transformation and regulation stages.

FIG. 3 shows a generic architecture in which a pair of transformation stages sandwiches a regulation stage. Each transformation stage includes one or more switched-capacitor networks. Similarly, each regulation stage includes one or more regulating circuits. It is also possible to have more than one source and more than one load. The double-headed arrows in FIG. 3 and in other figures indicate bidirectional power flow.

Figure 4:
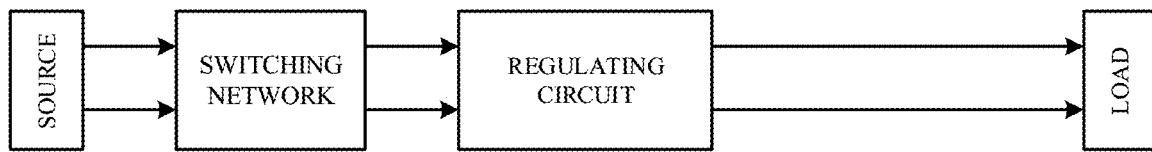

FIG. 4 shows a source-regulating configuration in which power flows from a source to a transformation stage. The transformation stage then provides the power to a regulation stage, which then passes it to a load. Thus, in this configuration, the load ultimately receives power from the regulation stage.

Figure 5:
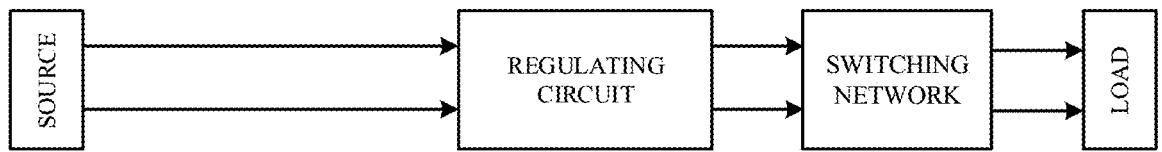

In contrast, FIG. 5 shows a load-regulating configuration. In a load-regulating configuration, power flows from a source to a regulation stage, which then regulates it and passes it to a transformation stage. In this embodiment, the load receives power directly from the transformation stage instead of directly from the regulation stage.

Figure 6:
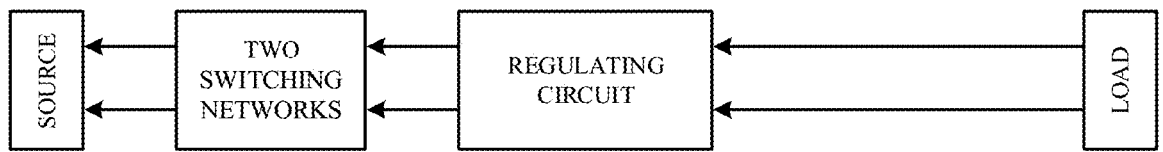

FIG. 6 shows a reverse source-regulating configuration similar to that shown in FIG. 4, but with power flowing in the opposite direction.

Figure 7:
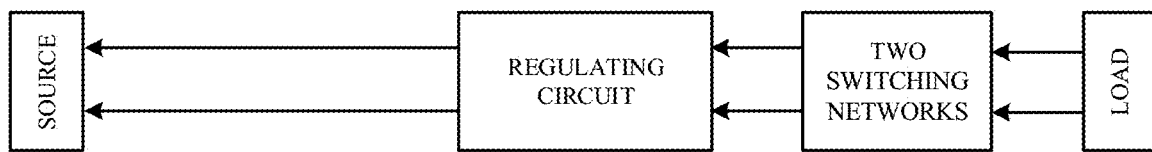

FIG. 7 shows a reverse load-regulating configuration similar to that shown FIG. 5, but with power flowing in the other direction.

Figure 8:
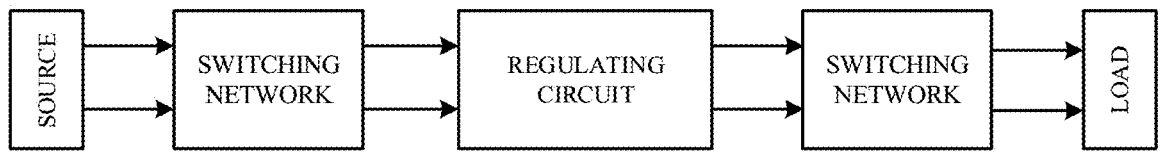
Figure 9:
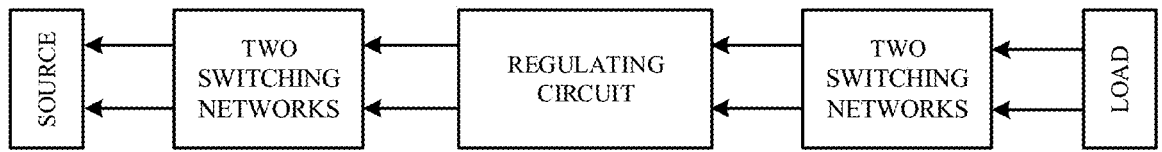

In the embodiments shown in FIGS. 8 and 9, two transformation stages bracket a regulation stage. These are distinguished by direction of current flow. FIG. 8 shows a source/load-regulating configuration in which power flows from the source to the load via a first transformation stage, a regulation stage, and a second transformation stage, and FIG. 9 shows a reverse source/load-regulating configuration in which power flows from the load to the source via a first transformation stage, a regulation stage, and a second transformation stage.

Figure 10:
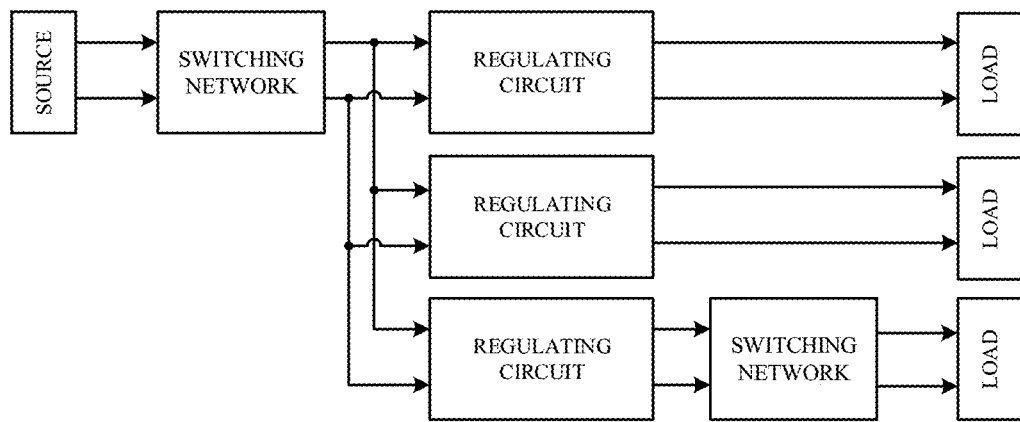

In another embodiment, shown in FIG. 10, several regulating circuits rely on the same switched-capacitor converter. Note that of the three power paths, a first and second power path are in the load-regulating configuration whereas the third power path is in the source/load-regulating configuration. An embodiment having several regulating circuits is particularly useful since it enables different output voltages to be provided to different loads.

Figure 11:
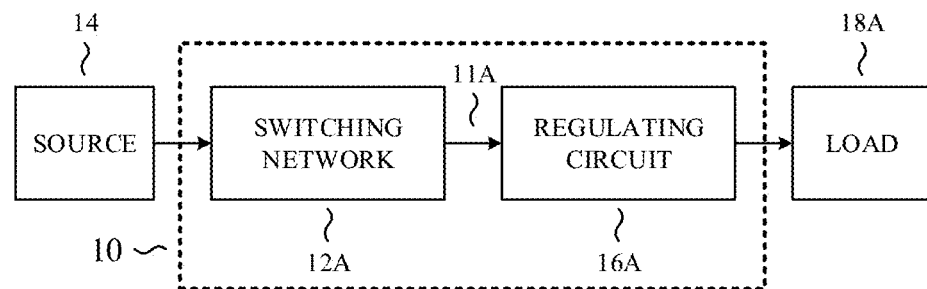
FIG. 11 shows a DC-DC converter with a separate regulating circuit and switching network.

FIG. 11 shows a power converter 10 assembled by combining two modules using the principles suggested by FIG. 1. The illustrated power converter 10 includes a switching network 12A, a voltage source 14, a regulating circuit 16A, and an inter-module link 11A that connects an output of the switching network 12A to an input of the regulating circuit 16A. A load 18A connects to an output of the regulating circuit 16A. Power flows between the voltage source 14 and the load 18A in the direction indicated by the arrows. To simplify representation, the separation of the connection into positive and negative lines has been omitted.

In the embodiment shown in FIG. 11, the regulating circuit 16A can be at some distance from the switching network 12A. In such cases, it is useful to include a filter at the output of the switching network 12A.

Figure 12:
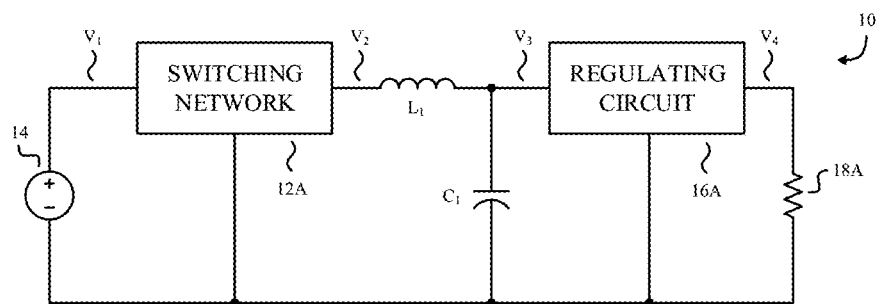
FIG. 12 shows a power converter with a filter between the switching network and the regulation stage.

FIG. 12 shows a power converter 10 that, like the embodiment shown in FIG. 11, has a voltage source 14 that provides a first voltage $V_1$ to a switching network 12A. However, in this embodiment, the switching network 12A provides a second voltage $V_2$ to an inductance $L_1$. In the illustrated embodiment, there is also a capacitance $C_1$ across a load 18A. The inductance $L_1$ and the capacitance $C_1$ together define an LC filter that outputs a third voltage $V_3$ that ultimately makes its way to the regulating circuit 16A shown in FIG. 11. The regulating circuit 16A adjusts the unregulated third voltage $V_3$ to yield a regulated fourth voltage $V_4$, which it then provides to the load 18A.

Figure 13:
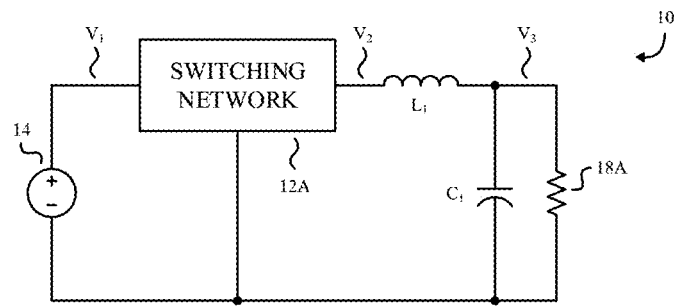
FIG. 13 shows the power converter of FIG. 12 but without the regulation stage.

An alternative embodiment, shown in FIG. 13, connects the third voltage $V_3$ directly to the load 18A. In this embodiment, the filter formed by the combination of the capacitor $C_1$ and inductor $L_1$ regulates the third voltage $V_3$ without the need for a regulating circuit 16A. The various configurations shown above have switches that need to be opened and closed at certain times. Thus, they all implicitly require one or more controllers to provide control signals that open and close these switches. The structure and operation of such a controller 20A is described in connection with FIGS. 14-23.

Figure 14:
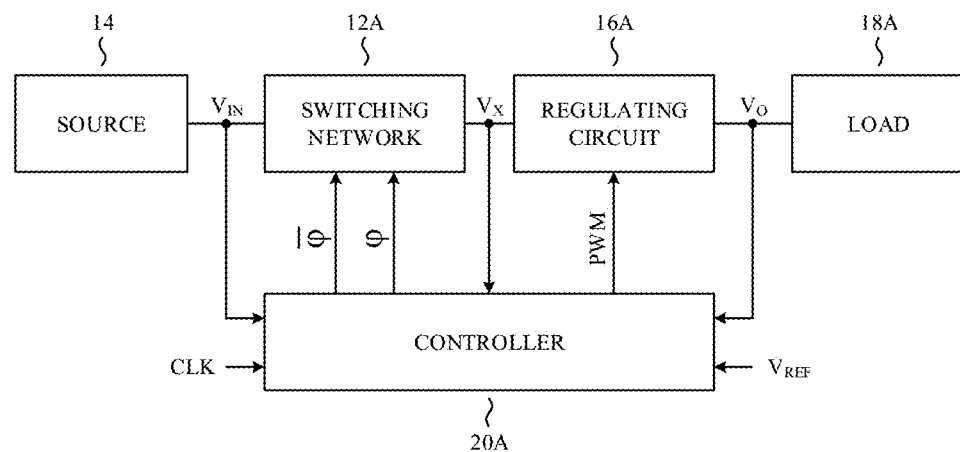
FIG. 14 explicitly shows control circuitry associated with a converter as shown in FIG. 11.

FIG. 14 shows the power converter 10 of FIG. 11, but with a controller 20A explicitly shown. The controller 20A features three sensor inputs: an intermediate-voltage input for an intermediate voltage $V_X$, an output-voltage input for the output voltage $V_O$, and an optional input-voltage input for the input voltage $V_{IN}$. The controller 20A has two other inputs: a clock input to receive a clock signal CLK and a reference input to receive a reference voltage $V_{REF}$. Examples of the various signals above, as well as others to be described below, can be seen in FIG. 16.

Based on the aforementioned inputs, the controller 20A provides a first control signal $\phi$ to control switches in the switched-capacitor element 12A and a second control signal PWM to control switching of the regulating circuit 16A. The first control signal is a two-dimensional vector having first and second complementary phases $\phi$, $\bar{\phi}$. In some embodiments, the first control signal is a vector having higher dimensionality. In the illustrated embodiment, the second control signal PWM is a scalar. However, in multi-phase embodiments described below, the second control signal PWM is also a vector.

The controller 20A relies on the clock signal CLK and the intermediate voltage $V_X$ to set the period of the second control signal PWM for controlling the regulating circuit 16A. A comparison between the reference voltage $V_{REF}$ and the output voltage $V_O$ provides a basis for controlling the output voltage $V_O$.

The controller 20A synchronizes operation of the switching network 12A and the regulating circuit 16A. It does so by synchronizing a ripple on the intermediate voltage $V_X$ with the second control signal PWM. Such synchronization relaxes the requirement of running the regulation circuit 16A at a significantly higher frequency than the switching network 12A in an attempt to achieve effective feed-forward control.

The control method described herein also avoids glitches inherent in changing the switching frequency of the switching network 12A. It does so by making use of a regulating circuit 16A that draws discontinuous input current. An example of such a regulating circuit 16A is one that uses a buck converter.

Figure 15:
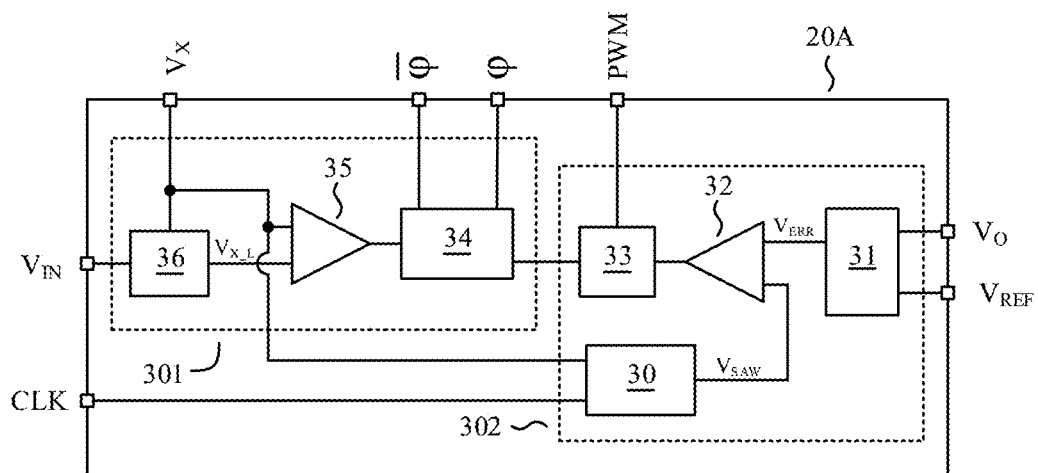
FIG. 15 shows details of the control circuitry shown in FIG. 14.

Referring now to FIG. 15, the controller 20A has a switched-capacitor section 301 and a regulator section 302. These can be on the same die or on different dies.

The switched-capacitor section 301 outputs the first control signal $\phi$. The complementary first and second phases $\phi$, $\bar{\phi}$ that make up the first control signal are shown as the last two traces in FIG. 16.

The switched-capacitor section 301 has an undershoot limiter 36 that receives the input voltage $V_{IN}$ and the intermediate voltage $V_X$. Based on these, the undershoot limiter 36 determines a trigger level $V_{X\_L}$. The trigger level $V_{X\_L}$ is shown as a dashed horizontal line superimposed on the sixth trace on FIG. 16. The switched capacitor section 301 ultimately uses this trigger level $V_{X\_L}$ to determine when it is time to generate the first control signal $\phi$. The details of how this is done are described below.

After having generated the trigger level $V_{X\_L}$ based on the input voltage $V_{IN}$ and the intermediate voltage $V_X$, the undershoot limiter 36 provides it to a first comparator 35. The first comparator 35 then compares the trigger level $V_{X\_L}$ with the intermediate signal $V_X$. Based on the comparison, the first comparator 35 provides a first trigger signal to a first control signal generator 34, which ultimately outputs the first control signal $\phi$.

The switched capacitor section 301 thus forms a first feedback loop that manipulates the first control signal $\phi$ in an effort to control the intermediate voltage $V_X$ based on the combination of the intermediate voltage $V_X$ and the input voltage $V_{IN}$.

The first control signal generator 34 does not generate the first control signal $\phi$ immediately. Instead, the first control signal generator 34 waits for an opportune moment to do so. The occurrence of this opportune moment depends on what the regulator section 302 is doing.

While the switched capacitor section 301 is busy providing the first trigger signal to the first control signal generator 34, the regulator section 302 is also busy generating the second control signal PWM. The regulator section 302 begins this process with a voltage compensator 31 that receives a voltage output $V_O$ and a reference voltage $V_{REF}$. From these, the voltage compensator 31 generates an error voltage $V_{ERR}$.

Figure 16:
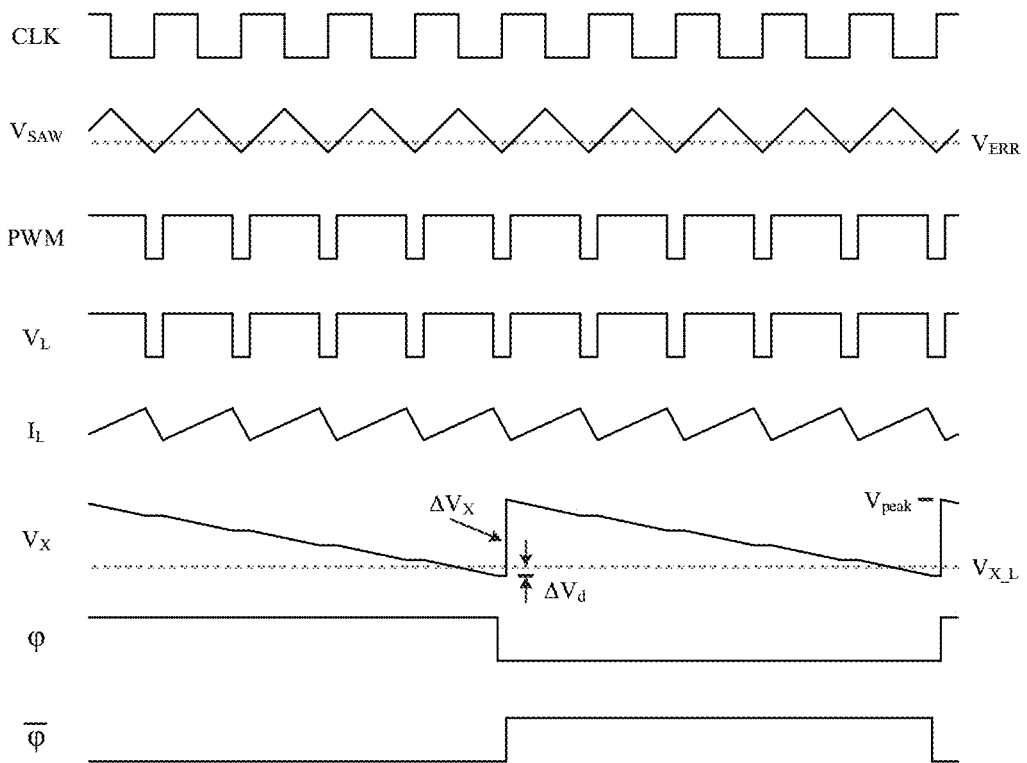
FIG. 16 shows signals present during operation of the control circuitry of FIG. 15.

Some implementations of the voltage compensator 31 include linear voltage-mode control and peak current-mode control. However, other modes are possible. Assuming linear voltage-mode control for the regulation circuit 16A, the voltage compensator 31 compares the output voltage $V_O$ of the power converter 10 with a reference voltage $V_{REF}$ and provides an error signal $V_{ERR}$ to a second comparator 32. This error signal $V_{ERR}$ is shown in FIG. 16 superimposed on a serrated waveform $V_{SAW}$ on the second trace shown in FIG. 16.

The regulator section 302 thus forms a second feedback loop that manipulates the second control signal PWM in an effort to control the output voltage $V_O$ based on the combination of a reference signal $V_{REF}$ and the output voltage $V_O$. However, for reasons discussed in more detail below, the switched capacitor section 301 and the regulator section 302 do not operate independently. Instead, the controller 20A synchronizes their operation.

To provide a basis for such synchronization, the regulator section 302 includes a saw-tooth generator 30. The saw-tooth generator 30 generates the serrated waveform $V_{SAW}$ based on a clock signal CLK and the intermediate voltage $V_X$. This serrated waveform $V_{SAW}$ ultimately provides a way to synchronize the first control signal $\phi$ and the second control signal PWM.

The second comparator 32 compares the error voltage $V_{ERR}$ with the serrated waveform $V_{SAW}$ and outputs a second trigger signal based on this comparison. As shown in FIG.

16, the second control signal PWM changes state in response to a change in the sign of the difference between the error voltage $V_{ERR}$ and the serrated waveform $V_{SAW}$. Since the serrated waveform $V_{SAW}$ is ultimately based on the intermediate voltage $V_X$, this provides a basis for synchronizing the operation of the switched-capacitor section 301 and the regulator section 302.

The second control signal generator 33 receives the second trigger signal from the second comparator 32 and uses it as a basis for generating the second control signal PWM.

Figure 18:
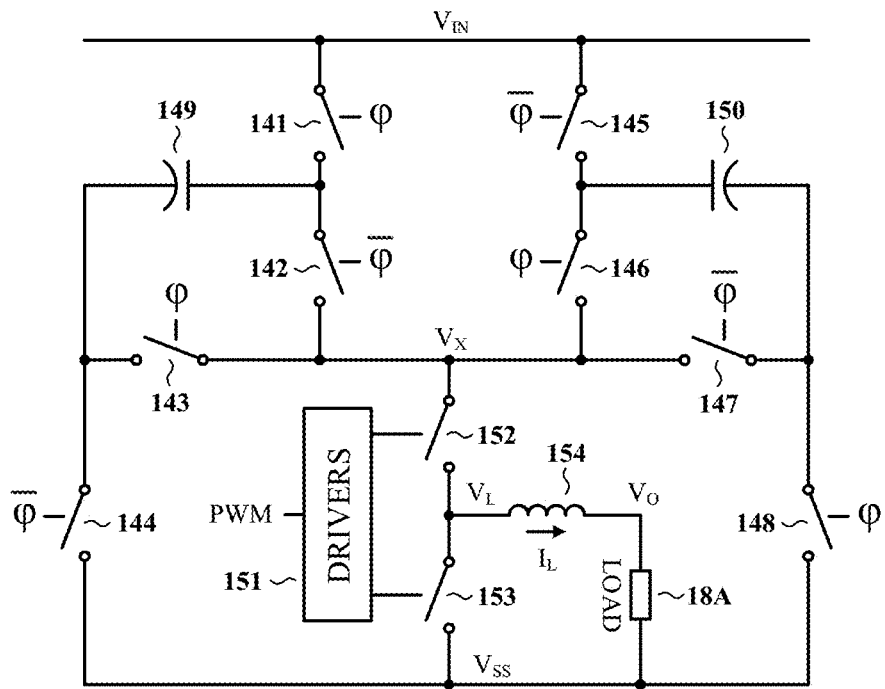
FIG. 18 shows details of switch layout in a converter similar to that shown in FIG. 1.

This second control signal PWM ultimately serves as a gate drive to actually drive the gate of a transistor that implements a main switch 152 in a regulating circuit 16A, details of which are seen in FIG. 18. This main switch 152 ultimately controls an inductor voltage $V_L$ and an inductor current $I_L$ across and through an inductor 154 within the regulating circuit 16A, as shown by the fourth and fifth traces in FIG. 16.

The particular configuration shown illustrates feed-forward control of the regulation circuit 16A implemented in the saw-tooth generator 30. However, such control could also be implemented in the voltage compensator 31.

The switched-capacitor section 301 implements a hysteretic control system in which a controlled variable, namely the intermediate voltage $V_X$, switches abruptly between two states based upon a hysteresis band. The intermediate voltage $V_X$ is a piecewise linear approximation of a serrated waveform.

Synchronization between the regulator section 302 and the switched capacitor section 301 is important to enable the dead-time interval of the switching network 12A to occur when no current is being drawn by the regulating circuit 16A.

In a practical switching network 12A, the first control signal ϕ will actually cycle through three states, not just two. In the first state, the first control signal ϕ opens a first set of switches and closes a second set of switches. In the second state, the first control signal ϕ closes the first set of switches and opens the second set of switches.

A practical difficulty that arises is that switches cannot open and close instantly. Nor can they be guaranteed to operate simultaneously. Thus, the first control signal ϕ cycles through a third state, which lasts for a dead-time interval DT. During this third state, all switches open. This minimizes the unpleasant possibility that a switch in the second set will not have opened by the time the switches in the first set have closed.

Meanwhile, certain regulating circuits 16A, such as buck converters and the like, draw input current discontinuously. In particular, such regulating circuits 16A have short intervals during which they are drawing zero current.

The controller 20A avoids glitches by synchronizing the operation of the switching network 12A and the regulating circuit 16A such that the regulating circuit 16A draws zero current during the dead-time interval DT.

Figure 17:
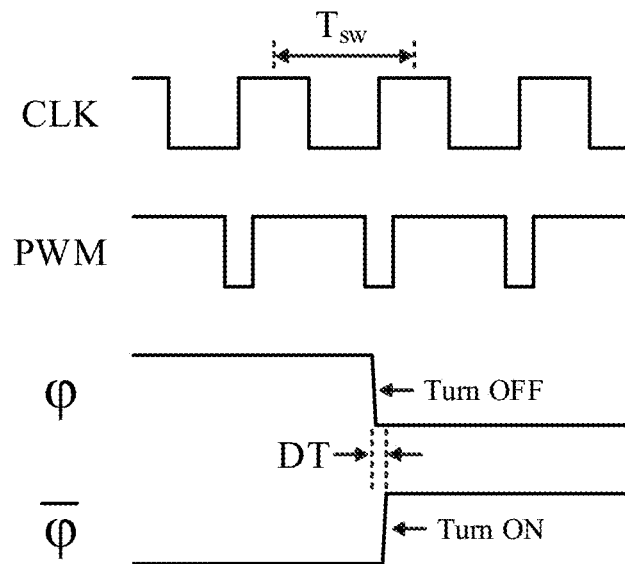
FIG. 17 is a close-up of four signals from FIG. 12 showing the dead-time interval.

A further benefit of such synchronization is the ability to cause switches in the switching network 12A to change state when there is no current flowing through them. This reduces commutation losses. Causing the dead-time interval DT to occur when the regulating circuit 16A is not drawing current, and causing switches in the switching network 12A to only change state at the beginning and the end of the dead-time interval DT thus ensures zero-current switching, as shown in FIG. 17.

In operation, the regulator section 302 and the switched capacitor section 301 cooperate to ensure that the length of one cycle of the first control signal ϕ will be equal to an integral number of cycles of the second control signal PWM. In FIG. 16, this constraint is met because the one cycle of the first control signal ϕ is equal to an integral number of cycles of the second control signal PWM.

The first control signal generator 34 receives a first trigger signal from the first comparator 35 indicating that the intermediate voltage $V_X$ has fallen below the trigger level $V_{X\_L}$. However, as alluded to above, the first control signal generator 34 does not act immediately. Instead, it waits until there is an opportune time to make a state change. Meanwhile, as the first control signal generator 34 waits, the intermediate voltage $V_X$ continues to fall, as shown in FIG. 16.

As shown in FIG. 16, by the time the first control signal generator 34 acts, the intermediate voltage will already have fallen to an undershoot $\Delta V_d$ below the trigger level $V_{X\_L}$. In most cases, the undershoot $\Delta V_d$ is small and capped by an undershoot cap of $\frac{1}{2}\Delta V_X$, which only occurs when the switching frequency of the regulator section 302 and the switched capacitor section 301 are equal. This undershoot cap depends on load current and input voltage $V_{IN}$.

Large variations in undershoot $\Delta V_d$ are undesirable because they stress the regulating circuit 18A. The undershoot limiter 36 selects a suitable trigger level $V_{X\_L}$ to limit this undershoot $\Delta V_d$ by indirectly controlling the undershoot cap $\frac{1}{2}\Delta V_X$. The undershoot limiter 36 uses the intermediate voltage $V_X$ and the input voltage $V_{IN}$ to select an appropriate value of the trigger level $V_{X\_L}$.

FIG. 17 shows a close up of selected waveforms in FIG. 16 at a scale that is actually large enough to show a dead-time interval DT between the two phases ϕ, $\bar{\phi}$ that make up the first control signal ϕ. To assist in discussion, it is useful to consider the circuit shown in FIG. 18, which was introduced earlier in a discussion of the function of the second control signal PWM.

FIG. 18 shows a first set of switches 141, 143, 146, 148, which is controlled by the first phase ϕ, and a second set of switches 142, 144, 145, 147, which is controlled by the second phase $\bar{\phi}$. FIG. 18 also shows the main switch 152 that connects the regulating circuit 16A to the switching network 12A. The main switch 152 has already been discussed above.

During this dead-time interval DT, the phases ϕ, $\bar{\phi}$ open all switches 141, 143, 146, 148, 142, 144, 145, 147. This dead-time interval DT must occur while the main switch 152 is open. This requirement sets a maximum possible duty cycle $D_{max}$ for the regulating circuit 16A during the switching transition of the first control signal ϕ:

$$D_{max} = \frac{T_{sw} - DT}{T_{sw}}$$

As is apparent from the above relationship, the dead-time DT places a limit on the maximum possible duty cycle $D_{max}$. It is therefore desirable to reduce the dead-time DT as much as possible to increase the range of possible transformation ratios for the regulating circuit 16A.

For many practical power converters, a desire for electromagnetic compatibility dictates that the regulating circuit 16A should operate at a constant switching frequency. In these cases, the above constraint on the maximum possible duty cycle $D_{max}$ is not overly burdensome, especially, if the feed-back controller for the regulation circuit 16A would otherwise have a maximum duty cycle requirement.

The control strategy as described above and implemented by the controller 20A in FIG. 15 is one of many possible implementations. In general, the switching frequency for switches 141, 143, 146, 148, 142, 144, 145, 147 in the switching network 12A will change in discrete steps as the load current of the power converter 10 varies.

Figure 19:
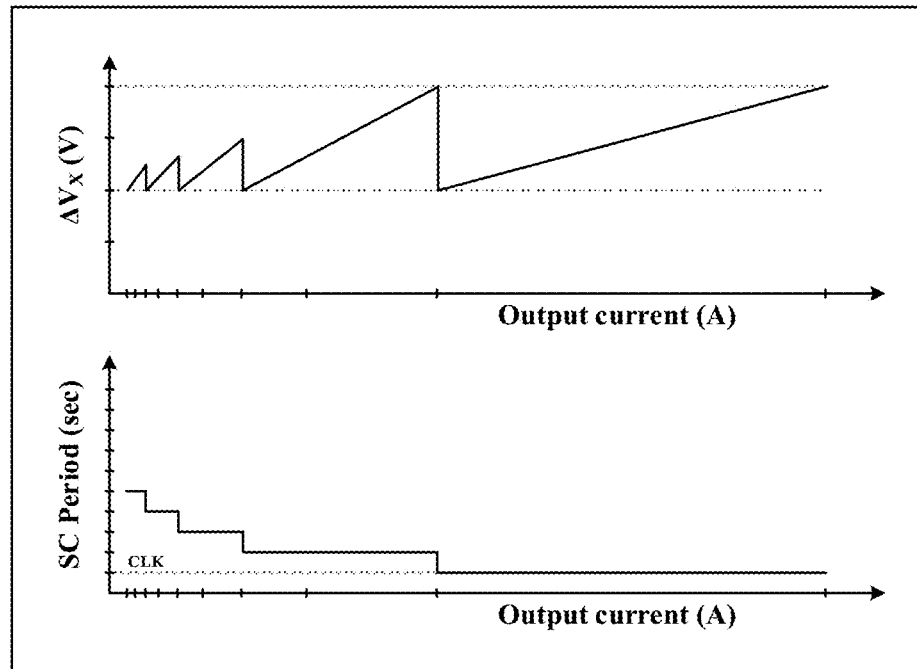
FIGS. 19 and 20 show dependence of switching period and peak-to-peak ripple as a function of output load current in two embodiments of the control circuitry as shown in FIG. 14.

FIG. 19 shows how the output current affects both the period with which the switches 141, 143, 146, 148, 142, 144, 145, 147 of the switching network 12A change state and the corresponding $\Delta V_X$ ripple.

For this particular control strategy, the ripple magnitude $\Delta V_X$ varies as a function of load current. In particular, the ripple magnitude $\Delta V_X$ defines a serrated waveform having a peak-to-peak amplitude that decreases with load current. As the load current approaches zero, the peak-to-peak amplitude approaches half of the maximum peak-to-peak amplitude. With a few modifications to the controller, it is also possible to get the $\Delta V_X$ ripple to approach the maximum peak-to-peak amplitude as the load current approaches zero, as shown in FIG. 20.

Figure 20:
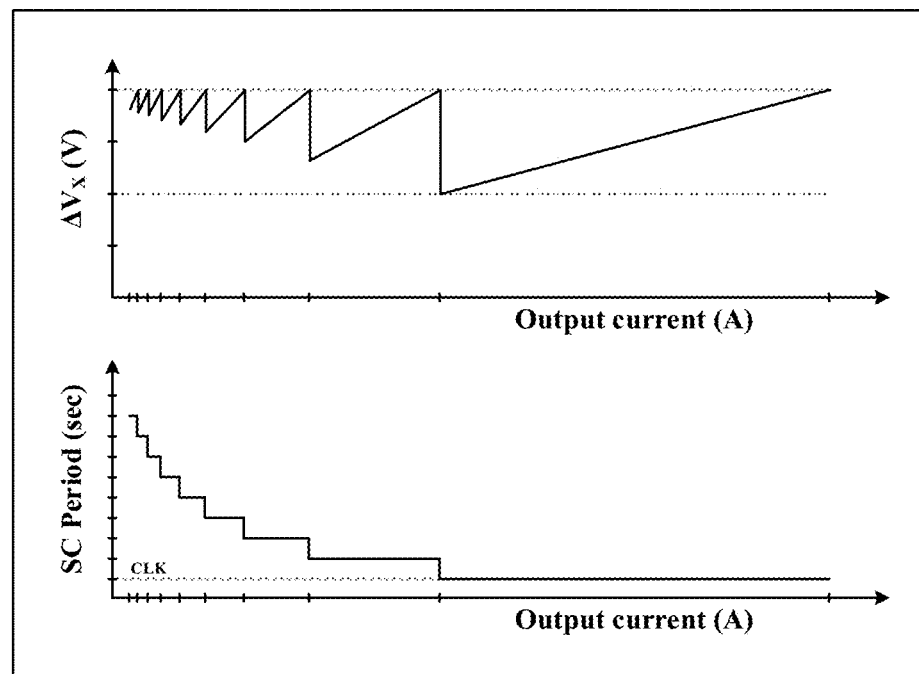

As is apparent from both FIGS. 19 and 20, as the load current increases, the switching period for the switches 141, 143, 146, 148, 142, 144, 145, 147 stays the same for a range of output currents. Within this range of output currents, the converter relies on the regulating circuit 16A to make up the difference between the voltage that the switching network 12A provides whatever voltage is required. At some point, the regulating circuit 16A can no longer make the necessary correction. At that point, the period takes a step down.

The controller 20A shown in FIG. 14 is a single-phase converter. As such, the first control signal ϕ is a two-dimensional vector and the second control signal PWM is a scalar. In the case of an N-phase converter, the first control signal ϕ is a 2N-dimensional vector and the second control signal PWM is an N-dimensional vector having components $PWM_1, PWM_2, \ldots PWM_n$ that are phase shifted relative to each other. Typically, the phase shift between these components is 360/N degrees.

Figure 21:
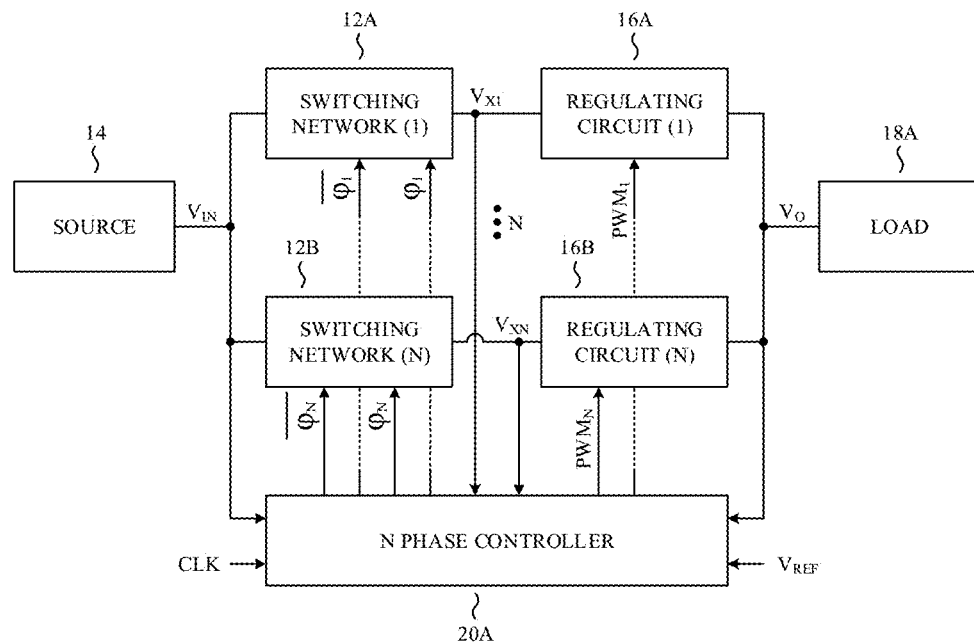
FIG. 21 shows a multi-phase converter similar to that shown in FIG. 14.

FIG. 21 shows an example of an N-phase converter having plural regulation circuits 16A, 16B. Each regulation circuit 16A, 16B has a corresponding switching network 12A, 12B. Each regulation circuit 16A, 16B is also driven by its own control signal, hence the need for an N-dimensional second control signal PWM. Each switching network 12A, 12B is driven by a pair of phases, hence the need for a 2N-dimensional first control signal.

An N-phase controller 20A controls the N-phase converter. The N-phase controller 20A is similar to the single-phase controller in FIG. 14 but with additional inputs for the N intermediate voltages $V_{X1}, V_{X2}, \ldots V_{XN}$.

Figure 22:
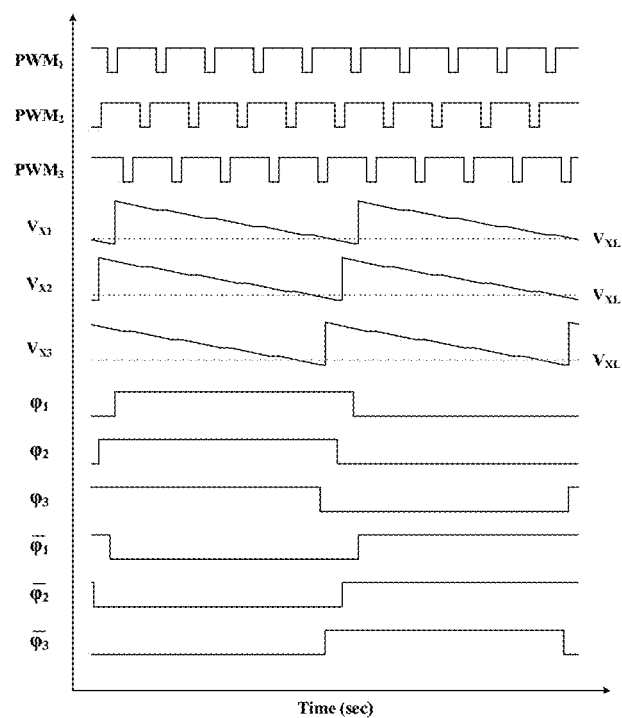
FIGS. 22 and 23 show signals present during operation of the control circuitry of FIG. 21.

FIG. 22 shows waveforms similar to those shown in FIG. 16 but for a three-phase version of the controller shown in FIG. 14.

As shown in FIG. 22, the second control signal PWM consists of second control signal elements $PWM_1, PWM_2, PWM_3$ that are separated from each other by a delay time that corresponds to a 120° phase shift between them. The three intermediate voltages $V_{X1}, V_{X2}, V_{X3}$ are shifted from each other by an integer multiple of this delay time. In FIG. 22, the integer is unity. However, as shown in FIG. 23, other integers are possible.

Because the periods of the intermediate voltages $V_{X1}, V_{X2}, V_{X3}$ are longer than those of the second control signal elements $PWM_1, PWM_2, PWM_3$, shifting them by the delay time will not cause them to be 120 degrees out of phase with each other. In fact, because their period is so much longer, a shift by this delay time only causes a very small phase shift in the intermediate voltages $V_{X1}, V_{X2}, V_{X3}$.

Figure 23:
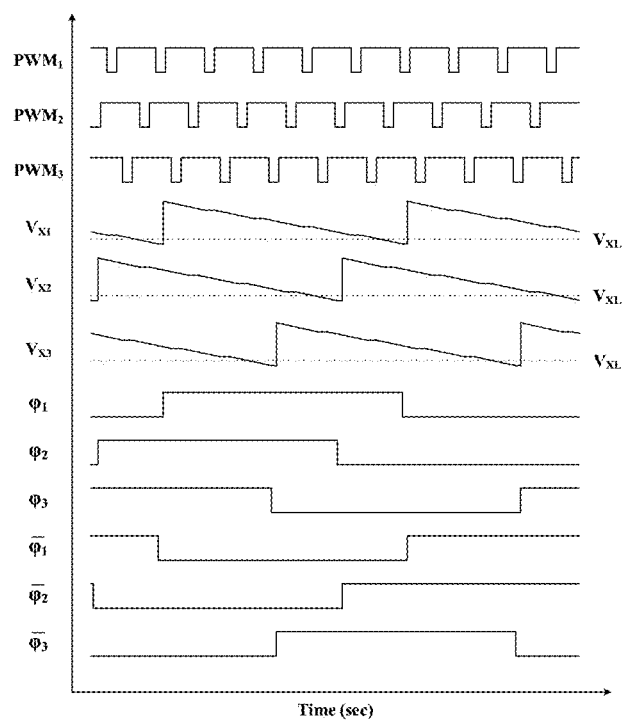

FIG. 23 shows an alternative method of operation similar to that shown in FIG. 22, but with the intermediate voltages $V_{X1}, V_{X2}, V_{X3}$ having been shifted by a larger multiple of the delay time. This results in a more significant phase shift between the intermediate voltages $V_{X1}, V_{X2}, V_{X3}$, a result of which is a reduced ripple in the output voltage $V_O$.

A multi-phase controller 20A for controlling the N-phase converter shown in FIG. 21 can be thought of as N single-phase controllers 20A as shown in FIG. 15 operating in parallel but with a specific phase relationship between them. A multi-phase controller 20A would thus look very similar to the one in FIG. 15, but with an additional input and output signals. In general, the intermediate voltages ($V_{X1}, V_{X2}, \ldots V_{XN}$) and the output voltage $V_O$ are required for proper operation of the controller 20A.

Figure 24:
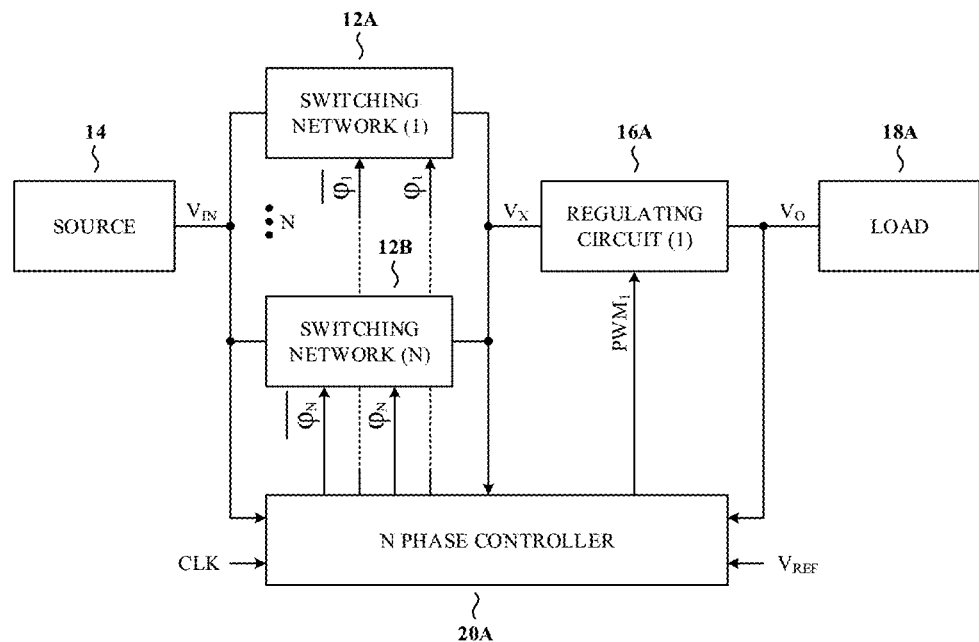
FIG. 24 shows another power converter similar to that shown in FIG. 14 but with one regulator and plural switching networks.

FIG. 24 shows a converter similar to that shown in FIG. 21, but having only one regulation circuit 16A that is connected to plural switching networks 12A, 12B. Since there is only one regulation circuit 16A, only a 1-dimensional second control signal PWM is required. Each switching network 12A, 12B is driven by a pair of phases, hence the need for a 2N-dimensional first control signal.

Figure 25:
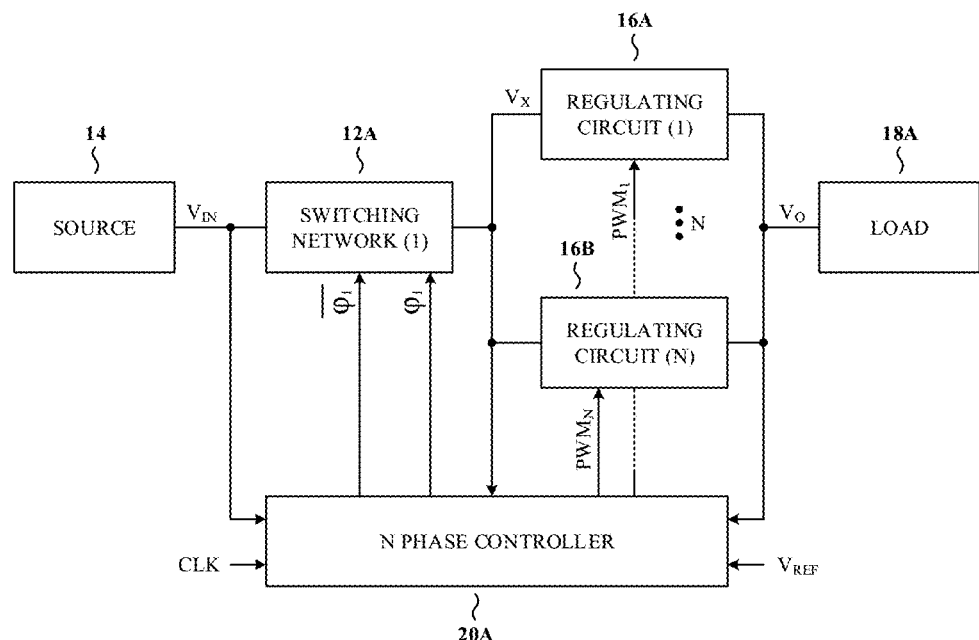
FIG. 25 shows another power converter similar to that shown in FIG. 14 but with one switching network and plural regulators.

FIG. 25 shows a converter that is essentially the converse of FIG. 24. In FIG. 25, the converter has plural regulation circuits 16A, 16B, all of which are coupled to the same switching network 12A. Each regulation circuit 16A, 16B is driven by its own control signal, hence the need for an N-dimensional second control signal PWM. The sole switching network 12A is driven by a pair of phases, hence the need for a 2-dimensional first control signal.

Figure 26:
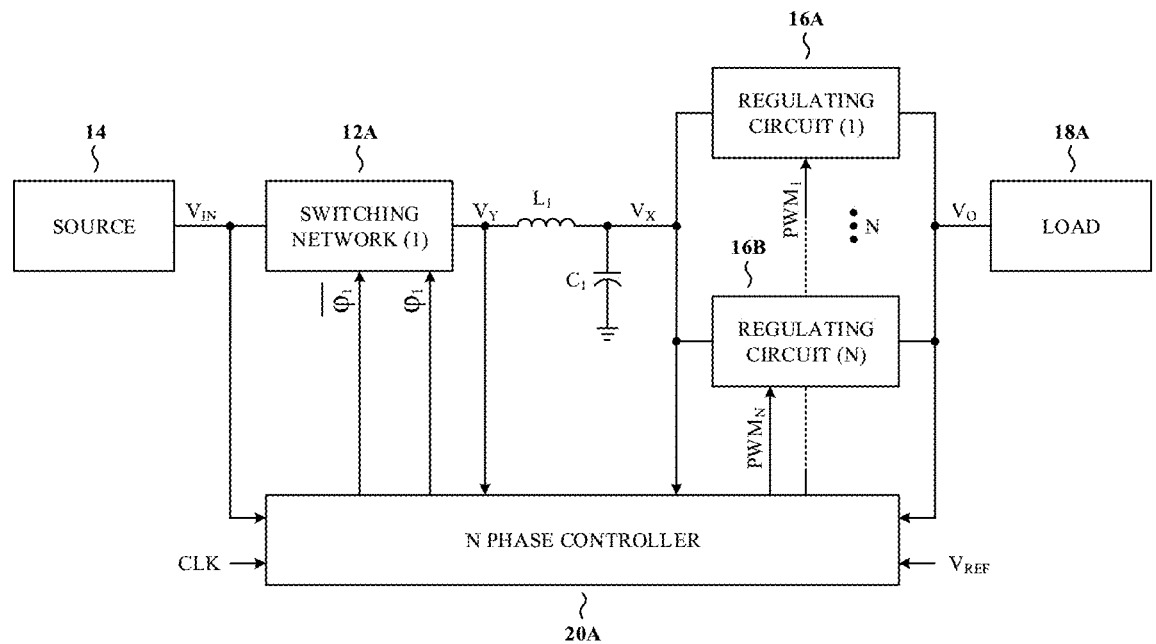
FIG. 26 shows a power converter similar to that shown in FIG. 25 but with a filter between the switching network and the regulators.

FIG. 26 shows a converter similar to that shown in FIG. 25, but with an inductance $L_1$ connected to both the output of the switching network 12A and to the inputs of the regulating circuits 16A, 16B. A grounded capacitor $C_1$ provides a place to store excess charge during operation. The N-phase controller 20A observes both a switching-network's output voltage $V_Y$ and a regulating circuits' input voltage $V_X$.

Figure 27:
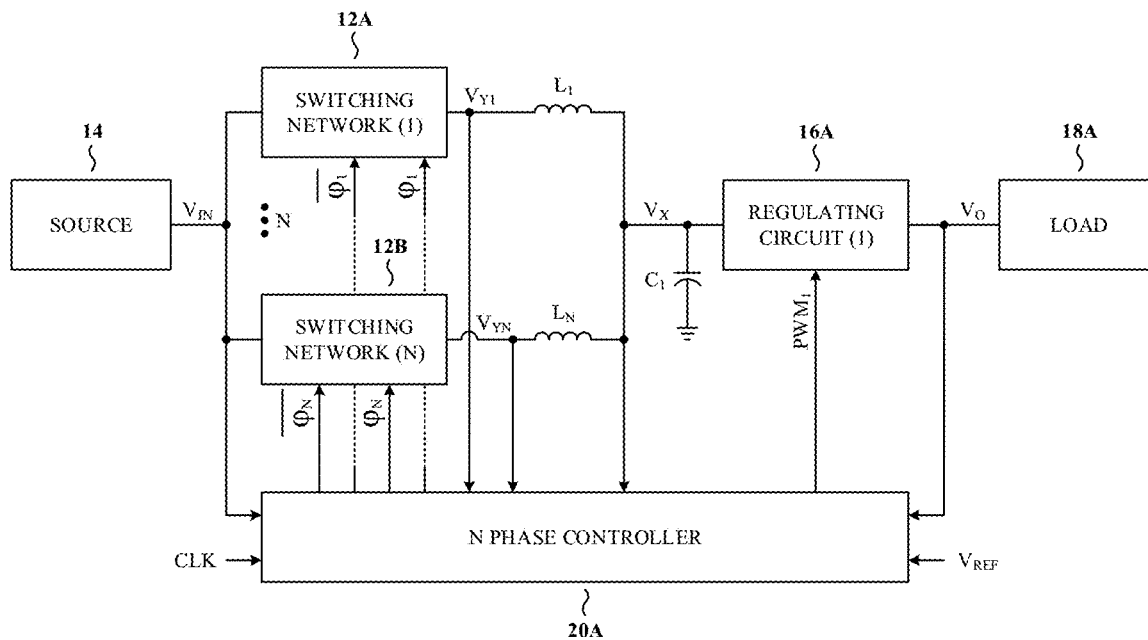
FIG. 27 shows a power converter similar to that shown in FIG. 24 but with a filter between the switching networks and the regulator.

FIG. 27 shows a converter similar to that shown in FIG. 24 but with an inductance $L_1 \ldots L_N$ connected to the outputs of each of the switching networks 12A, 12B and to the input of the regulating circuit 16A. A grounded capacitor $C_1$ provides a place to store excess charge during operation. The N-phase controller 20A uses the switching-networks' output voltages $V_{Y1} \ldots V_{YN}$ and the regulating circuit's input voltage $V_X$ to generate suitable control signals.

In FIG. 14, a non-capacitive regulating circuit 16A loads down the switching network 12A. This regulating circuit 16A is switched at a high frequency. The components from the high-frequency switching of the regulating circuit 16A are ultimately superimposed on the lower frequency serrated waveform of the intermediate voltage $V_X$, as shown in sixth trace on FIG. 16. The duty cycle of the saw-tooth approximation waveform depends on the topology of the switching network 12A. In general, the frequency of the complementary switching-network control signals varies with changes in response to changes in the slope of the intermediate signal. These changes, in turn, arise as a result of changes in the power converter's operating point.

The switching network 12A and the regulating circuit 16A are essentially modular and can be mixed and matched in a variety of different ways. As such, the configuration shown in FIG. 11 represents only one of multiple ways to configure one or more switching networks 12A with one or more regulating circuits 16A to form a multi-stage converter 10.

For example, FIG. 28 shows a bidirectional version of FIG. 11 in which power can flow either from a voltage source 14 to a load 18A or from the load 18A to the voltage source 14 as indicated by the arrows.

There are two fundamental elements described in connection with the following embodiments: switching networks 12A and regulating circuits 16A. Assuming series connected elements of the same type are combined, there are a total of four basic building blocks. These are shown FIGS. 28, 29, 30, and 32. The power converters disclosed herein include at least one of the four basic building blocks. More complex converter can be realized by combining the fundamental building blocks.

The first building block, shown in FIG. 28, features a switching network 12A whose output connects to an input of a regulating circuit 16A. The second building block, shown in FIG. 29, features a first switching network 12A whose output connects to a regulating circuit 16A via a first intermodule link 11A, an output of which connects to an input of a second switching network 12B via a second intermodule link 11B. In the third building block shown in FIG. 30, an output of a regulating circuit 16A connects to an input of a switching network 12A via an intermodule link 11B. A fourth building block, shown in FIG. 33, features a first regulating circuit 300A having an output that connects to an input of a first switching network 200, an output of which connects to an input of a second regulating circuit 300B.

Additional embodiments further contemplate the application of object-oriented programming concepts to the design of power converters by enabling switching networks 12A and regulating circuits 16A to be "instantiated" in a variety of different ways so long as their inputs and outputs continue to match in a way that facilitates modular assembly of power converters having various properties.

The switching network 12A in many embodiments is instantiated as a switched-capacitor network. Among the more useful switched capacitor topologies are: Ladder, Dickson, Series-Parallel, Fibonacci, and Doubler, all of which can be adiabatically charged and configured into multi-phase networks. A particularly useful switching capacitor network is an adiabatically charged version of a full-wave cascade multiplier. However, diabatically charged versions can also be used.

As used herein, changing the charge on a capacitor "adiabatically" means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an "adiabatically charged switching network" is a switching network having at least one capacitor that is both adiabatically charged and adiabatically discharged. A "diabatically charged switching network" is a switching network that is not an adiabatically charged switching network.

The regulating circuit 16A can be instantiated as any converter with the ability to regulate the output voltage. A buck converter for example, is an attractive candidate due to its high efficiency and speed. Other suitable regulating circuits 16A include boost converters, buck/boost converters, fly-back converters, forward converters, half-bridge converters, full-bridge converters, Cuk converters, resonant converters, and linear regulators. The fly-back converter can more specifically be a quasi-resonant fly-back converter, or an active-clamp fly-back converter, or an interleaved fly-back converter, or a two-switch fly-back converter. Likewise, the forward converter can be more specifically a multi-resonant forward converter, or an active-clamp forward converter, or an interleaved forward converter, or a two-switch forward converter. And, the half-bridge converter can more specifically be an asymmetric half-bridge converter, or a multi-resonant half-bridge converter, or a LLC resonant half-bridge.

In the embodiment shown in FIG. 28, a source voltage 14 provides an input to a first switching network 12A, which is instantiated as a switching capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switching capacitor network. A high voltage output of this second switching network 12B is then applied to a load 18A.

An embodiment such as that shown in FIG. 28 can be configured to regulate the load 18A or to regulate the voltage source 14 depending on the direction of energy flow.

Figure 30:
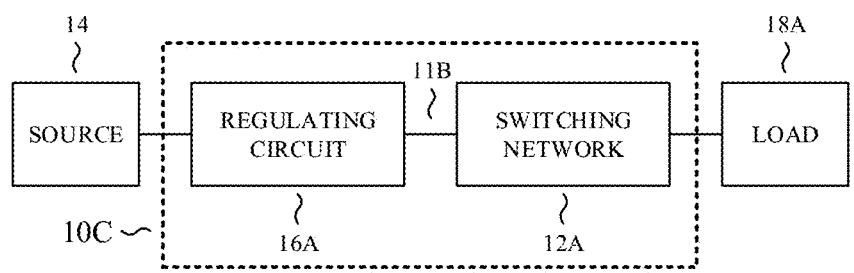

In another embodiment, shown in FIG. 30, a low voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 30 can be used to regulate the voltage source 14 or the load 18A depending on the direction of energy flow.

Figure 31:
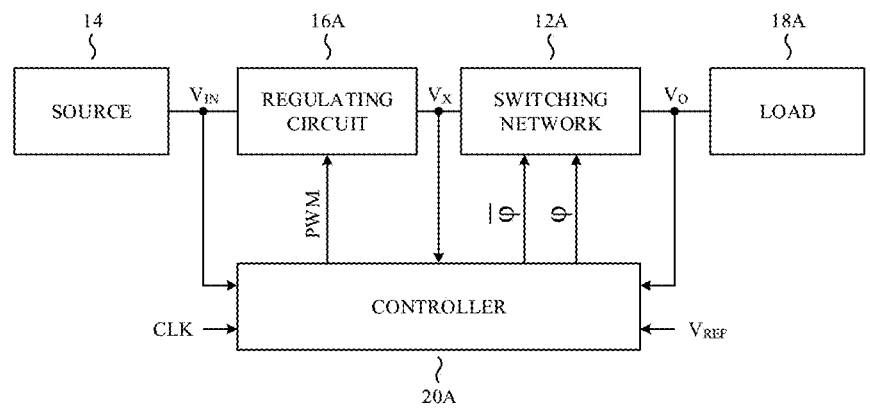
FIG. 31 shows a DC-DC converter like that shown in FIG. 30 with a controller.

FIG. 31 shows the modular DC-DC converter 10C of FIG. 30, but with a controller 20A explicitly shown. The controller 20A is similar to that described in connection with FIG. 15.

As was discussed in connection with FIG. 15, the controller 20A features three sensor inputs, one for an intermediate voltage $V_X$, one for the output voltage $V_O$, and an optional one for the input voltage, $V_{IN}$. The controller 20A also has two inputs that are not sensor inputs. One non-sensor input receives a clock signal CLK and the other receives a reference voltage $V_{REF}$. The clock signal CLK is used to set the period of a second control signal PWM and the reference voltage $V_{REF}$ is used to set the desired output voltage. Based on these inputs, the controller 20A outputs a first control signal having two phases to the switched-capacitor element 12A and a second control signal PWM to control switching of the regulating circuit 16A. This second control signal PWM is a pulse-width modulated signal.

Figure 32:
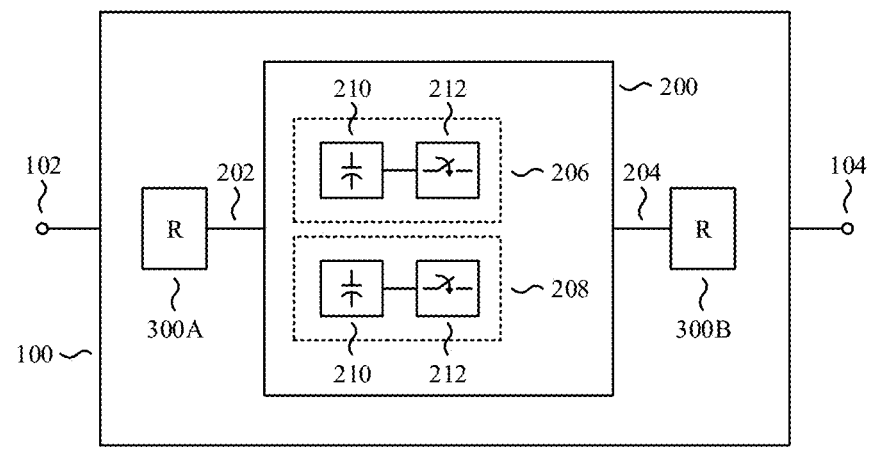
FIG. 32 shows another configuration of a DC-DC converter.

Referring now to FIG. 32, another embodiment of a converter 100 includes a first regulating circuit 300A connected to a converter input 102 and a second regulating circuit 300B connected to a converter output 104. Between the first and second regulating circuits 300A, 300B is a switching network 200 having a switching network input 202 and a switching network output 204. The switching network 200 includes charge storage elements 210 interconnected by switches 212. These charge storage elements 210 are divided into first and second groups 206, 208.

Figure 33:
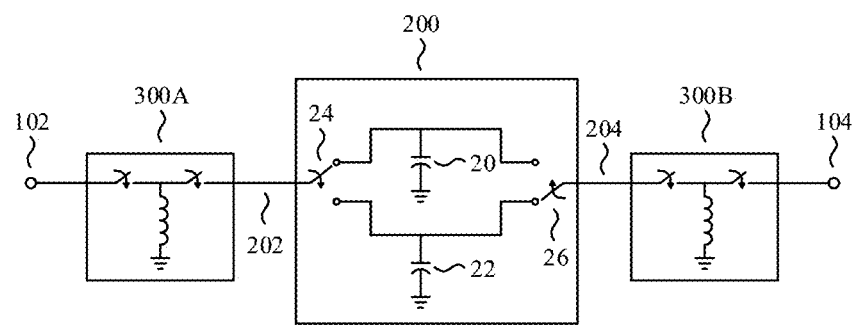
FIG. 33 shows a particular implementation of the power converter illustrated in FIG. 32.

In some embodiments, the switching network 200 is a bidirectional switching capacitor network such as that shown in FIG. 33.

The switching capacitor network in FIG. 33 features a first capacitor 20 and a second capacitor 22 in parallel. A first switch 24 selectively connects one of the first and second capacitors 20, 22 to a first regulating circuit 300A, and a second switch 26 selectively connects one of the first and second capacitors 20, 22 to the second regulating circuit 300B. Both the first and second switches 24, 26 can be operated at high frequency, thus facilitating the adiabatic charging and discharging of the first and second capacitors 20, 22.

The particular embodiment shown in FIG. 33 has a two-phase switching network 200. However, other types of switching networks can be used instead.

Figure 34:
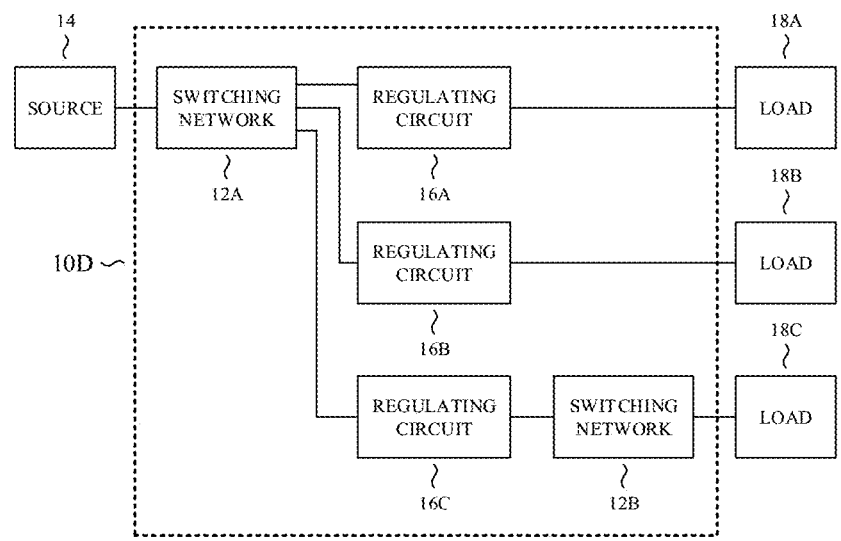
FIG. 34 shows an embodiment with multiple regulating circuits.

In yet another embodiment, shown in FIG. 34, multiple regulating circuits 16A, 16B, 16C are provided at an output of a first switching network 12A for driving multiple loads 18A-18C. For one of the loads 18C, a second switching network 12B is provided between the load 18C and the corresponding regulating circuit 16C thus creating a pathway similar to that shown in FIG. 30. FIG. 34 thus provides an example of how the modular construction of regulating circuits and switching networks facilitates the ability to mix and match components to provide flexibility in DC-DC converter construction.

A switched-capacitor power converter includes a network of switches and capacitors. By cycling the network through different topological states using these switches, one can transfer energy from an input to an output of the switched-capacitor network. Some converters, known as "charge pumps," can be used to produce high voltages in flash and other reprogrammable memories.

Figure 35:
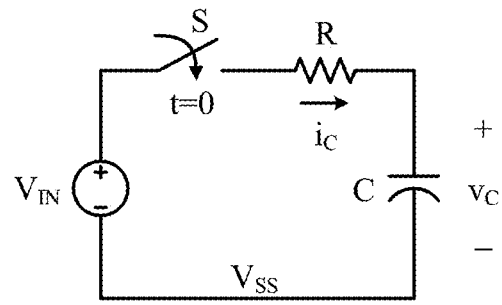
FIG. 35 shows an RC circuit.

To help understand the loss mechanisms in switched capacitor converters, it is instructive to first analyze the classical capacitor charging problem, as depicted in FIG. 35.

FIG. 35 shows a capacitor C initially charged to some value $V_c(0)$. At t=0 the switch S is closed. At that instant, a brief surge of current flows as the capacitor C charges to its final value of $V_{IN}$. The rate of charging can be described by a time constant $\tau$=RC, which indicates the time it takes the voltage to either rise or fall to within 1/e of its final value. The instantaneous values for voltage across the capacitor $v_c(t)$ and current through the capacitor $i_c(t)$ are given by the following equations:

$$v_c(t) = v_c(0) + [V_{in} - v_c(0)](1 - e^{-t/RC}), \text{ and}$$

$$i_c(t) = C\frac{dv_c}{dt} = \frac{V_{in} - v_c(0)}{R}e^{-t/RC}.$$

The energy loss incurred while charging the capacitor can be found by calculating the energy dissipated by resistor R, which is $$E_{loss}(t)=\int_{t=0}^{\infty} i_R(t) \times v_R(t)dt = \int_{t=0}^{\infty}[i_c(t)]^2 R dt.$$

The equation can be further simplified by substituting the expression for $i_c(t)$ into the equation above. Evaluating the integral then yields $$E_{loss}(t)=\frac{1}{2}[V_{in}-v_c(0)]^2 C[1-e^{-2t/RC}].$$

It is apparent therefore that the only term that involves the resistance is in a decaying exponential. Thus, if the transients are allowed to settle (i.e. t→∞), the total energy loss incurred in charging the capacitor is independent of its resistance R. In that case, the amount of energy loss is equal to $$E_{loss}(\infty)=\frac{1}{2}C\Delta v_c^2.$$

Figure 36:
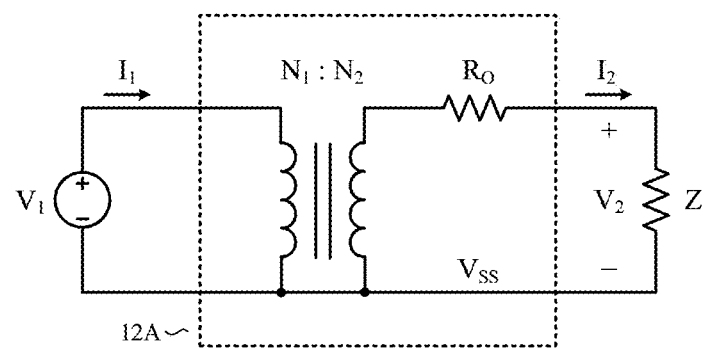
FIG. 36 shows a model of a switched capacitor DC-DC converter.

A switched-capacitor converter can be modeled as an ideal transformer, as shown in FIG. 36, with a finite output resistance $R_o$ that accounts for the power loss incurred in charging or discharging of the energy transfer capacitors, as shown in FIG. 36. The embodiment shown in FIG. 36 is non-isolated because the negative terminals on both sides of the transformer are connected. However, this is by no means required. As an example, FIG. 37 shows an embodiment in which the same terminals are not connected, in which case the converter is isolated.

It should be noted that the transformer shown is only for modeling purpose. A converter of this type would generally not have windings wrapped around an iron core. The power losses associated with charging and discharging are typically dissipated in the ON resistance of the MOSFETs and equivalent series resistance of the capacitors.

The output voltage of the switched-capacitor converter is given by $$V_o = V_{in}\frac{N_2}{N_1} - I_o R_o.$$

There are two limiting cases where the operation of switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, $R_o$ of the converter operating in the fast-switching limit is a function of parasitic resistance and $R_o$ is given by:

$$R_o|_{\tau \gg T_{sw}} = R_{FSL} = n\sum_{i \in sw}\sum_{j=1}^{n} R_i (a_{r,i}^j)^2.$$

Although it tends to under-estimate $R_o$, a useful approximation for $R_o$ that serves as a good starting point in the design process is given by $$R_o(f) \approx \sqrt{R_{FSL}^2 + R_{SSL}^2}.$$

In the slow-switching limit, the switching period $T_{sw}$ is much longer than the RC time constant $\tau$ of the energy transfer capacitors. Under this condition, a systemic energy loss given by $\frac{1}{2}C \times \Delta V_c^2$ occurs regardless of the resistances of the capacitors and switches. This systemic energy loss arises in part because the root mean square (RMS) of the charging and discharging current is a function of the RC time constant. Under these circumstances, $R_o$ is given by $$R_o|_{\tau \ll T_{sw}} = R_{SSL} = n\sum_{i \in caps}\sum_{j=1}^{n} \frac{(a_{c,i}^j)^2}{2C_i f_{sw}}.$$

Figure 38:
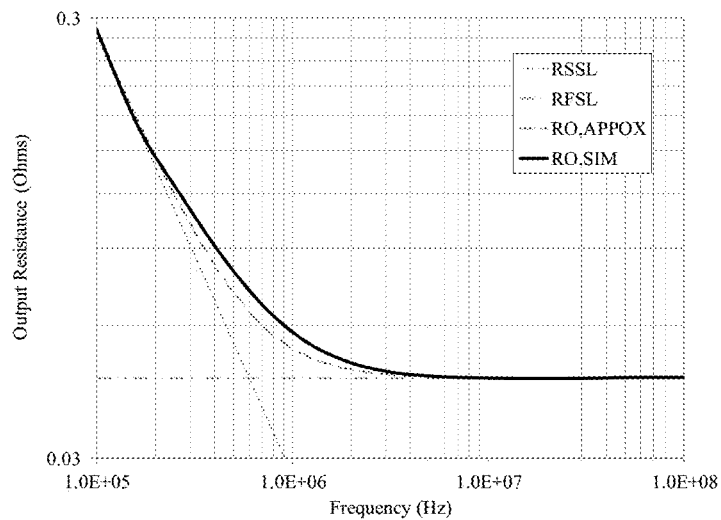
FIG. 38 shows output resistance of a switched-capacitor network as a function of switching frequency.

The behavior of output resistance as a function of frequency can be appreciated by inspection of FIG. 38, which shows that as frequency increases, the output resistance drops in a manner consistent with the $1/f_{sw}$ term and that at higher frequencies, the output resistance settles down to a steady value.

The calculations for $R_{SSL}$ and $R_{FSL}$ given above are based on the charge multiplier vector concept. The vector $a^1$ through $a^n$ can be obtained by inspection for any standard well posed n-phase converter. The charge multiplier vectors are computed using constraints imposed by Kirchoff's current law in each topological state along with the steady-state constraint that the n charge multiplier quantities must sum to zero on each capacitor.

Once $R_o$ is known, the conduction loss $P_{cond}$ can be calculated by $$P_{cond} = I_o^2 R_o.$$

Additionally, other losses such as switching losses, driver losses, and control losses can be calculated. Preferably, the switching loss is comparable to conduction loss. These losses, which originate from charging and discharging the transistor nodes, are given by $$P_{sw} = W_{sw} f_{sw} = (W_{ds} + W_{on} + W_g) f_{sw}$$

where $W_g$ is the gate capacitance loss, $W_{on}$ is the overlap or commutation loss, and $W_{ds}$ is the output capacitance loss. Thus, the total converter loss can be calculated using $$P_{loss} = I_o^2 R_o + W_{sw} f_{sw} + P_{etc}.$$

Once $R_o$ and the additional loss mechanisms have been determined, the total efficiency of the converter is given by $$\eta_{sc} = \frac{P_o}{P_o + P_{loss}} = \frac{P_o}{P_o + P_{cond} + P_{sw} + P_{etc}}.$$

To optimize efficiency of the switched-capacitor converter, the optimal switching frequency, capacitance, and device sizes must be selected. If the switching frequency is too low, then the conduction losses, $P_{cond}$, dominate. On the other hand, if the switching frequency is too high, then $P_{sw}$ dominates. Although doing so tends to decrease output ripple, rarely will a switched-capacitor converter operate far above the transitional region between the slow switching limit and fast switching limit. After all, operating above this region tends to increase switching losses without lowering the output resistance to compensate for those increases switching losses. Thus, there is little to gain by operating above that region.

If the effective resistance $R_{eff}$ of the charging path is reduced, for example by reducing the RC time constant, the RMS current increases and it so happens that the total charging energy loss ($E_{loss} = I_{RMS}^2 R_{eff} = \frac{1}{2} C \times \Delta V_{C2}$) is independent of $R_{eff}$. One solution to minimize this energy loss is to increase the size of the pump capacitors in the switched capacitor network.

Although many switched-capacitor networks can provide a specific voltage transformation, most of them are impractical for a variety of reasons. A practical switched-capacitor network typically has a large transformation ratio, low switch stress, low DC capacitor voltage, and low output resistance. Suitable topologies for the converters described herein include Ladder, Dickson, Series-Parallel, Fibonacci, and Doubler topologies.

Figure 39:
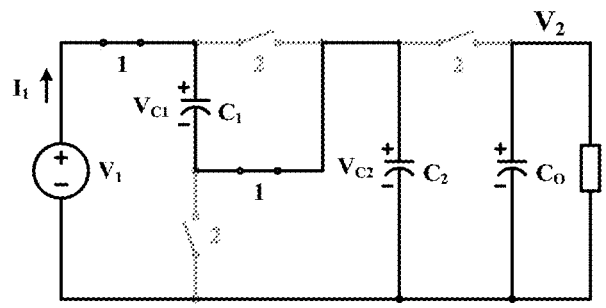
FIGS. 39-40 show a series-parallel SC converter operating in charge phase and discharge phase respectively.
Figure 40:
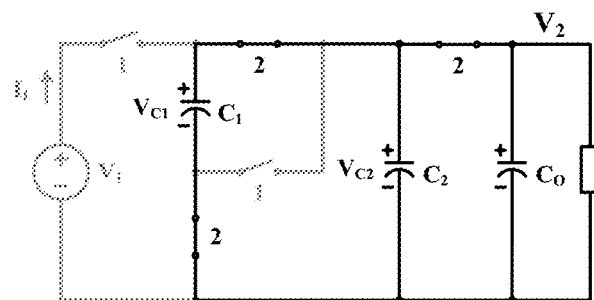

One useful converter is a series-parallel switched capacitor converter. FIGS. 39-40 show a 2:1 series-parallel switched-capacitor converter operating in charge phase and in discharge phase respectively. During the charge phase, the capacitors are in series. In the discharge phase, the capacitors are in parallel. In its charge phase the capacitor voltages $v_{C1}$ and $v_{C2}$ add up to $V_1$ while in its discharge phase $v_{C1}$ and $v_{C2}$ equal $V_2$. This means that $V_2 = V_1/2$.

Figure 41:
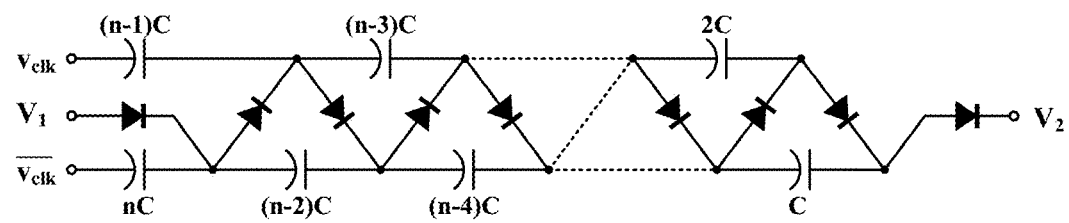
FIG. 41 shows a series pumped symmetric cascade multiplier with diodes.
Figure 42:
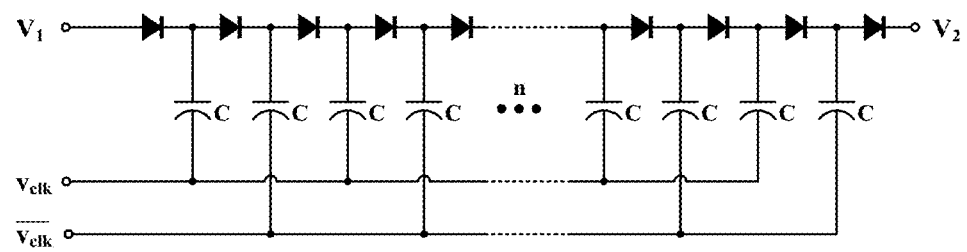
FIG. 42 shows a parallel pumped symmetric cascade multiplier with diodes.
Figure 43:
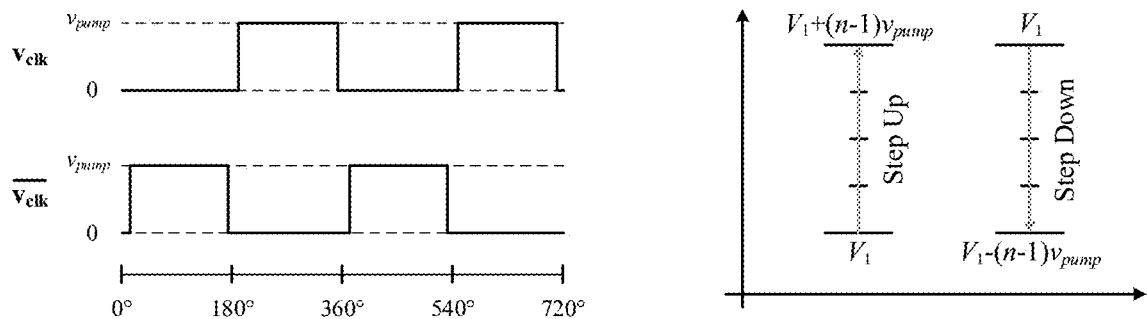
FIG. 43 shows charge pump signals.

Another useful topology is that shown in FIGS. 41 and 42. In both charge pumps, the source is located at $V_1$ and the load is located at $V_2$. In these types of charge pumps, packets of charge are pumped along a diode chain as the coupling capacitors are successively charged and discharged. As shown in FIG. 43, clock signals $v_{clk}$ and $\overline{v_{clk}}$ with amplitude $v_{pump}$ are 180 degrees out of phase. The coupling capacitors can either be pumped in series or parallel.

It takes n clock cycles for the initial charge to reach the output. The charge on the final pump capacitor is n times larger than the charge on the initial pump capacitor. Thus, $V_2$ for the converters in FIG. 42 is $V_1 + (n-1) \times v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

FIGS. 41 and 42 show topologies that transfer charge during only one phase of the clock signal. Such topologies are referred to as "half-wave" topologies because charge transfer only occurs during half of a clock cycle. A disadvantage of a half-wave topology is a discontinuous input current.

It is possible to convert the topologies shown in FIGS. 41 and 42 so that they transfer charge during both phases of the clock signal. This can be carried out by connecting two such topologies in parallel and driving them 180 degrees out of phase. Such a topology is referred to herein as a "full-wave" topology because charge transfer occurs in both halves of the clock cycle.

Figure 44:
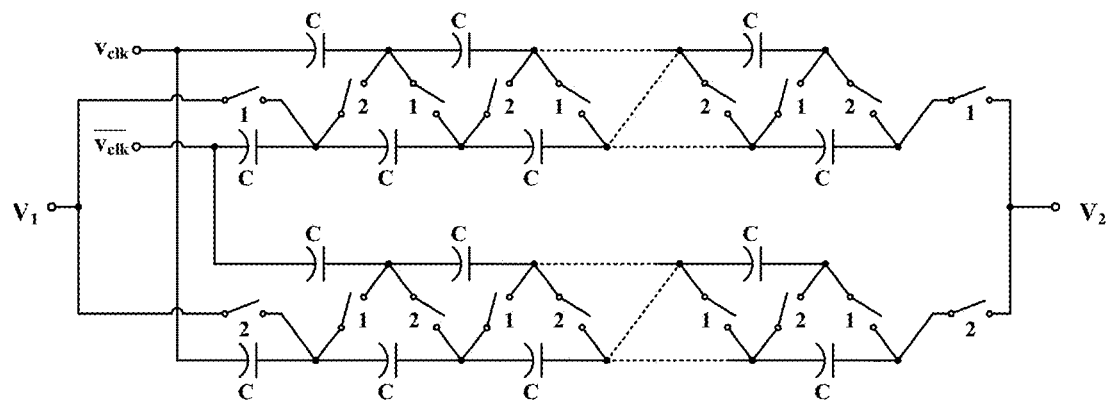
FIG. 44 shows a two-phase symmetric series pumped cascade multiplier with switches.
Figure 45:
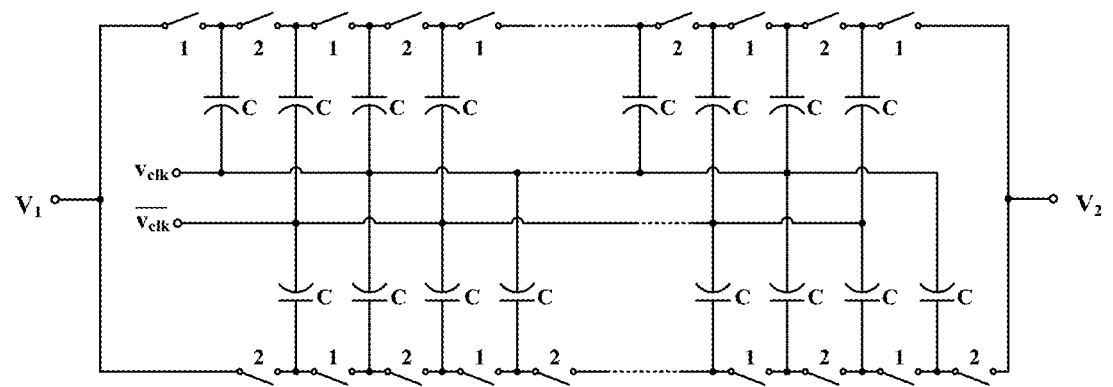
FIG. 45 shows a two-phase symmetric parallel pumped cascade multiplier with switches.

FIG. 44 show a topology derived from that shown in FIG. 41, but modified so that charge transfer occurs in both phases of the clock signal. FIG. 45 show a topology derived from that shown in FIG. 42, but modified so that charge transfer occurs in both phases of the clock signals. Instead of diodes, as shown in the topologies of FIGS. 41 and 42, the topologies shown in FIGS. 44 and 45 use switches. Unlike diodes, which are inherently unidirectional, the switches shown in FIG. 44 and FIG. 45 are bidirectional. As a result, in the topologies shown in FIGS. 44 and 45, power can flow either from the $V_1$ terminal to the $V_2$ terminal or vice versa. As such, these topologies can be used to step-up a voltage or step-down a voltage.

In the topologies shown thus far, there are two chains of switches, each of which is pumped. However, it is also possible to pump only one of the two switch chains. Such topologies are referred to as "asymmetric."

In asymmetric topologies, half of the capacitors are used to support a DC voltage and not to transfer energy. However, these embodiments do not require that each switch endure such a high peak voltage. In particular, the peak voltage in the case in which only one switch chain is being pumped is only half of what it would be if both switch chains were actually being pumped. In these asymmetric topologies, the sole switch chain that is being used to transfer energy can be modified to transfer charge during both phases of the clock signal using principles set forth in connection with FIG. 44.

Figure 46:
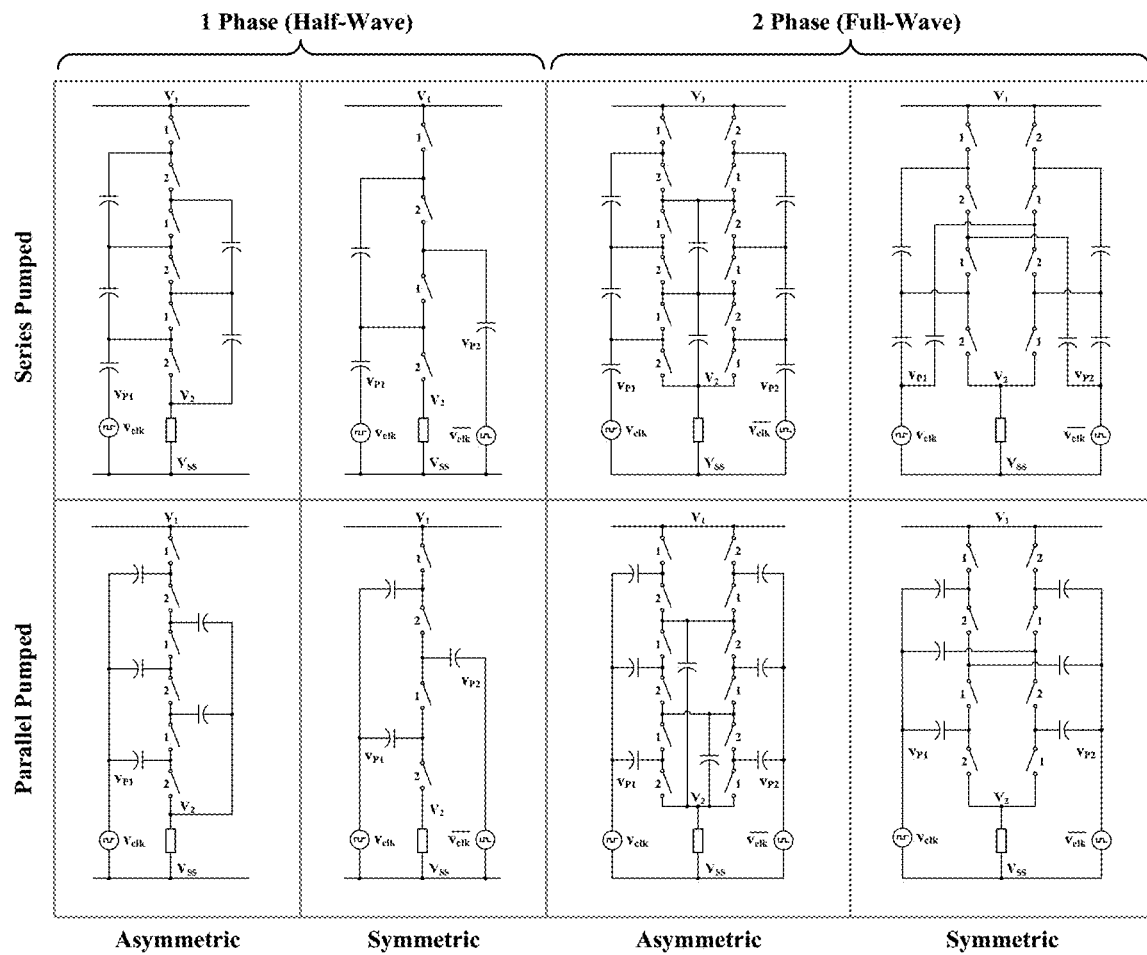
FIG. 46 shows four cascade multipliers along with corresponding half-wave versions.

FIG. 46 shows eight exemplary topologies that use the principles set forth in connection with FIGS. 41-45. The first and second columns show half-wave topologies in both asymmetric and symmetric configurations, whereas the third and fourth columns show full-wave wave topologies in both asymmetric and symmetric configurations. The topologies shown in FIG. 46 can be further modified to combine N phases in parallel and to run them 180 degrees/N out of phase. Doing so reduces output voltage ripple and increases output power handling capability.

The basic building blocks in the modular architecture shown FIGS. 28, 29, 30, and 32 can either be connected as independent entities or coupled entities. In the situation where switching networks and regulating circuits are tightly coupled, it is possible to prevent and/or reduce the systemic energy loss mechanism of the switching networks through adiabatic charging. This generally includes using a regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in the magnetic storage element.

In general, it is desirable for the regulating circuit to operate in a way that limits the root mean square (RMS) current through the capacitors in the switching network. The regulating circuit can do so using either resistive elements or magnetic storage elements. Because resistive elements consume power, magnetic storage elements are generally preferable for this purpose. Therefore, embodiments described herein rely on a combination of switches and a magnetic storage element in the regulating circuit to limit RMS current in the switching network.

To limit RMS current, the regulating circuit forces the capacitor current through the magnetic storage element in a regulating circuit that has an average DC current. The switches in the regulating circuit then operate to maintain an average DC current through the magnetic storage element.

The regulating circuit may limit both the RMS charging current and the RMS discharging current of at least one capacitor in the switching network. A single regulating circuit may limit the current into or out of the switching network by sinking and/or sourcing current. Therefore, there are four fundamental configurations, which are shown in FIGS. 28, 29, 30, and 32.

Assuming power flows from source to load then, in FIG. 28, the regulating circuit 16A may sink both the charging and discharging current of the switching network 12A.

Figure 29:
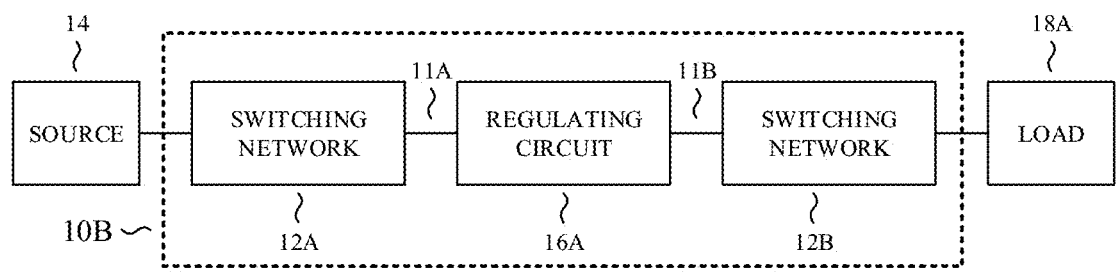
FIGS. 29-30 show DC-DC converters with alternate configurations of regulating circuits and switching networks.

In FIG. 29, the regulating circuit 16A may source both the charging and discharging current of the switching network 12B while also sinking both the charging and discharging current of the switching network 12A. Furthermore, if both the switching networks and the regulating circuits allow power to flow in both directions, then bidirectional power flow is possible.

In FIG. 30, the regulating circuit 16A may source both the charging and discharging current of the switching network 12A.

In FIG. 32, the regulating circuit 300A may source the charging current of switching network 200 and the regulating circuit 300B may sink the discharging current of the same switching network 200 and vice-versa.

A fundamental difficulty that afflicts switched-capacitor networks is that the mere act of charging a capacitor incurs energy loss. This energy loss depends a great deal on how much the voltage across the capacitor changes as a result of the charging event. The energy loss $E_L$ associated with using a fixed voltage source at a voltage V to charge a capacitance C from zero to V is $\frac{1}{2}CV^2$. This loss does not depend on the parasitic series resistance R. Since this loss arises whenever voltage changes, every charging interval during operation incurs a loss equal to $\frac{1}{2}C\Delta V^2$, where $\Delta V$ corresponds to the difference between the initial and final value of the capacitor voltage.

The fixed charge-up loss cannot be reduced by employing switches with lower on-state resistance. Known ways to reduce it simply avoid causing the voltage to change very much during operation. This is why such converters operate most efficiently only at certain conversion ratios.

Since the amount of charge transferred into or out of a charging cycle is the product of the voltage difference and the capacitance, one way to transfer a great deal of charge with only a small voltage difference is to make the capacitance very large. However, large capacitors are not without disadvantages. For one thing, a large capacitance consumes a great deal of physical area. Additionally, switched-capacitor networks with large capacitances are not so amenable to efficient operation.

A converter as described herein overcomes the foregoing disadvantage by providing more efficient use of the capacitors. This means that capacitors can be made smaller and/or that there will be an overall improvement in system efficiency. Although a converter as described herein does not require a reconfigurable switched-capacitor circuit, it may nevertheless take advantage of one as described above.

Figure 47:
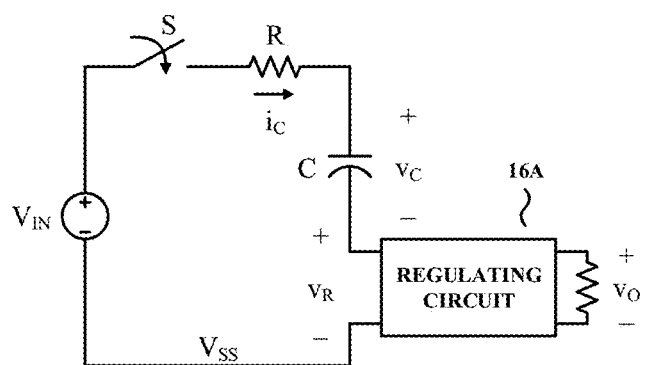
FIG. 47 shows the circuit of FIG. 35 with an auxiliary converter used to reduce loss associated with charging a capacitor.

FIG. 47 illustrates a method for improving the charge-up efficiency of the capacitor C shown in FIG. 35 after switch S closes. The regulating circuit 16A adiabatically charges the capacitor C. In some embodiments, the regulating circuit 16A is a switch-mode converter that supplies an output. A suitable regulating circuit is a low-voltage magnetic based converter.

In the system shown in FIG. 47, while the capacitor C charges, most of the difference between the input voltage $V_{IN}$ and the capacitor stack voltage $V_C$ appears across the input of the regulating circuit 16A. Instead of being dissipated as heat in a parasitic resistor R, the energy associated with charging the capacitor stack is delivered to the output of the regulating circuit 16A instead. Therefore, a majority of the capacitor-charging energy can be recovered (i.e., redirected to the load) by making the apparent input resistance of the regulating circuit 16A higher than the parasitic resistor R.

The embodiment shown in FIG. 47 thus permits more efficient use of capacitors than that shown in FIG. 35. This enables reduction in the required capacitor size and/or improvement in system efficiency when extended to switched-capacitor converters.

Figure 48:
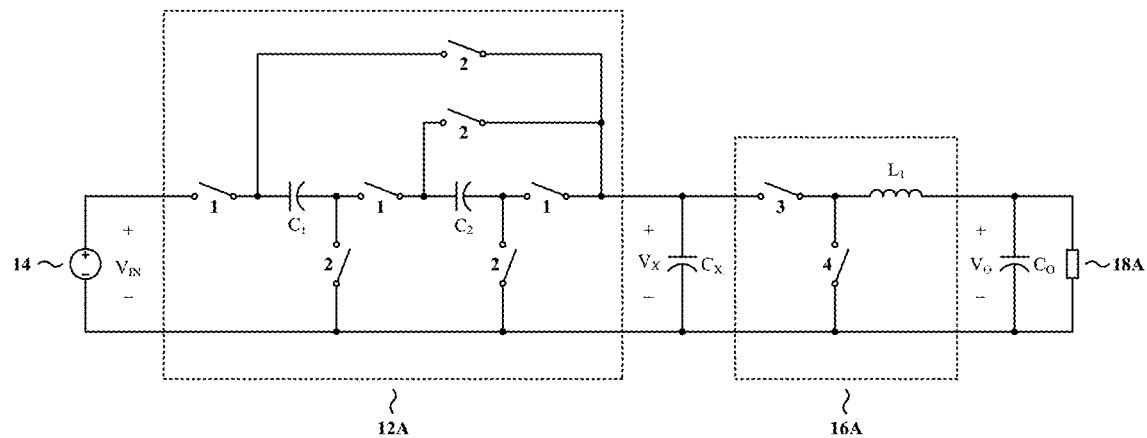
FIG. 48 shows an implementation of the circuit of FIG. 47.

FIG. 48 illustrates one implementation of the foregoing embodiment in which a switching network 12A connects to regulating circuit 16A that serves as both a means to adiabatically charge/discharge the capacitors in the switching network 12A and regulate the output voltage $V_O$. Please note, the regulating circuit 16A need not be at a higher frequency than the switching network to promote adiabatic operation; it can even be at a lower frequency. In the particular embodiment shown, the regulating circuit 16A is a synchronous buck converter and the switching network 12A is a single-phase series-parallel converter. The switching network 12A features first switches 1 that open and close together, second switches 2 that also open and close together, a first pump capacitor $C_1$, and a second pump capacitor $C_2$.

The regulating circuit 16A includes a filter capacitor $C_X$ that serves only as a filter and bypass for the regulating circuit 16A. Consequently, the capacitance of the filter capacitor $C_X$ should be much smaller than that of the first and second pump capacitors $C_1$ and $C_2$ of the switching network 12A.

The switching network 12A alternates between being in a charging state and a discharging state. During the charging state, it charges the first and second pump capacitors $C_1$, $C_2$. Then, during the discharging state, it discharges the first and second pump capacitors $C_1$, $C_2$ in parallel.

In the charging state, the first switches 1 close and the second switches 2 open. The difference between the input voltage $V_{IN}$, and the sum of the voltages across the first and second pump capacitors $C_1$, $C_2$ appears across the input terminal of the regulating circuit 16A. As a result, the first and second pump capacitors $C_1$, $C_2$ charge with low loss, and at a rate determined by the power drawn from the regulating circuit 16A to control the system output.

Similarly, in the discharging state, the second switches 2 close and the first switches 1 open. The switching network 12A then discharge in parallel at a rate based on the power needed to regulate the output.

Another embodiment relies on at least partially adiabatically charging full-wave cascade multipliers. Cascade multipliers are a preferred switching network because of their superior fast-switching limit impedance, ease of scaling up in voltage, their two-phase operation, and low switch stress.

Figure 49:
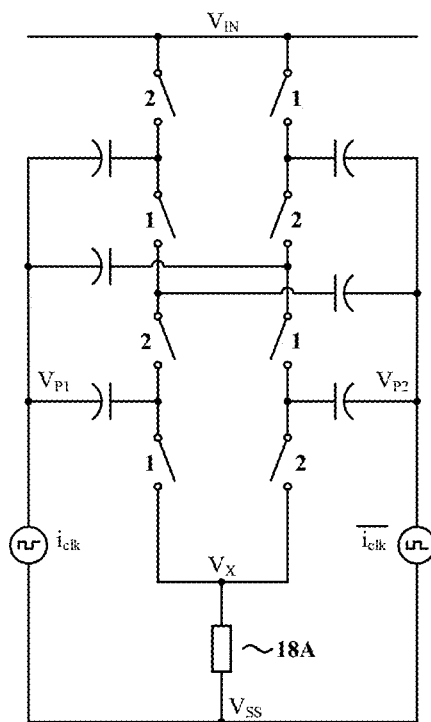
FIG. 49 shows a cascade multiplier with clocked current sources.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, as shown in FIG. 49, then the RMS charging and discharging current in the coupling capacitor may be limited. In this case, the capacitors are at least partially charged adiabatically thus lowering, if not eliminating, the ½C $\Delta V_c^2$ loss that is associated with a switched-capacitor converter when operated in the slow-switching limit. This has the effect of lowering the output impedance to the fast-switching limit impedance. As shown by the black dotted line in FIG. 50, which depicts adiabatic operation under full adiabatic charging, the output impedance would no longer be a function of switching frequency.

With all else being equal, an adiabatically charged switched-capacitor converter can operate at a much lower switching frequency than a conventionally charged switched-capacitor converter, but at higher efficiency. Conversely, an adiabatically charged switched-capacitor converter can operate at the same frequency and with the same efficiency as a conventionally charged switched-capacitor converter, but with much smaller coupling capacitors, for example between four and ten times smaller.

Figure 51:
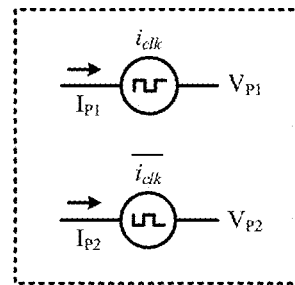
FIGS. 51, 52, and 53 show clocked current sources.

Embodiments described herein can operate with two clocked current sources $i_{clk}$, $\overline{i_{clk}}$ that operate 180 degrees out of phase, as shown in FIG. 51. One implementation, shown in FIG. 52, uses one current source 72, a first switch pair 1 and a second switch pair 2. The first and second switch pairs 1, 2 are best synchronized with a switch chain. A suitable implementation of the current source in FIG. 52 is an inductance, represented in FIG. 53 by an inductor L.

Figure 52:
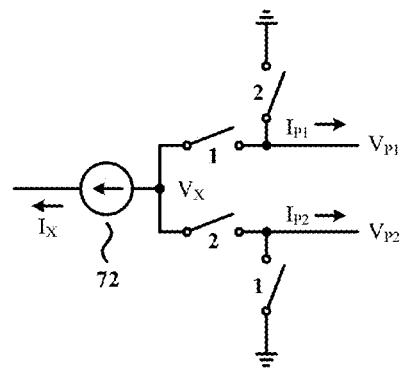
Figure 53:
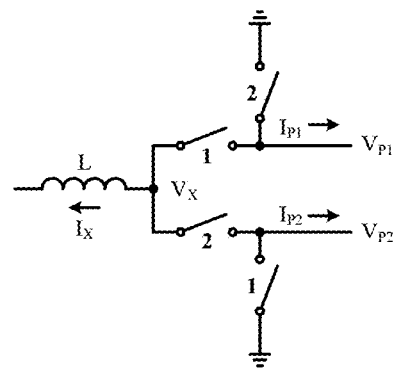
Figure 54:
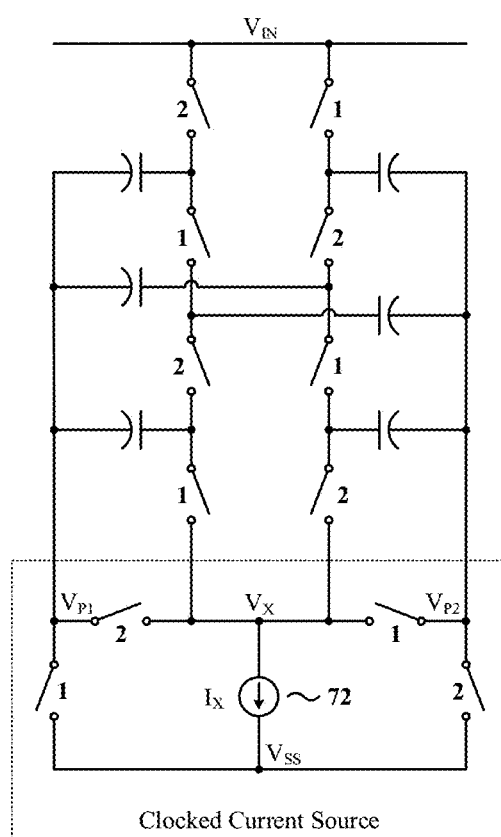
FIG. 54 shows a cascade multiplier with the clocked current source of FIG. 52.
Figure 55:
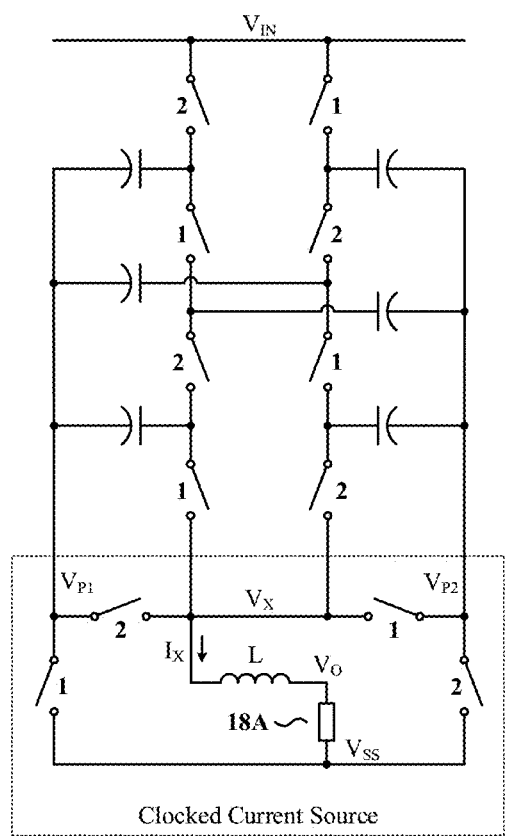
FIG. 55 shows an embodiment of the circuit shown in FIG. 54.

FIG. 54 shows the cascade multiplier of FIG. 49 with the clocked current sources in FIG. 52. FIG. 55 shows the cascade multiplier of FIG. 49 with the clocked current sources in FIG. 53. There are numerous ways of implementing the current source 72. These include buck converters, boost converters, fly-back converter, resonant converters, and linear regulators. In some embodiments, a power converter having a constant input current implements the constant current source. In other embodiments, a power converter that has a constant input current for a portion of an interval defined by the reciprocal of its switching frequency implements the constant current source. In yet other embodiments, a linear regulator implements the constant current source.

In the embodiment shown in FIG. 55, the inductor L should limit the RMS current through the coupling capacitors (to provide adiabatic operation) while also providing a relatively constant output voltage $V_O$. This can be achieved by having a large inductance and/or a capacitance (not shown) in parallel with the load 18A. However, a large inductance consumes considerable area. And to make matters worse, the windings necessary for a large inductance will cause considerable resistive losses.

By correctly choosing the inductance and capacitance (not shown) in FIG. 55, it is possible to constrain the current $I_X$ while generating a relatively static output voltage $V_O$. In particular, a proper choice of inductance will generate a rectified sinusoidal current $I_X$ as shown in FIG. 56 that will nevertheless result in a limited RMS current through the coupling capacitors and a relatively constant output voltage $V_O$.

Figure 56:
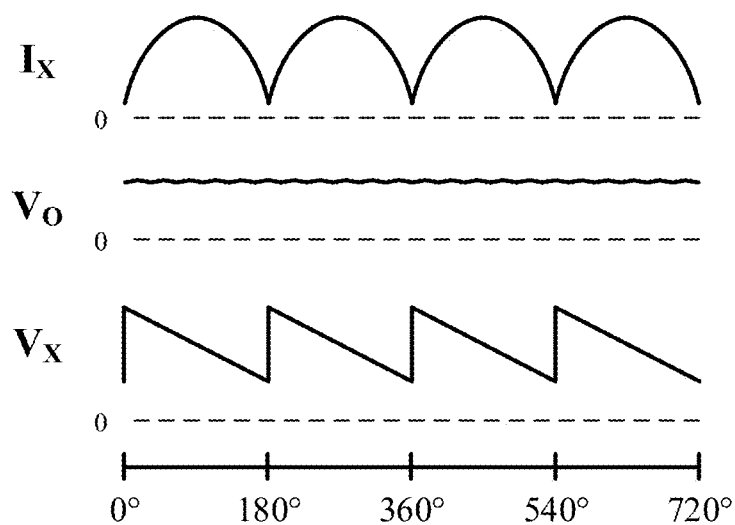
FIG. 56 shows current and voltage at selected locations in the circuit of FIG. 55.

In FIG. 56, the boundary between each half-cycle of the sinusoid corresponding to a switching event of the switches of the clocked current source. Ideally, the current $I_X$ should be zero whenever a switching event occurs. This will minimize switching losses. However, in practice it is difficult to achieve such precision. Moreover, in any attempt to achieve such precision, there is a risk that the inductance is smaller than what was expected. This will cause the current $I_X$ to become negative, thus potentially destabilizing the circuit.

Accordingly, when choosing the inductance of L in FIG. 55, it is desirable to choose an inductance that is small enough to avoid consuming excessive area and generating loss, but that is large enough to provide some assurance that the current $I_X$ will just graze the zero line without actually becoming negative. A suitable value of inductance can be obtained by dividing the peak-to-peak value of the voltage $V_X$ by the product of the average value of the current $I_X$ and the switching frequency. The result is then multiplied by a constant. A suitable constant is 13/24.

Figure 57:
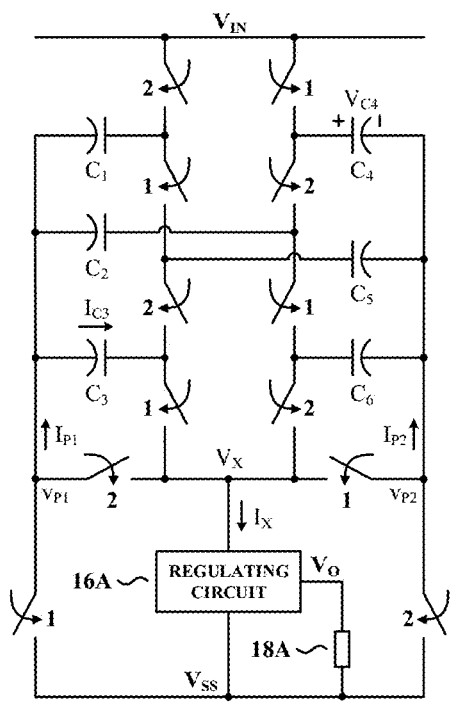
FIG. 57 shows a particular implementation of the DC-DC converter illustrated in FIG. 28 with a full-wave adiabatically charged switching network.

FIG. 57 shows a step-down converter consistent with the architecture shown in FIG. 28. However, in this embodiment, a switching network 12A is adiabatically charged using a regulating circuit 16A. The clocked current sources $i_{clk}$ & $\overline{i_{clk}}$ are emulated by Four switches and the regulating circuit 16A emulate the clocked current sources $i_{clk}$, $\overline{i_{clk}}$. The output capacitor $C_O$ has also been removed so as to allow $V_X$ to swing. In this example, the regulating circuit 16A is a boost converter that behaves as constant source with a small AC ripple. Any power converter that has a non-capacitive input impedance at the frequency of operation would have allowed adiabatic operation. Although switch-mode power converters are attractive candidates due to their high efficiency, linear regulators are also practical.

Figure 58:
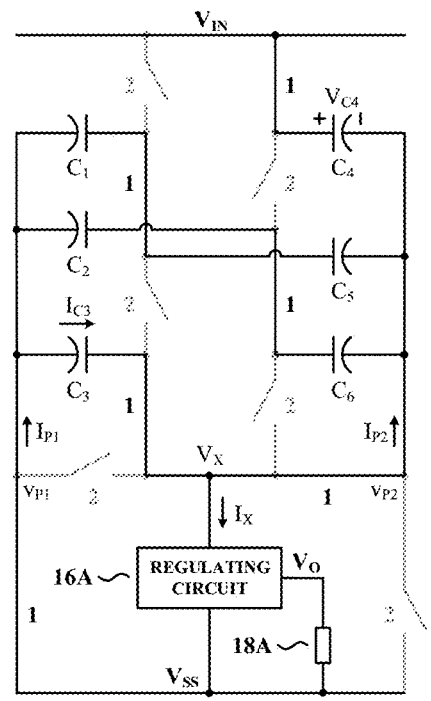
FIG. 58 shows the DC-DC converter illustrated in FIG. 54 during phase A.
Figure 59:
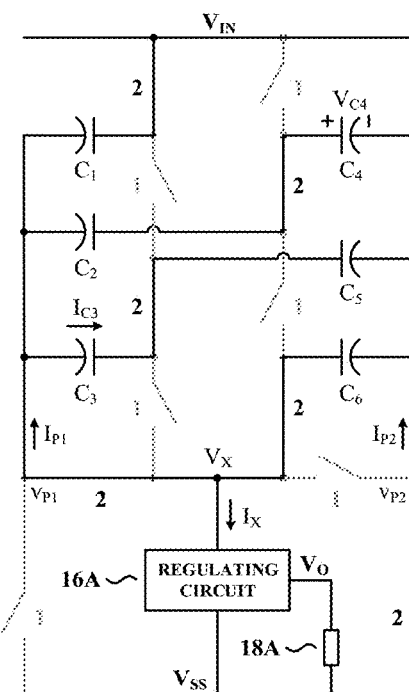
FIG. 59 shows the DC-DC converter illustrated in FIG. 54 during phase B.

In operation, closing switches labeled "1" charges capacitors $C_4$, $C_5$, and $C_6$ while discharging capacitors $C_1$, $C_2$, and $C_3$. Similarly, closing switches "2" has the complementary effect. The first topological state (phase A) is shown in FIG. 57, where all switches labeled "1" are closed and all switches labeled "2" are opened. Similarly, the second topological state (phase B) is shown in FIG. 58, where all switches labeled "2" are closed and all switches labeled "1" are opened.

In this embodiment, the regulating circuit 16A limits the RMS charge and discharging current of each capacitor. For example, capacitor $C_3$ is discharged through the filter inductor in the regulating circuit 16A during phase A, while capacitor C₃ is charged through the filter inductor in regulating circuit 16A during phase B, clearly demonstrating the adiabatic concept. Furthermore, all of the active components are implemented with switches so that the converter can process power in both directions.

Figure 60:
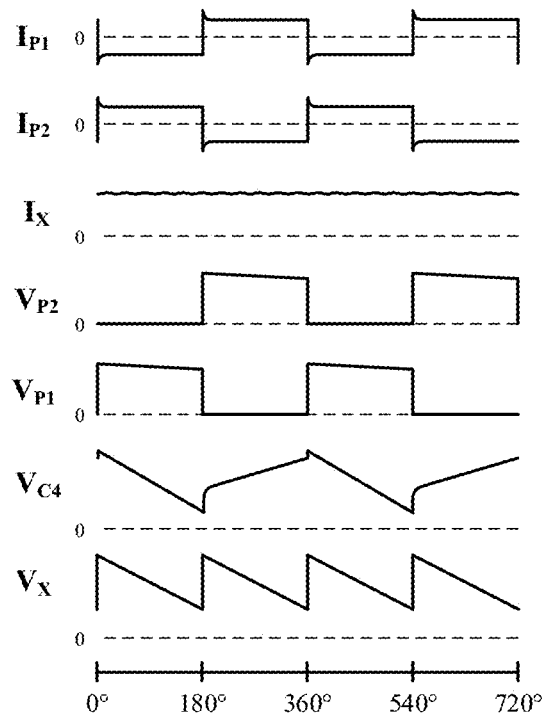
FIG. 60 shows various waveforms associated with a 4:1 adiabatically charged converter.

A few representative node voltages and currents are shown in FIG. 60. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers if at least one end of a switch stack is not loaded with a large capacitance, as is the case in this embodiment, where the $V_X$ node is loaded down by regulating circuit 16A.

In operation, different amounts of current will flow through different switches. It is therefore useful to size the switches in a manner appropriate to the currents that will be flowing through them. For example, the switches connected to $V_{P1}$ and $V_{P2}$ carry more current then the other switches in FIG. 57. By making these switches larger than the other switches, this avoids the need to have unnecessarily large switches and thus results in a smaller circuit footprint. This also avoids unnecessary additional capacitive losses, which are proportional to the size of the switch.

Figure 50:
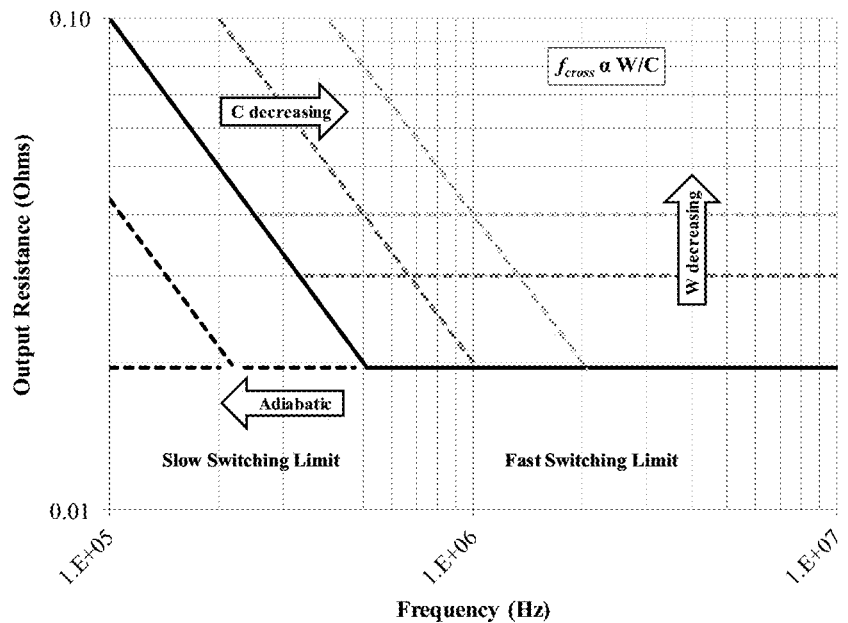
FIG. 50 shows output impedance of a switched-capacitor converter as a function of frequency.

The switches shown in FIG. 57 will transition between states at some switching frequency. It is desirable that, in order to reduce loss, the switching network 12A operate such that the RMS current through the switches is constrained at that switching frequency. One way to ensure that this is the case is to choose the resistances of the switches such that they are so large that the RC time constant of the charge transfer between the capacitors is similar if not longer than the switching frequency. As can be seen in FIG. 50, by controlling the width "W" of the switches and hence their resistance and their size, the switching network 12A can be forced into the fast-switching limit region.

Unfortunately, by using the resistance of the switches to constrain the RMS current, conductive power losses increase and the overall efficiency decreases. The regulating circuit 16A, however, allows us to reduce the resistance of the switches and operate adiabatically. Therefore, the switches can be optimally sized for the highest efficiency without worrying about constraining the RMS current since it is handled by the regulating circuit 16A (or optionally a magnetic filter). The optimal size for each switch is chosen by balancing the resistive and capacitive losses in each switch at a given switching frequency and at a given current.

The modular architecture with the basic building blocks shown in FIGS. 11, 29, 30, and 32 may be expanded to cover a wider range of applications, such as high-voltage DC, AC-DC, AC-AC, buck-boost, and multiple output voltages. Each of these applications includes separating the transformation and regulation functions. Extension of the architecture can also incorporate adiabatically charged switched-capacitor converters.

Figure 61:
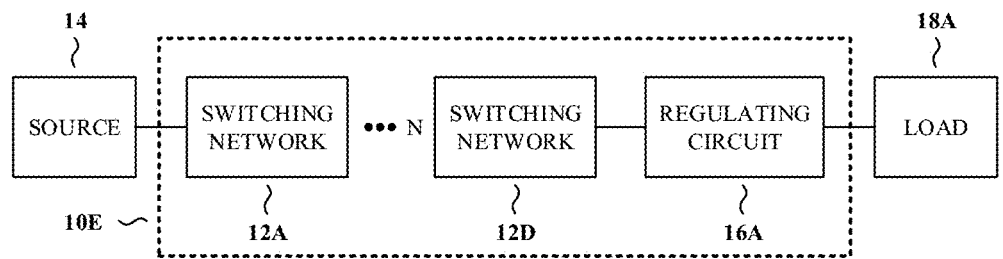
FIG. 61 shows adiabatic charging of series connected stages.
Figure 63:
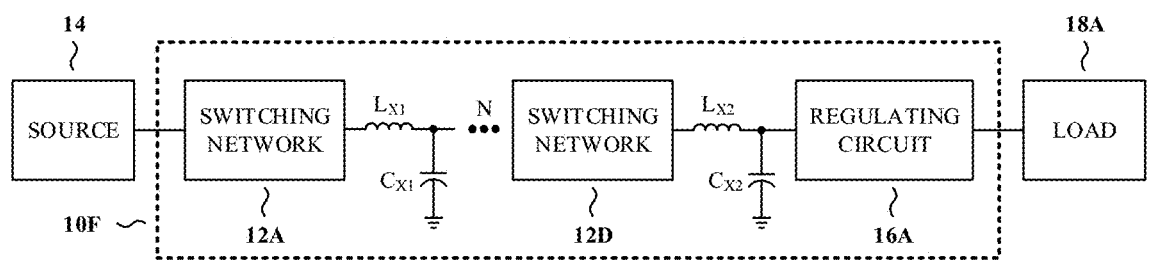
FIG. 63 shows adiabatic charging of series connected stages with filters between each stage.

In many switched-capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series, either without intervening filters, as depicted in FIG. 61, or with intervening filters between stages, as shown in FIG. 63. The transformation ratio of the total switch capacitor stack ($V_{IN}/V_X$) is as follows:

$$\frac{V_{in}}{V_x} = N_1 \times N_2 \ldots N_n \tag{2.1}$$

The main disadvantage of the series stacked configuration is that the voltage stresses on the front stages are much higher than those of the rear stages. This will normally require stages with different voltage ratings and sizes. However, the transformation ratio can be easily changed by bypassing a stage or two.

Adiabatic charging of a preceding series-connected switching network only occurs if the following switching network controls the charging and discharging current of the preceding stage. Thus, it is preferable to use full-wave switched-capacitor converters in the front stages or to use switched-capacitor stages such as the single-phase series-parallel switched-capacitor converters with magnetic based filters.

Figure 62:
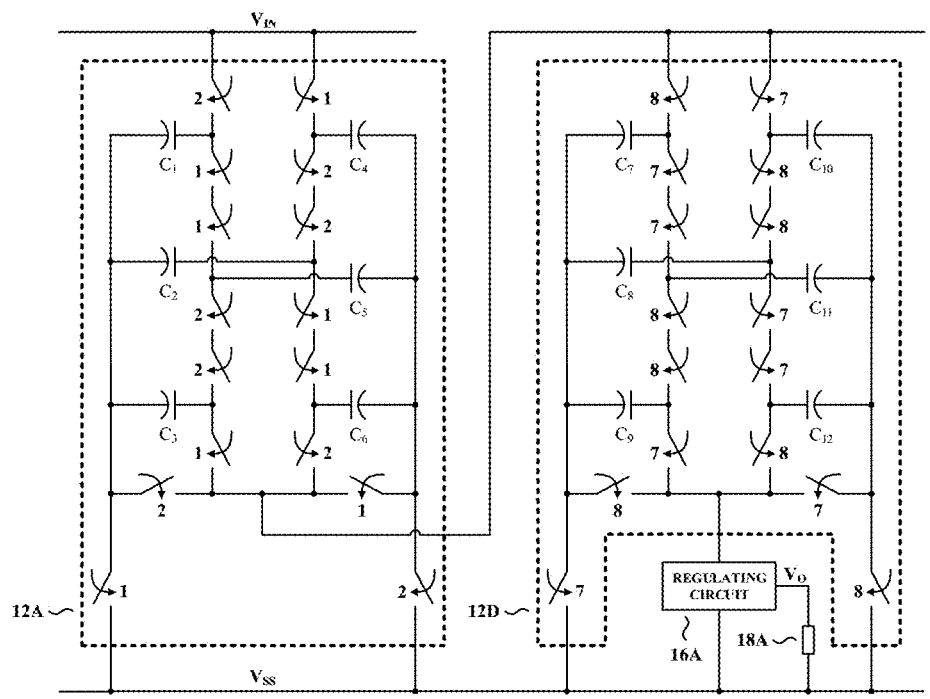
FIG. 62 shows a particular implementation of the power converter illustrated in FIG. 61.
Figure 64:
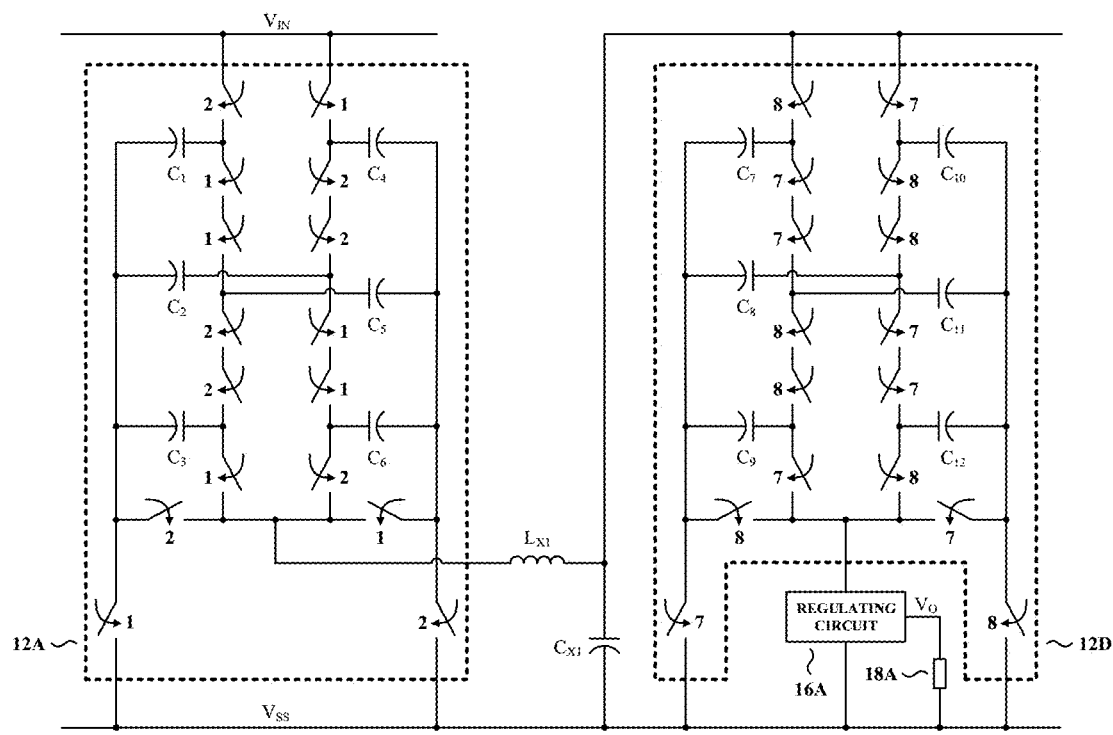
FIG. 64 shows a particular implementation of the power converter illustrated in FIG. 63.

FIG. 62 shows a converter with two series-connected switching networks consistent with the architecture shown in FIG. 61. FIG. 64 shows a similar architecture, but with filters between the series-connected switching networks in a manner consistent with the architecture shown in FIG. 63. Both switching networks 12A, 12D are two-phase cascade multipliers. In operation, switches labeled "1" and "2" are always in complementary states and switches labeled "7" and "8" are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges capacitors $C_1$, $C_2$, $C_3$, while discharging capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

Figure 65:
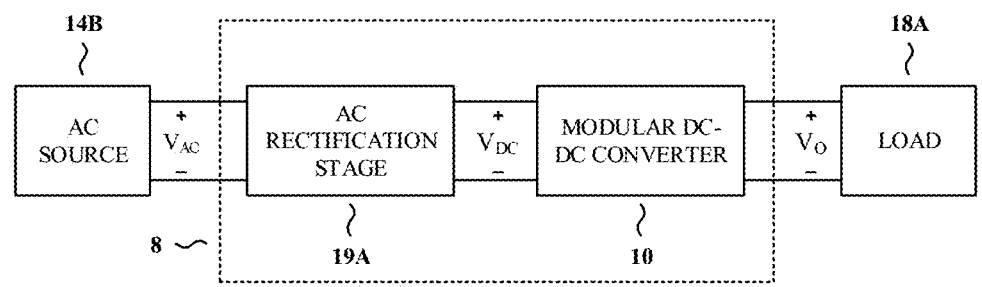
FIG. 65 shows an AC-DC power converter architecture.

The modular architecture with the basic building blocks shown in FIGS. 11, 29, 30, and 32 may be configured to handle an AC input voltage as shown in FIG. 65. An AC rectification stage 19A receives an AC waveform from an AC source 14B and provides an average DC voltage to a converter 10, the output of which is connected to a load 18A. In this embodiment, the converter 10 can be isolated or otherwise.

One of the main attributes of switched-capacitor converters is their ability to operate efficiency over a large input range by reconfiguring the switched-capacitor network. If the AC wall voltage (i.e. 60 Hz & 120 $V_{RMS}$) can be thought of as a slow-moving DC voltage, then a front-end AC switching network 13A should be able to unfold the time-varying input voltage into a relatively stable DC voltage.

Figure 66:
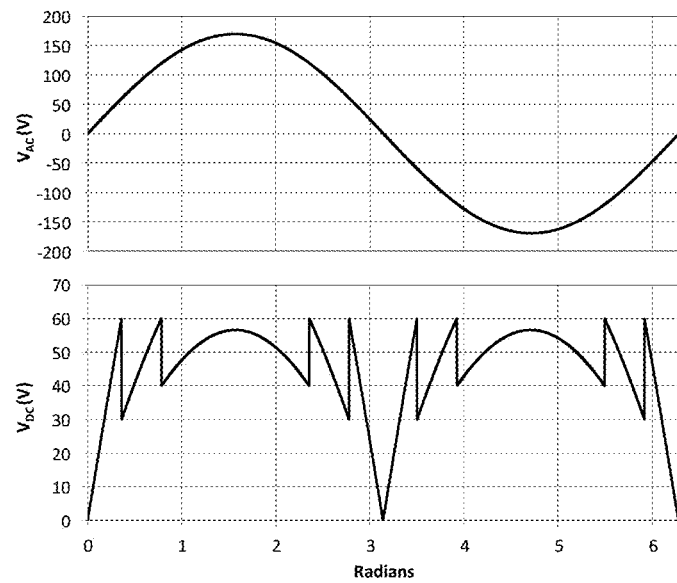
FIG. 66 shows an AC voltage rectified using a reconfigured switched-capacitor stage.
Figure 67:
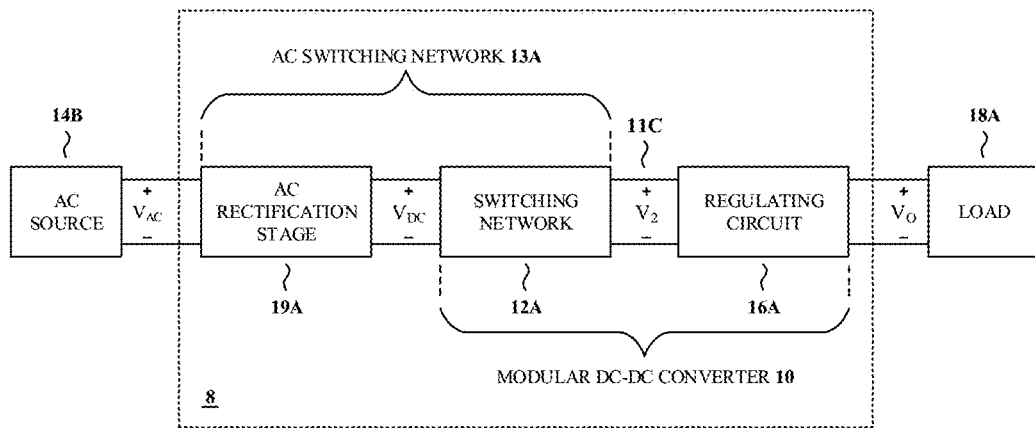
FIG. 67 shows an embodiment of the AC-DC power converter architecture in FIG. 65, which includes an AC switching network.

FIG. 66 shows a diagram of a 120 $V_{RMS}$ AC waveform over a single 60 Hz cycle overlaid with the unfolded DC voltage. FIG. 67 shows an AC switching network 13A of the sort that can incorporate the AC rectification stage 19A of FIG. 65. The AC switching network 13A is a front-end switched-capacitor stage (i.e., switching network) in combination with a selective inverting stage (i.e., rectifying stage). The front-end switched-capacitor stage has different configurations (1/3, 1/2, 1/1) at its disposal. In the particular embodiments shown, the AC switching network 13A keeps the DC voltage under 60 V. In some embodiments, the AC switching network 13A is a special-purpose adiabatic switched-capacitor network.

Once the AC switching network 13A has unfolded the AC voltage, a regulating circuit 16A, shown in FIG. 67, produces a final output voltage. In some embodiments, another switching network 16A between the AC switching network 13A and the regulating circuit 16A further conditions the voltage. If this is the case, then the caveats for series-connected stages hold true since the AC switching network 13A is a special purpose switching network 12A. Some form of magnetic or electric isolation is also common in AC-DC converters for safety reasons. Hence, in FIG. 67, voltages: $V_{AC}$, $V_{DC}$, and $V_O$ are purposely defined as being agnostic to a common ground.

Figure 68:
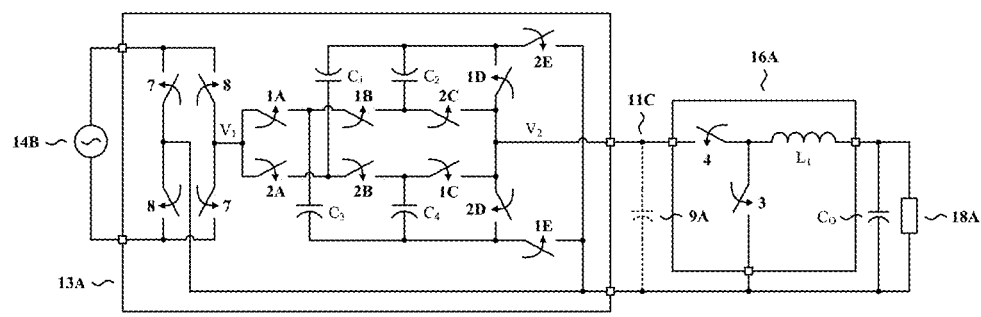
FIG. 68 shows a particular implementation of the AC-DC converter illustrated in FIG. 67.
Figure 69:
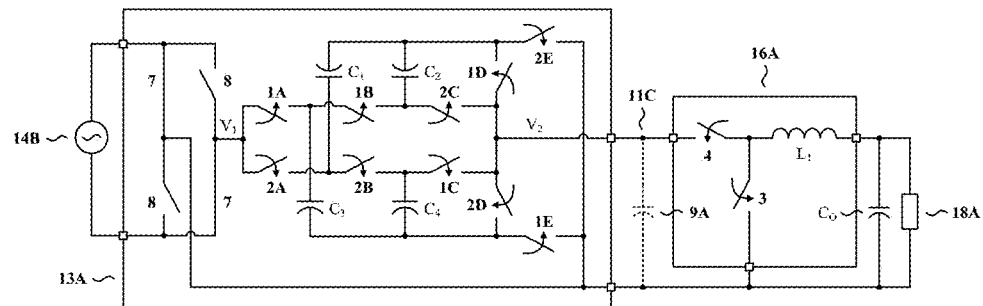
FIGS. 69-70 shows the AC-DC converter in FIG. 68 during the positive and negative portions of the AC cycle respectively.
Figure 70:
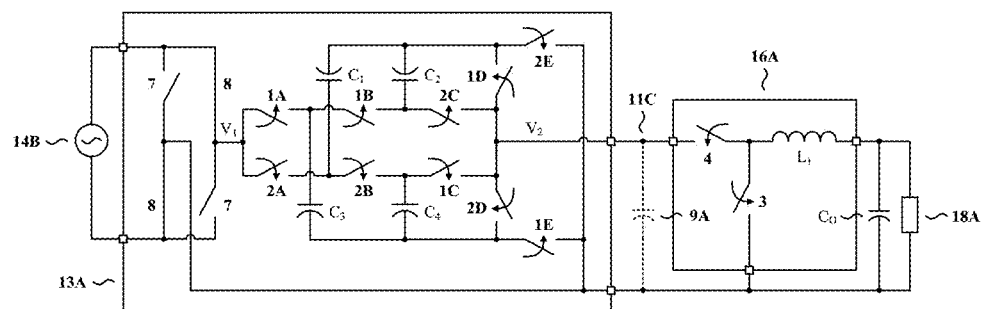

FIG. 68 shows an AC-DC converter corresponding to the architecture shown in FIG. 67. In this embodiment, the AC switching network 13A is a synchronous AC bridge rectifier followed by a reconfigurable two-phase step-down cascade multiplier with three distinct conversion ratios (1/3, 1/2, 1/1) while the regulating circuit 16A is a synchronous buck converter. In operation, switches labeled 7 and 8 are always in complementary states. During the positive portion of the AC cycle (0 to π radians) all switches labeled "7" are closed while all switches labeled "8" are opened as shown in FIG. 69. Similarly, during the negative portion of the AC cycle (π to 2π radians) all switches labeled 8 are closed while all switches labeled "7" are opened as shown in FIG. 70.

In addition to the inverting function provided by switches 7 and 8, switches 1A-1E and switches 2A-2E may be selectively opened and closed as shown in Table 1 to provide three distinct conversion ratios of: 1/3, 1/2, and 1.

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF |

The AC switching network 13A is provided with a digital clock signal CLK. A second signal CLKB is also generated, which may simply be the complement of CLK (i.e. is high when CLK is low and low when CLK is high), or which may be generated as a non-overlapping complement. With a switching pattern set in accordance with the first row of Table 1, the AC switching network 13A provides a step-down ratio of one-third (⅓). With a switching pattern set in accordance with the second row of Table 1, the AC switching network 13A provides a step-down ratio of one-half (½). With a switching pattern set in accordance with the third row of Table 1, the AC switching network 13A provides a step-down ratio of one.

Figure 71:
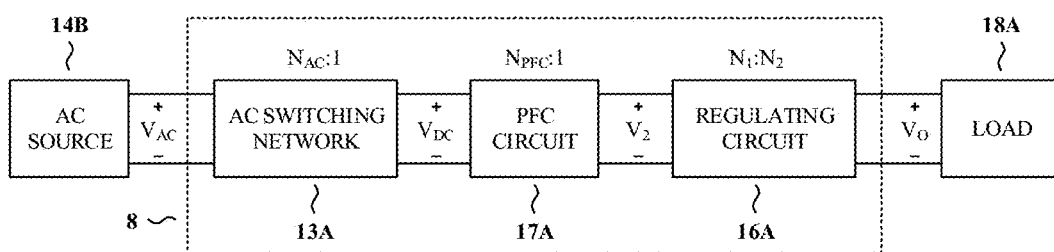
FIG. 71 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector. FIG. 71 shows an AC-DC converter 8 that controls harmonic current and boosts power factor towards unity. The illustrated AC-DC converter 8 features an AC switching network 13A that receives an AC voltage from an AC source 14B and rectifies it. An output of the AC switching network 13A connects to an input of an active power-factor correction circuit 17A. The AC switching network 13A may also provide voltage transformation via a switched-capacitor circuit. The power-factor correction circuit 21A controls its input current so that it remains, to the greatest extent possible, in-phase with the voltage waveform provided by the AC source 14B. This drives reactive power toward zero. The output of the power-factor correction circuit 17A is then provided to a regulating circuit 16A that operates in the same way as shown in FIG. 67.

Figure 72:
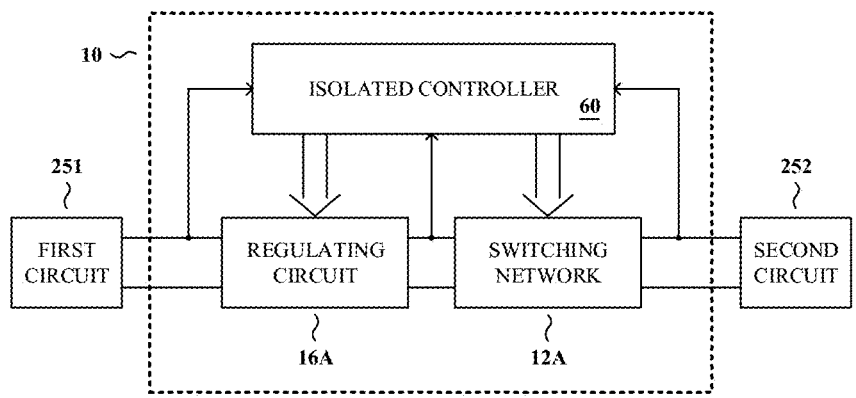
FIG. 72 shows a converter having an isolated controller.

FIG. 72 shows a particular embodiment of FIG. 65's modular power converter 10 connected between first and second circuits 51, 52. The first and second circuits 51, 52 can be a source, a load, or another circuit, such as a power converter, a PFC circuit, or an EMI filter.

The illustrated power converter 10 includes a regulating circuit 16A, a switching network 12A, and an isolated controller 60. As used herein, a circuit having an input and an output is considered isolated if the input voltage and the output voltage do not share a common ground. Such isolation can be carried out by having the input voltage correspond to an input voltage of a transformer and having the output voltage corresponds to an output voltage of a transformer. In some embodiments, the regulating circuit 16A is isolated. In other embodiments, it is the switching network 12A that is isolated. Although only one of the foregoing is needed to consider the modular DC-DC converter 10 as a whole isolated, there are also embodiments in which both the switching network 12A and the regulating circuit 16A are isolated.

In some embodiments, the switching network 12A is an unregulated switched-capacitor converter having a fixed voltage-conversion ratio. These embodiments generally include a regulating circuit 16A to regulate the output of the switching network 12A. Examples of a suitable regulating circuit 16A include a boost converter, a buck converter, a fly-back converter, and a linear regulator.

Figure 73:
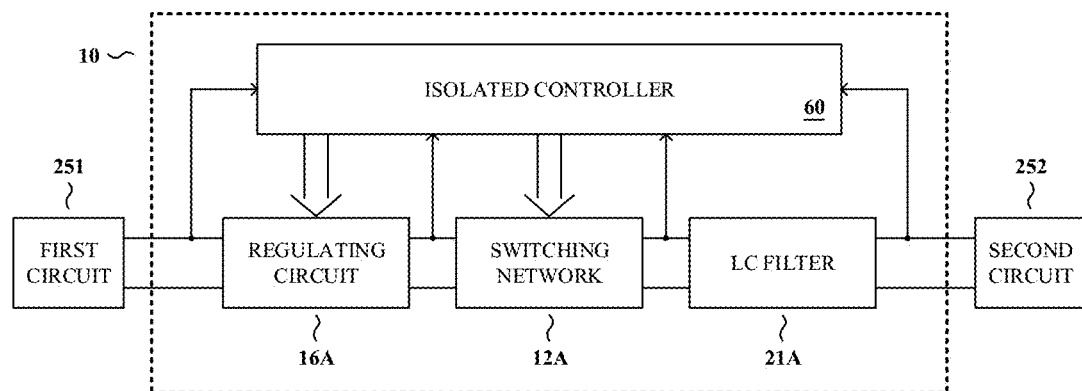
FIG. 73 shows an alternative architecture of the converter in FIG. 72 where the switching network is loaded by an LC filter.

FIG. 73 shows a variation of the converter shown in FIG. 72 in which an LC filter 21A is added between the switching network 12A and the second circuit 252. The purpose of the LC filter is to promote adiabatic charging of the switching network 12A via the method shown in FIG. 53.

Figure 74:
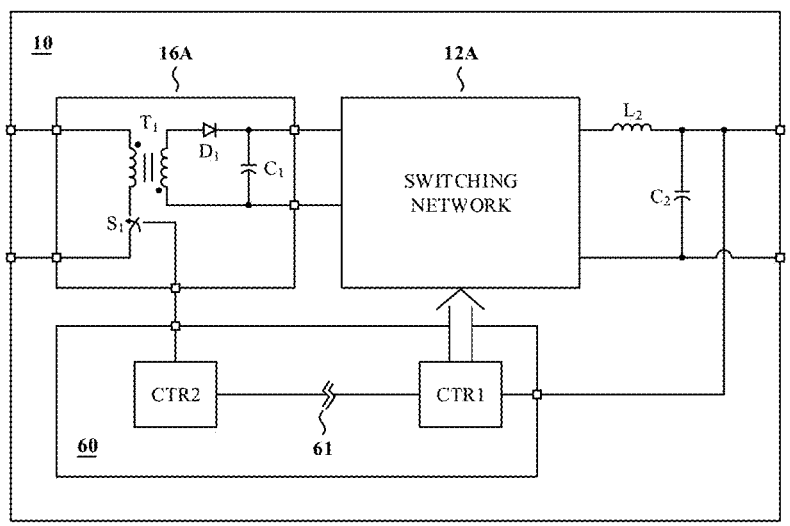
FIG. 74 shows a converter in which a control signal for the regulating circuit is isolated from a control signal for the switching network.

FIG. 74 shows a particular embodiment of the modular DC-DC converter 10 shown in FIG. 73. The regulating circuit 16A is implemented as a fly-back converter having a switch $S_1$, a diode $D_1$, a capacitor $C_1$, and a transformer $T_1$. When operating in continuous conduction mode, the regulating circuit 16A transitions between first and second states. In the first state, the switch $S_1$ is closed, and the diode $D_1$ does not conduct. During this first state, the capacitor $C_1$ acts as a charge reservoir to supply power to the output of the regulator 16A. In the second state, the switch $S_1$ is opened and the diode $D_1$ conducts.

As shown in FIG. 74, the isolated controller 60 includes a first control signal CTR1 that controls the switching network 12A, a second control signal CTR2 that controls the regulating circuit 16A, and an isolation barrier 61 between them. As a result, the first and second control signals CRT1, CTR2 have different grounds and connect to different sides of the transformer $T_1$. The isolation barrier 61 can include any one or more of sonic isolation, optical isolation, capacitive isolation, inductive isolation, and mechanical isolation.

Figure 75:
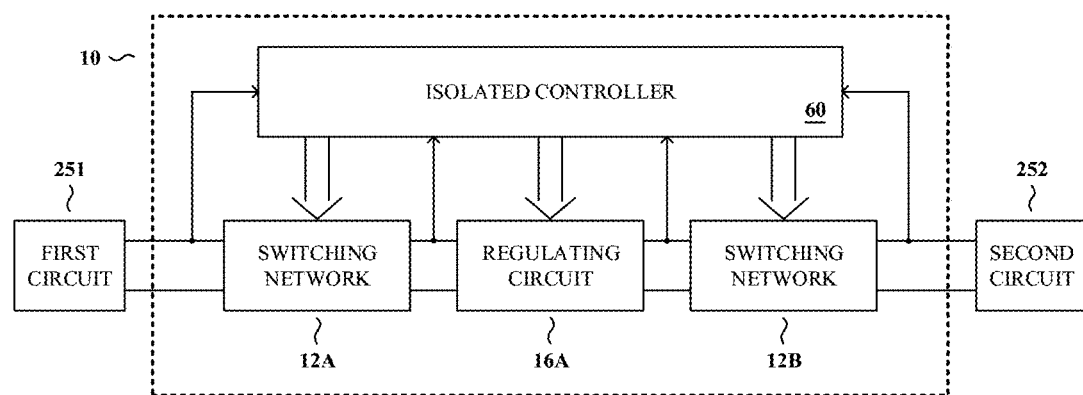
FIG. 75 shows a configuration of FIG. 29 with an isolated controller as shown in FIG. 74.

The embodiment shown in FIG. 29 can be modified to operate with an AC source 14B, as shown in FIG. 75, which shows a modular DC-DC converter 10 connected between first and second circuits 51, 52. The modular DC-DC converter 10 includes first and second switching networks 12A, 12B and a regulating circuit 16A. The first switching network 12A receives, at its input thereof, a voltage from the first circuit 251. The second switching network 12B provides its output to the second circuit 252. The regulating circuit 16A receives an output from the first switching network 12A and provides its own output to an input of the second switching network 12B. An isolated controller 60 provides a first control signal to the first switching network 12A, a second control signal to the second switching network 12B, and a third control signal to the regulating circuit 16A.

Figure 76:
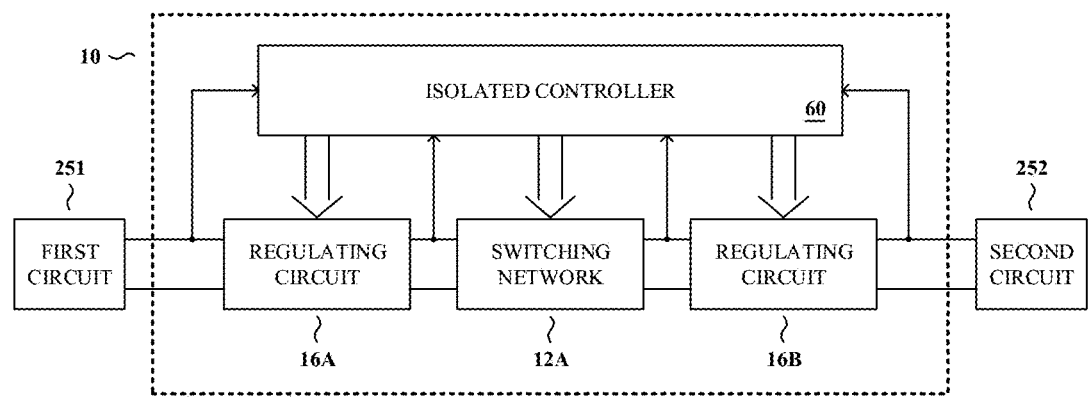
FIG. 76 shows a configuration of FIG. 32 with an isolated controller as shown in FIG. 74.
Figure 77:
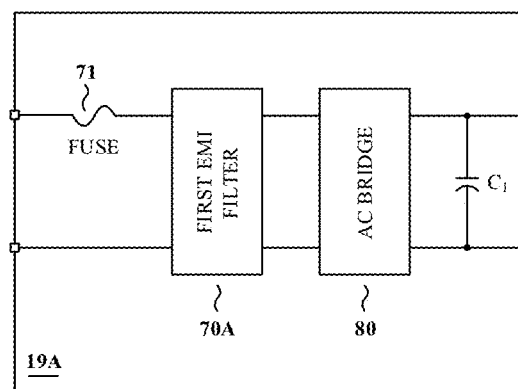
FIG. 77 shows an implementation of the rectifier shown in FIG. 65.
Figure 78:
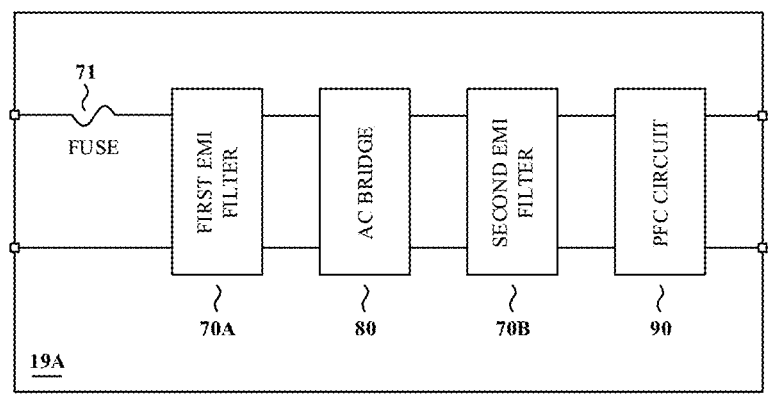
FIG. 78 shows an alternative implementation of the rectifier shown in FIG. 65.

Similarly, the embodiment shown in FIG. 32 can be modified to operate with an AC source 14B, as shown in FIG. 76, which shows first and second regulating circuits 16A, 16B and a switching network 12A. The first regulating circuit 16A receives, at its input, a voltage from the first circuit 251. The second regulating circuit 16B provides its output to the second circuit 252. The switching network 12A receives an output from the first regulating circuit 16A and provides its own output to an input of the second regulating circuit 126. An isolated controller 60 provides a first control signal to the first regulating circuit 16A, a second control signal to the regulating circuit 16B, and a third control signal to the switching network 12A. In some embodiments, as shown in FIG. 73, the second regulating circuit 16B can be implemented as an LC filter 21A. The AC rectification stage 19A shown in FIG. 65 can be implemented in a variety of ways. In one embodiment, shown in FIG. 77, the rectifier 19A features a fuse 71, a capacitor $C_1$, an AC bridge 80, and a first electromagnetic interference filter 70A between the AC bridge 80 and the AC source 14B. In another embodiment, shown in FIG. 78, a second EMI filter 70B and a power-factor correction circuit 90 replaces the capacitor $C_1$.

Figure 79:
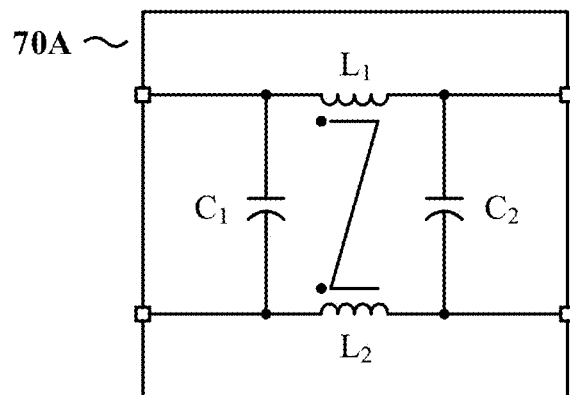
FIG. 79 shows an EMI filter from the rectifiers shown in FIGS. 77 and 78.
Figure 80:
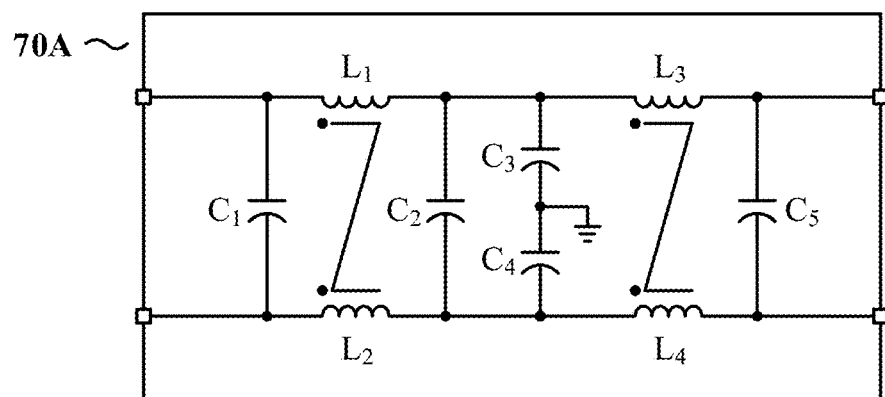
FIG. 80 shows an alternative EMI filter from the rectifiers shown in FIGS. 77 and 78.

The first electromagnetic interference filter 70A, implementations of which can be seen in FIGS. 79 and 80, reduces the common-mode and differential-mode noise produced by the AC-DC converter 8 by a desired amount. The extent to which such noise is reduced is typically set by a government body, such as the FCC.

Figure 81:
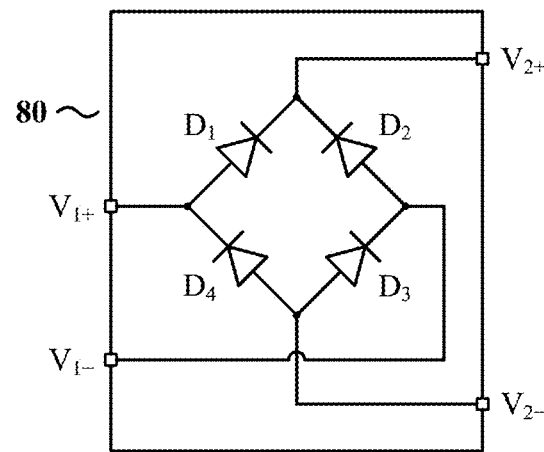
FIG. 81 shows an AC bridge for use in the embodiments shown in FIGS. 77 and 78.

The AC bridge 80 accepts an AC voltage and outputs an average DC voltage. A particular implementation of an AC bridge 80 is shown in FIG. 81. The bridge includes first, second, third, and fourth diodes $D_1, D_2, D_3, D_4$. In operation, the AC bridge 80 transitions between first and second states. In the first state, the first and third diodes $D_1, D_3$ are reverse biased, and the second and fourth diodes are forward biased. In the second state, the second and fourth diodes $D_2, D_4$ are forward biased and the first and third diodes $D_1, D_3$ are reverse biased.

Figure 82:
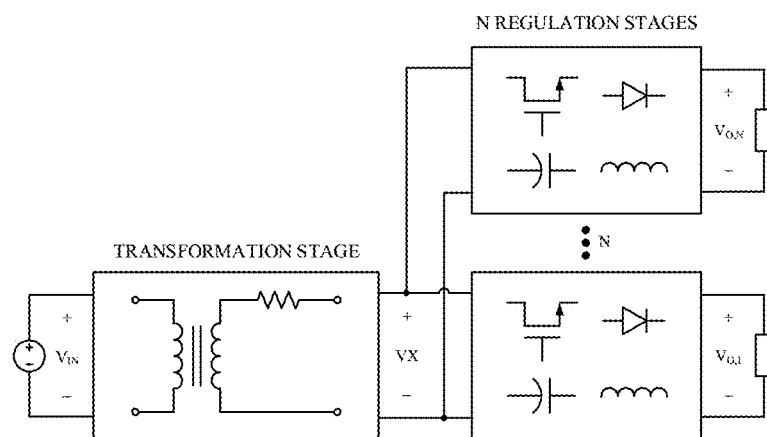
FIG. 82 shows one transformation stage driving two parallel regulation stages.
Figure 83:
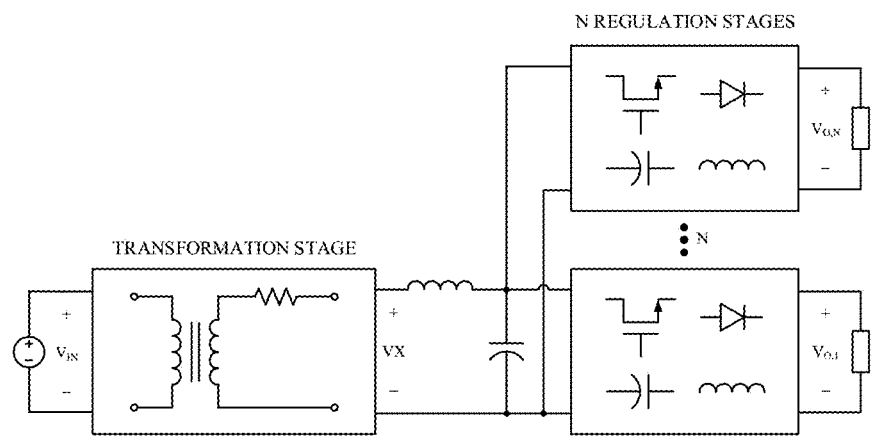
FIG. 83 shows a transformation stage providing filtered output to parallel regulating stages.

Many modern devices require different voltages to operate different components, such as power management integrated circuits (PMICs) in cell phones. For example, one voltage may be required to operate a processor, whereas another voltage may be needed to operate a display. In principle, one could have a separate transformation stage and regulation stage corresponding to each required output voltage. However, this solution is wasteful both of physical space and of pin count. A solution to this difficulty is that shown in FIG. 82, in which one transformation stage drives two or more regulation stages in parallel. Each regulation stage thus provides a separate output voltage. The regulator stage can be any of those already described, including a linear regulator. As shown in FIG. 83, some embodiments include a filter between the transformation stage and the regulation stages.

To ensure adiabatic charging of the switched-capacitor network in the transformation stage, it is preferable that the majority of the power drawn by the various regulation stages come by way of a constant current (or constrained current). This can be achieved, for example, by synchronizing the regulation stages so that they draw as constant a current as possible, thus avoiding larger resistive losses (i.e., due to higher RMS current) in the switched-capacitor network of the transformation stage.

Figure 84:
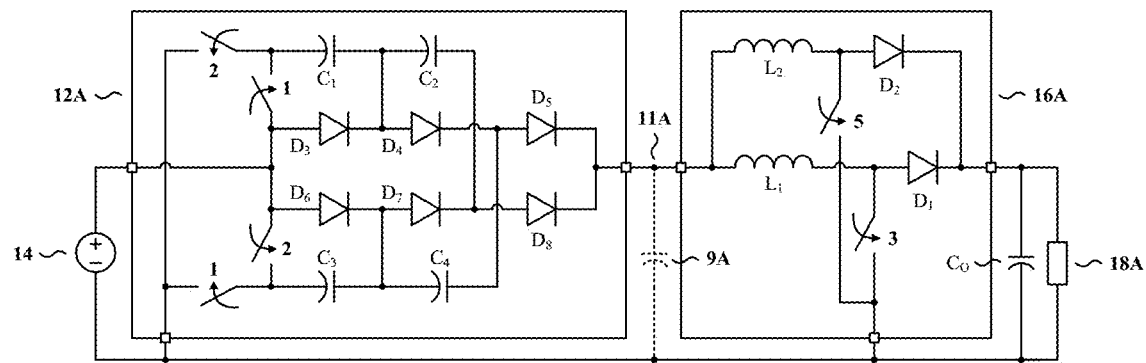
FIGS. 84 and 85 show implementations of the DC-DC converter illustrated in FIG. 28.
Figure 85:
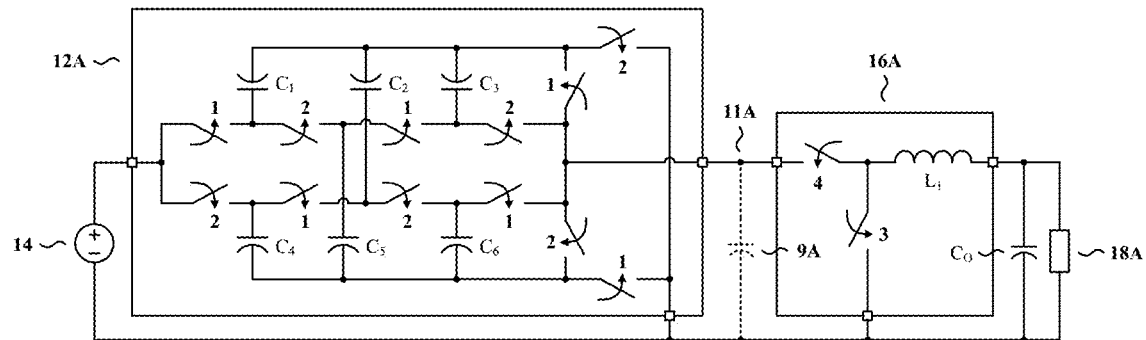

FIGS. 84-80 show specific implementations of modular power converters that conform to the architectural diagrams shown in FIGS. 28, 29, 30, and 32. In each implementation a regulating circuit or multiple regulating circuits may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant capacitor $C_O$ is used. All of the stages share a common ground, however this need not be case. For example, if a regulating circuit is implemented as a fly-back converter than the ground can be separated easily, even a switching network can have separate grounds through capacitive isolation. Furthermore, for simplicity, the switching network in each implementation has a single conversion ratio. However, reconfigurable switching networks that provide power conversion at multiple distinct conversion ratios may be used instead.

In operation, switches labeled "1" and "2" are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" are "4" are in complementary states, switches labeled "5" are "6" are in complementary states, and switches labeled "7" are "8" are in complementary states. Typically, the regulating circuits operate at higher switching frequencies than the switching networks. However, there is no requirement on the switching frequencies between and amongst the switching networks and regulating circuits.

FIG. 84 shows a step-up converter corresponding to the architecture shown in FIG. 11. In this embodiment, the switching network 12A is a two-phase step-up cascade multiplier with a conversion ratio of 1:3 while the regulating circuit 16A is a two-phase boost converter. In operation, closing switches labeled 1 and opening switches 2 charges capacitors $C_3$ and $C_4$ while discharging capacitors $C_1$ and $C_2$. Conversely, opening switches 1 and closing switches 2 charges capacitors $C_1$ and $C_2$ while discharging capacitors $C_3$ and $C_4$.

FIG. 8 shows bidirectional step-down converter corresponding to the architecture shown in FIG. 28. In this embodiment, the switching network 12A is a two-phase step-down cascade multiplier with a conversion ratio of 4:1 while the regulating circuit 16A is synchronous buck converter. In operation, closing switches 1 and opening switches 2 charges capacitors $C_1$, $C_2$, and $C_3$ while discharging capacitors $C_4$, $C_5$, and $C_6$. Conversely, opening switches 1 and closing switches 2 charges capacitors $C_4$, $C_5$, and $C_6$ while discharging capacitors $C_1$, $C_2$, and $C_3$. All of the active components are implemented with switches so that the converter can process power in both directions.

Figure 86:
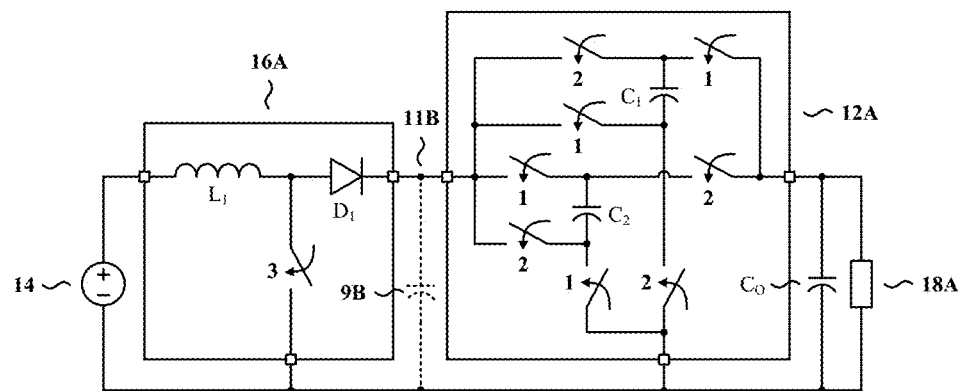
FIGS. 86 and 87 show implementations of the DC-DC converter illustrated in FIG. 30.

FIG. 86 shows a step-up converter consistent with the architecture shown in FIG. 30. In this embodiment, the regulating circuit 16A is boost converter while the switching network 12A is a two-phase step-up series-parallel switched-capacitor converter with a conversion ratio of 1:2. In operation, closing switches 1 charges capacitor $C_2$ while discharging capacitor $C_1$. Closing switches 2 has the complementary effect.

Figure 87:
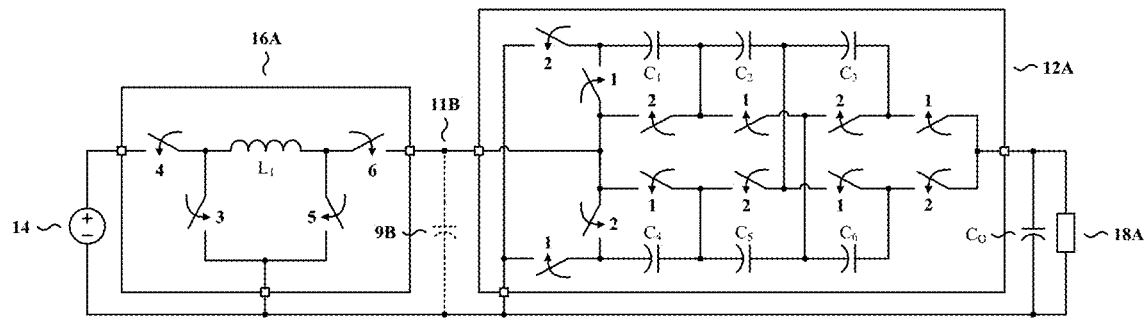

FIG. 87 shows a bidirectional up-down converter consistent with the architecture shown in FIG. 30. In this embodiment, the regulating circuit 16A is synchronous four switch buck-boost converter while the switching network 12A is a two-phase step-up cascade multiplier with a conversion ratio of 1:4. In operation, closing switches 1 charges capacitors $C_4$, $C_5$, and $C_6$ while discharging capacitors $C_1$, $C_2$, and $C_3$. Closing switches 2 has the complementary effect. All of the active components are implemented with switches so that the converter can process power in both directions.

Figure 2:
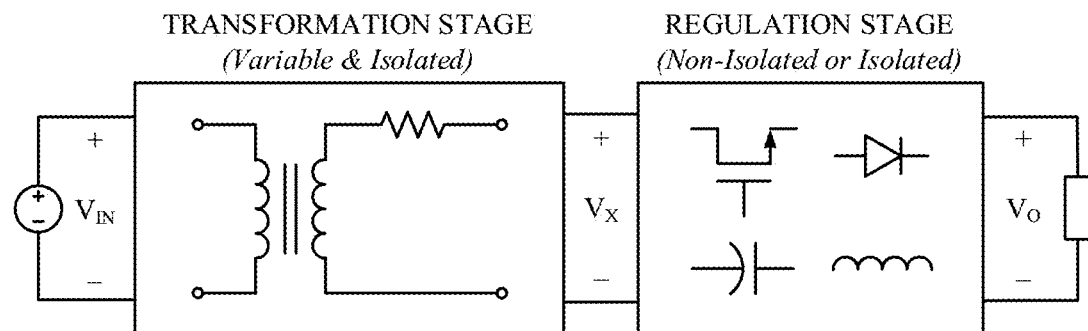
FIG. 2 shows a power converter similar to that shown in FIG. 1 but with an isolated transformation stage.
Figure 88:
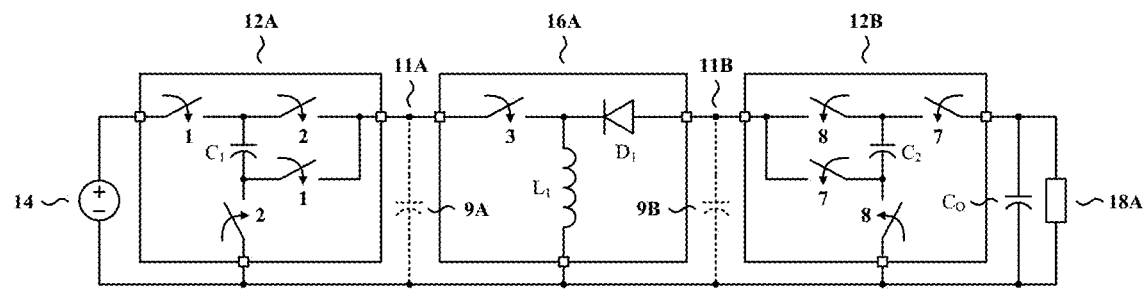
FIGS. 88 and 89 show implementations of the DC-DC converter illustrated in FIG. 29.

FIG. 88 shows an inverting up-down converter consistent with the architecture shown in FIG. 2. In this embodiment, the first switching network 12A is a step-down series-parallel switched-capacitor converter with a conversion ratio of 2:1, the first regulating circuit 16A is a buck/boost converter; and the second switching network 12B is a step-up series-parallel switched-capacitor converter with a conversion ratio of 1:2. In operation, closing switches 1 charges capacitor $C_1$ while closing switches 2 discharges capacitor $C_1$. Similarly, closing switches 7 discharges capacitor $C_2$ while closing switches 8 charges capacitor $C_2$.

Figure 89:
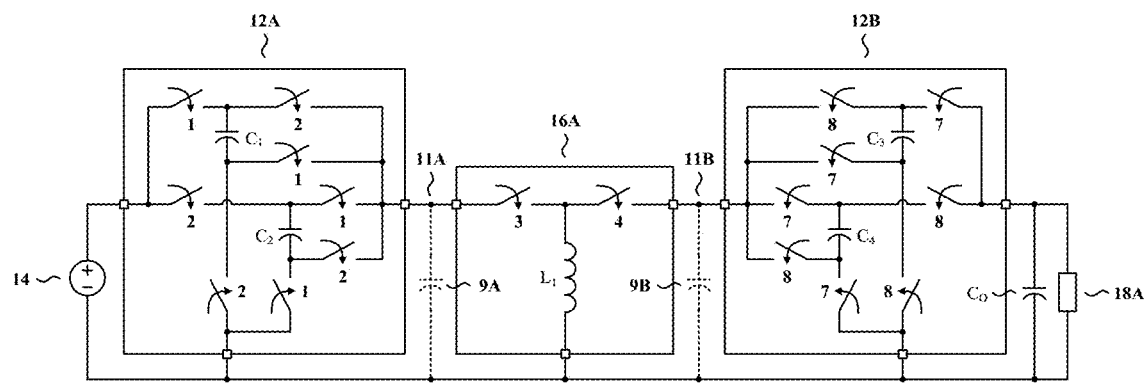

FIG. 89 shows a bidirectional inverting up-down converter consistent with the architecture shown in FIG. 29. In this embodiment, the first switching network 12A is a two-phase step-down series-parallel switched-capacitor converter with a conversion ratio of 2:1, the regulating circuit 16A is a synchronous buck/boost converter and the second switching network 12B is a two-phase step-up series-parallel switched-capacitor converter with a conversion ratio of 1:2. In operation, closing switches 1 charges capacitor $C_1$ while discharging capacitor $C_2$. Closing switches 2 has the complementary effect. Similarly, closing switches 7 charges capacitor $C_4$ while discharging capacitor $C_3$. Closing switches 2 has the complementary effect. All of the active components are implemented with switches so that the converter can process power in both directions.

Figure 90:
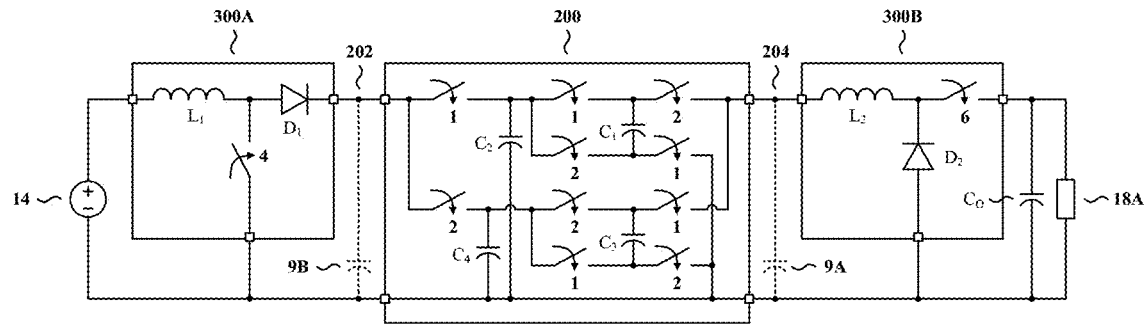
FIGS. 90 and 91 show implementations of the DC-DC converter illustrated in FIG. 32.
Figure 91:
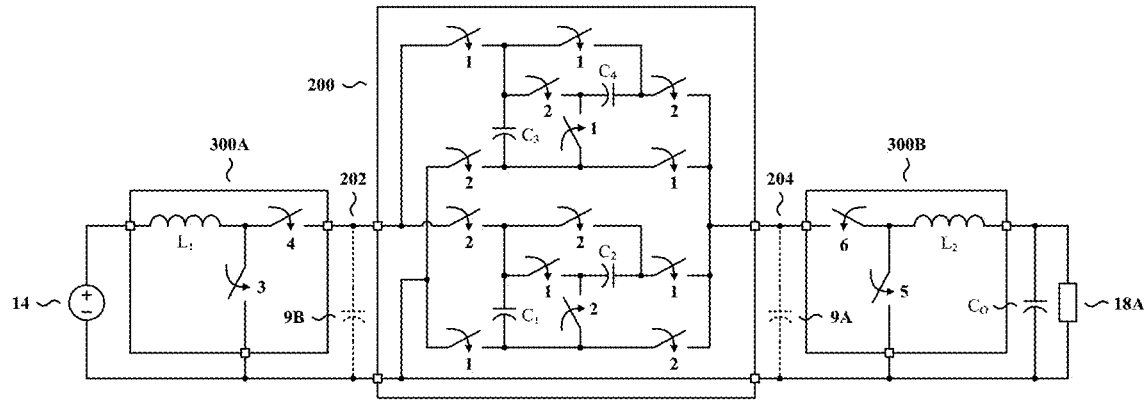

FIG. 90 shows a step-down converter consistent with the block diagram shown in FIG. 32. In this embodiment, the first regulating circuit 300A is a boost converter, the switching network 200 is a two-phase step-up series-parallel switched-capacitor converter with a conversion ratio of 1:2, and the second regulating circuit 300B is a boost converter. In operation, closing switches 1 charges capacitors $C_1$ and $C_2$ while simultaneously discharging capacitors $C_3$ and $C_4$. Closing switches 2 has the complementary effect.

FIG. 80 shows a bidirectional up-down converter consistent with the block diagram shown in FIG. 32. In this embodiment, the first regulating circuit 300A is a synchronous boost converter, the switching network 200 is a two-phase fractional step-down series-parallel switched-capacitor converter with a conversion ratio of 3:2 and the second regulating circuit 300B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so that the converter can process power in both directions.

It should be understood that the topology of the regulating circuit can be any type of power converter with the ability to regulate the output voltage, including, but without limitation, synchronous buck, three-level synchronous buck, sepic, soft switched or resonant converters. Similarly, the switching networks can be realized with a variety of switched-capacitor topologies, depending on desired voltage transformation and permitted switch voltage.

The physical implementation of the foregoing switching networks 12A includes four primary components: passive device layers, active device layers, interconnect structures, and thru-vias. The passive device layers have passive devices, such as capacitors. The active device layers have active devices, such as switches.

The separation of active and passive devices in different layers arises because active devices are made by CMOS processing. Thus, if one has passive devices on the same layer, they must be made by CMOS-compatible processing steps to avoid destroying the active devices. This constraint makes it difficult to manufacture capacitors that provide high capacitance in a small area of the chip. It also makes it difficult to make high Q inductors. To avoid these difficulties, it is preferable to produce integrated passive devices on their own wafer with a process flow that is optimized for producing such passive devices.

In some embodiments, the devices are integrated into a single monolithic substrate. In other embodiments, the devices are integrated into multiple monolithic substrates. The monolithic substrates are typically made of semiconductor material, such as silicon.

In a preferred practice, one makes passive devices on a passive device layer using an integrated passive device process and makes active devices on an active device layer using a CMOS process. These device layers are electrically connected together through a fine interconnect structure that includes thru-vias to allow electrical connections across device layers.

Figure 92:
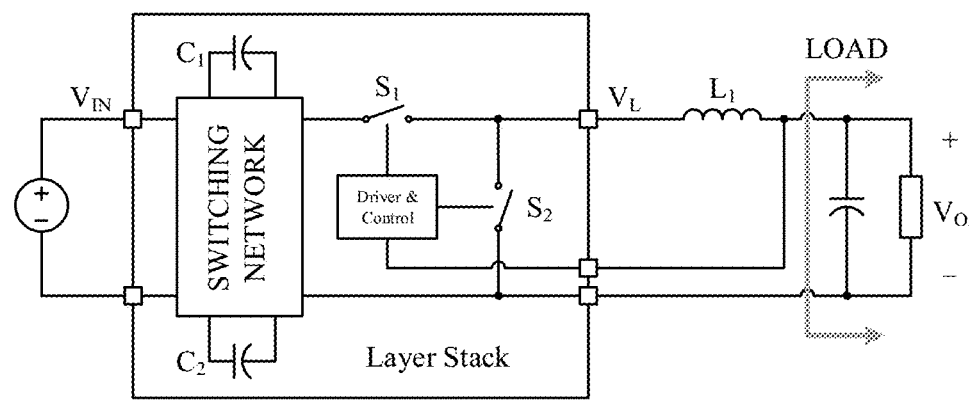
FIG. 92 shows a switching network implemented as a stack of layers.

FIG. 92 shows a circuit block diagram of a modular converter that uses capacitors in a switched-capacitor circuit to transfer energy. The block diagram shows a stack of layers that includes layers for both switches and capacitors. The switches within the stack of layers include first and second switches $S_1$, $S_2$. The capacitors within the stack of layers includes first and second capacitors $C_1$, $C_2$. A discrete inductor $L_1$ is mounted outside the layer stack.

Figure 93:
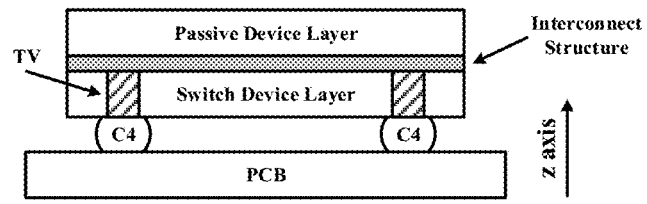
FIGS. 93-96 are cross-sections of the stack in FIG. 92 with different orders of passive and active layers.
Figure 94:
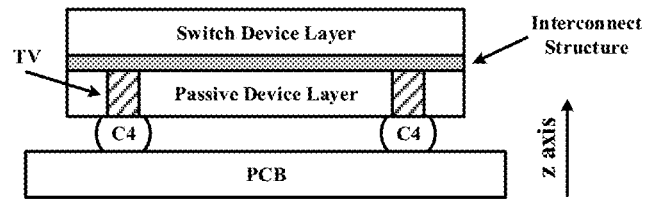
Figure 95:
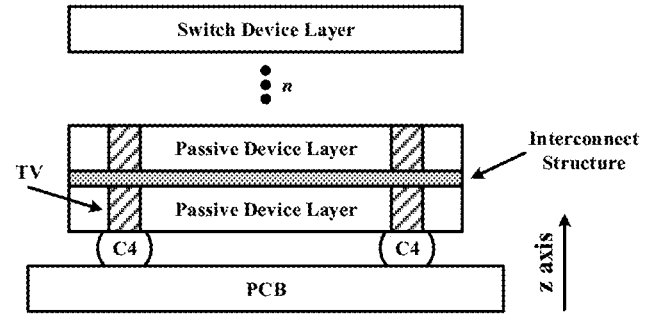

The layers within the stack of layers in FIG. 92 can be stacked in different ways. FIGS. 93-95 show side views of different ways of stacking layers, and placement of the interconnect structure and vias corresponding to each such configuration of layers. The active device layers (also known as switch device layer) include switches while the passive device layers include capacitors.

In FIG. 93, an active device layer connects to a printed-circuit board via a set of C4 bumps and a passive device layer is stacked above the active device layer. Thru-vias TV provide a connection between the printed-circuit board and an interconnect structure between the two layers.

In FIG. 94, this orientation is reversed, with the passive layer being connected to the printed-circuit board by the C4 bumps and the active layer above the passive layer. Once again, thru-vias TV provide a connection between the printed-circuit board and an interconnect structure between the two layers.

FIG. 95 shows the possibility of stacking multiple passive or active layers. In the particular embodiment shown, there are n passive devices layers and one active device layer. Through vias TV provide a path for connecting the printed-circuit board to interconnect structures between adjacent layers.

Figure 96:
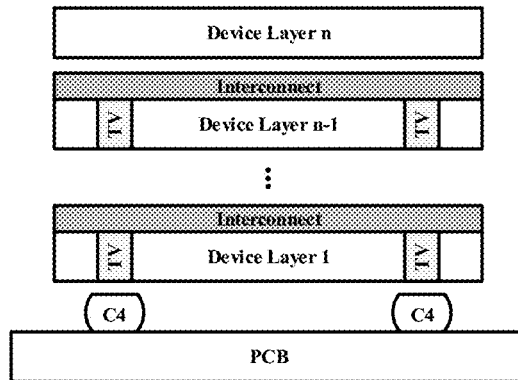

FIG. 96 shows an embodiment that has at least two device layers, one of which has switches and another of which has capacitors.

The C4 bumps are laid out along the printed-circuit board at a first pitch. An interconnect structure includes C5 bumps laid out at a second pitch that is smaller than the first pitch. An example of such C5 bumps can be seen in FIG. 106.

Each passive layer has capacitors that occupy a certain footprint on the chip. The capacitors are located such that each one is within a footprint of a switch on an active layer that is above or below the passive layer. Such an arrangement helps reduce energy loss and other parasitic losses in the interconnect structures.

Additional permutations arise because, as a result of the nature of known semiconductor fabrication processes, it is common to process only one face of a wafer. This face of the wafer has devices integrated into it. For this reason, it is called the "device face."

For each stack configuration, there are now additional permutations concerning whether the device face is an upper face or a lower face. For a given layer, with reference to the z-axis shown in FIGS. 93-95, an "upper face" of that layer faces in the +z direction a "lower face" faces in the −z direction.

As used herein, a layer is said to "face" the +z direction if a vector that is perpendicular to a plane defined by that layer and that is directed in a direction away from that layer is directed in the +z direction. A layer is said to face in the −z direction if it does not face the +z direction.

Figure 97:
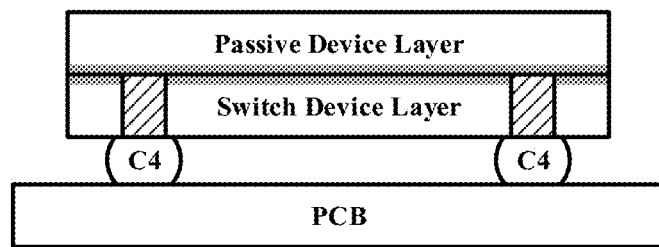
FIGS. 97-100 show different locations of active and passive device faces for the two-layer stack shown in FIG. 93.
Figure 98:
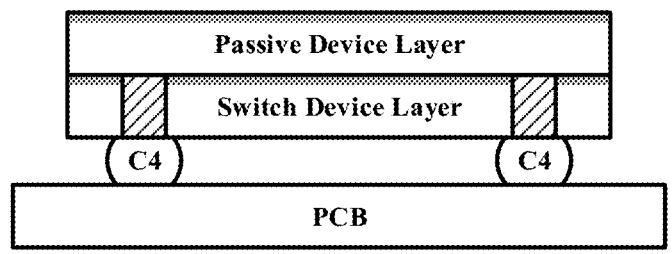
Figure 99:
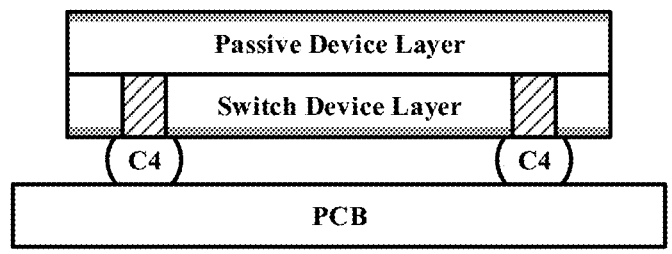

For the case in which there are only two device layers, FIGS. 97-99 show the four possible configurations of device faces when the upper layer is the passive layer, as shown in FIG. 93. FIGS. 101-104 show the four possible configurations of device faces when the upper layer is the active layer, as shown in FIG. 94.

Figure 100:
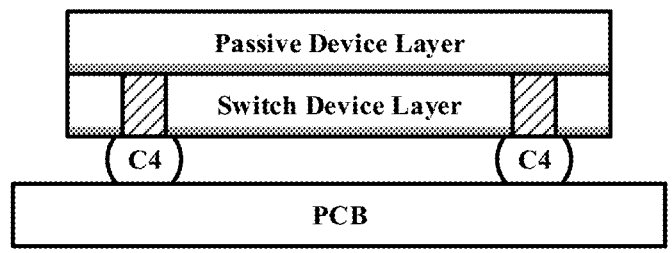

In FIG. 97, the active layer's device face is its upper face and the passive layer's device face is its lower face. Given that there are only two layers, this means they face each other. FIG. 99 shows a converse case in which the passive layer's device face is its upper face and the active layer's device face is its lower face. In FIG. 98, both the device faces of both the active and passive layers are on upper faces, whereas in FIG. 100 both are on lower faces.

Figure 101:
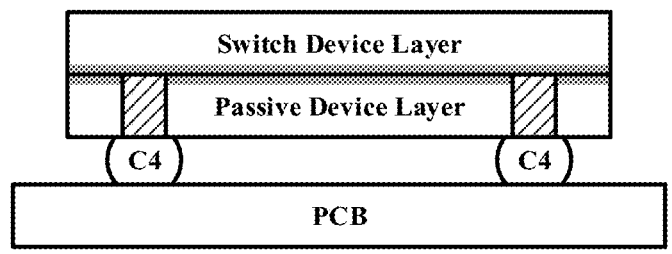
FIGS. 101-104 show different locations of active and passive device faces for the two-layer stack shown in FIG. 94.
Figure 102:
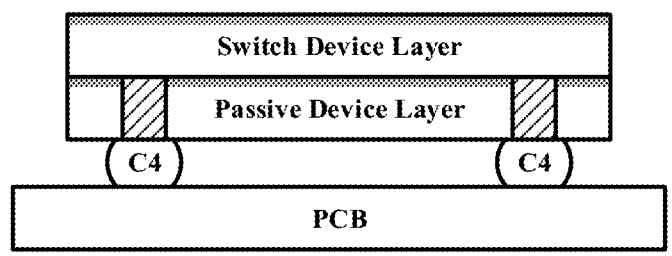
Figure 103:
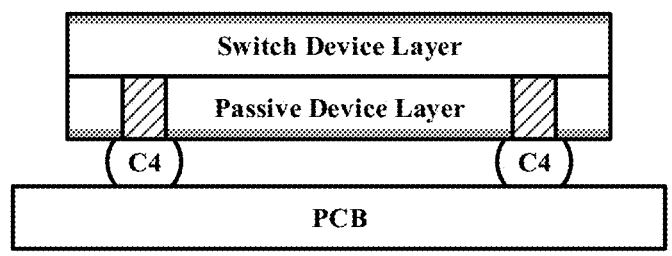

FIGS. 101-104 show the converse of FIGS. 97-100 for the case in which the active layer is now the upper layer. In FIG. 101, the active devices are on a lower face and the passive devices are on an upper face. Since there are only two layers, the active and passive devices face each other as they did in FIG. 97. In FIG. 102, the active devices and passive devices are on upper faces of their respective layers, whereas in FIG. 104 they are on lower faces of their respective layers. In FIG. 103, the active devices are on an upper face and the passive devices are on a lower face.

Naturally, certain configurations are preferable to others. The choice will depend upon numerous factors, most of which relate to thru-via technology and the number of pins that are available to connect the layers to external circuitry.

The passive device layer and active device layer can be in any form when attached. Two common choices would be in die or wafer form.

Figure 104:
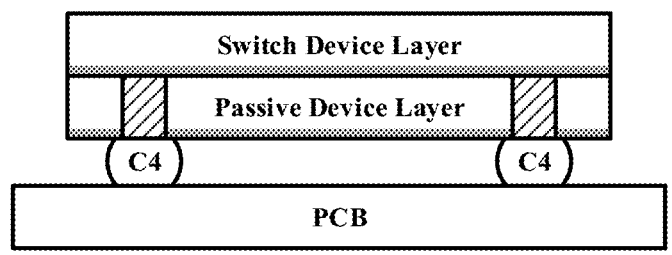
Figure 105:
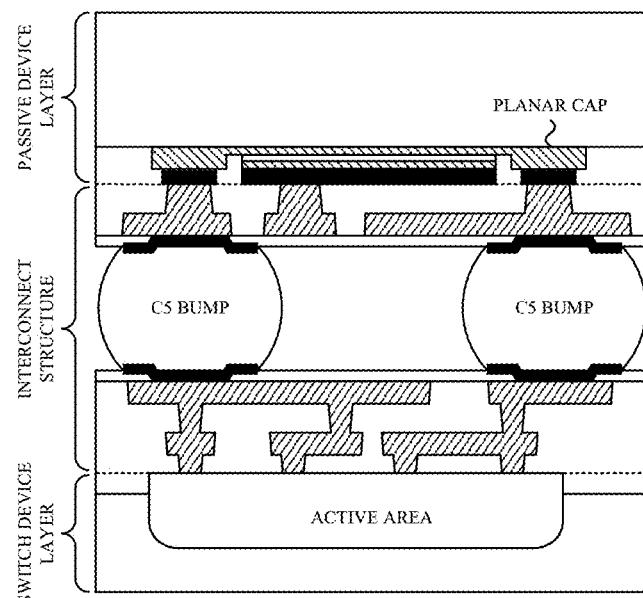
FIG. 105 shows an implementation of FIG. 93 in which the passive device layer has a planar capacitor.
Figure 106:
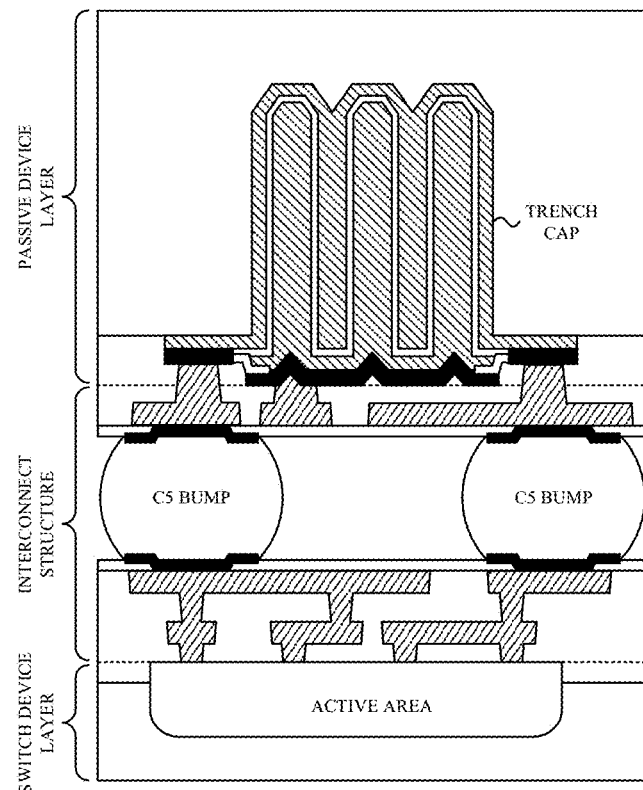
FIG. 106 shows an implementation of FIG. 93 in which the passive device layer has a trench capacitor.

FIGS. 104-106 show cross-sections of two die-to-die arrangements in which an interconnect structure connects switches in an active die to capacitors on a passive die. In FIG. 104, the switches connect to a planar capacitor whereas in FIG. 106 the switches connect to a trench capacitor. The first bumps C4, which provide the electrical connections from the die stack to the printed-circuit board, and through-vias TV are omitted in FIGS. 104-106 but can be seen in FIGS. 107-108.

Although any kind of capacitor can be used, trench capacitors are preferable to planar capacitors because trench capacitors offer greater capacitance per unit of die area than planar capacitors, sometimes by one or two orders of magnitude. Additionally, trench capacitors offer lower equivalent series resistance than planar capacitors. Both of these capacitor attributes are desirable for use in power converters that use capacitive energy transfer because they affect the efficiency of the power converter.

As shown in FIGS. 104-106, an interconnect structure connects the switches on the active die to the capacitors on the passive die. This interconnect structure can be implemented in numerous ways. In the case of FIGS. 104-106, the interconnect structure is the union of a multilayer interconnect structure on the passive die, a single layer of second bumps C5, and a multilayer interconnect structure on the active die. The only requirements are that the interconnect structure connects the switches on one device layer to the capacitors on the other device layer, that the two device layers are stacked one on top of the other, and that the second bumps C5 have a much finer pitch than the first bumps C4. In some embodiments, the pitch of the second bumps C5 is four times greater than the pitch of the first bumps. As used herein, "pitch" means the number of bumps per unit length.

Figure 107:
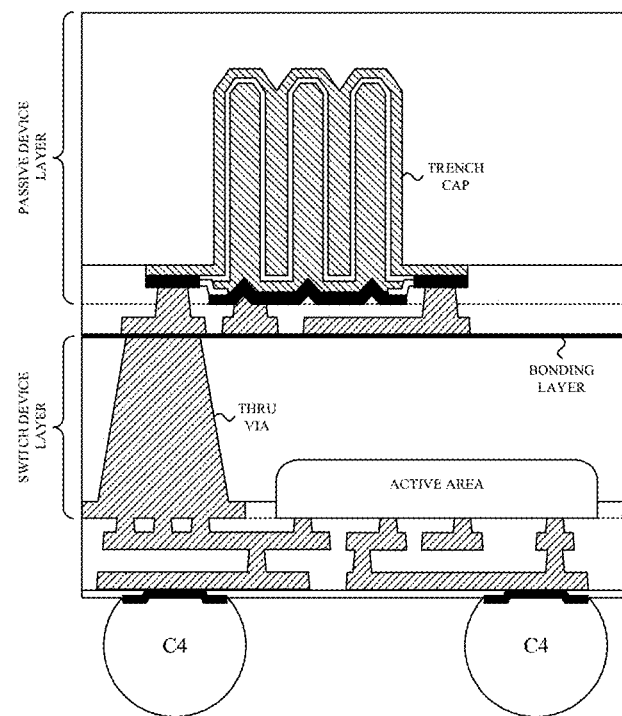
FIG. 107 shows an implementation of FIG. 105 with wafer-to-wafer bonding instead of die-to-die bonding.
Figure 108:
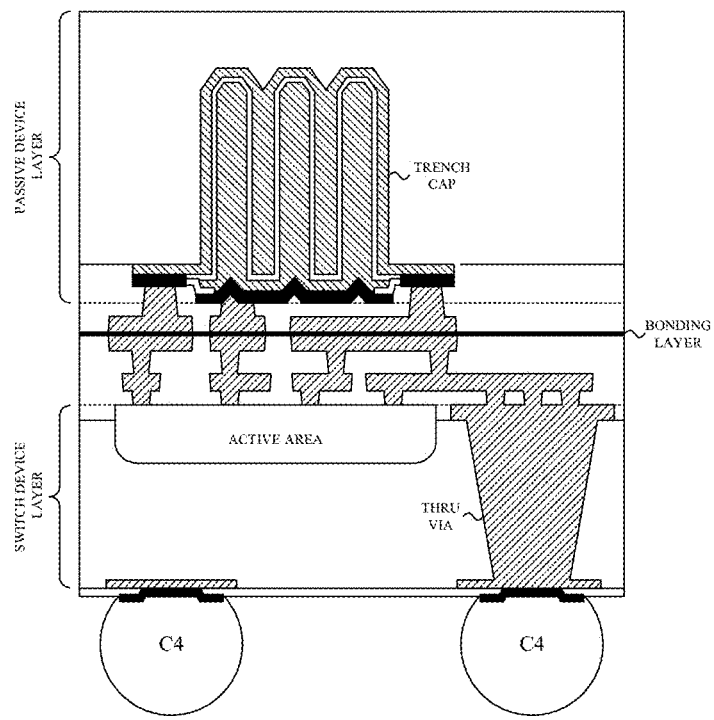
FIG. 108 shows an implementation of FIG. 107 but with the device face of the active layer being its upper face instead of its lower face.

FIGS. 107-108 show another embodiment implemented by wafer-to-wafer stacking. In this embodiment, there is no need for the second bumps C5. Instead, the active and passive wafers electrically connect to each other using a bonding process. In FIG. 107, the device face of the active layer is its lower face and in FIG. 108, the device face of the active layer is its upper face. Examples of suitable bonding processes are copper-copper and oxide-oxide bonding. Furthermore, FIGS. 107-108 show the thru-vias and some of the first bumps C4, which were omitted in FIGS. 104-106.

A switched-capacitor power converter of the type discussed herein has a great many switches and capacitors in a switched-capacitor power converter. These all have to be interconnected correctly for the power converter to operate. There are many ways to physically lay out the conducting paths that interconnect these components. However, not all of these ways are equally efficient. Depending on their geometry, some of these conducting paths may introduce noticeable parasitic resistance and/or inductance. Because there are so many interconnections, it can be a daunting challenge to choose a set of interconnections that will both provide acceptable parasitic resistance and inductance for the power converter as a whole.

One method that can be used to control these parasitic quantities is to partition the switches and capacitors.

Figure 110:
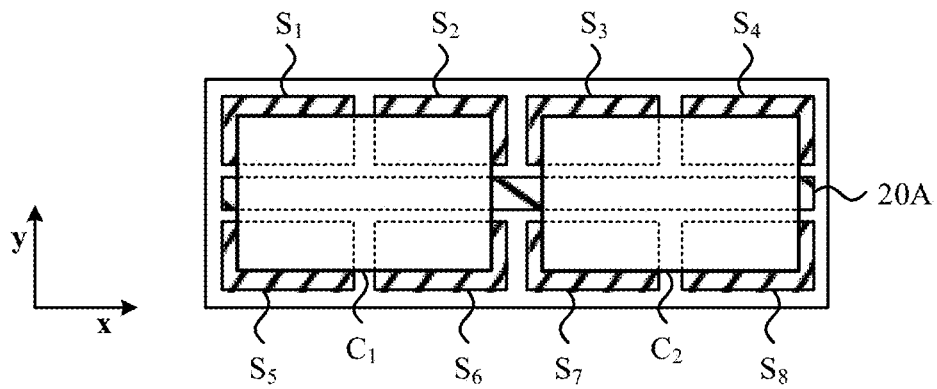
FIG. 110 shows an active layer with eight switches superimposed on eight capacitors on a passive layer below it.

One way to reduce such parasitic quantities is to choose the shape and locations of the switches on the active layer so that they fit beneath the capacitors on the passive layer. This avoids forcing current to undertake a long journey along the faces of the layers as it travels between a switch and a capacitor. An example of this technique is shown in FIG. 110, in which eight switches $S_1$-$S_8$ and a controller 20A are disposed on an active layer that is located below a passive layer having two capacitors. Although the switches are not completely visible through the passive layer, their locations are marked by dotted lines on FIG. 110. The FIG. shows a first capacitor $C_1$ on top of switches $S_1$, $S_2$, $S_5$, $S_6$ and a second capacitor $C_2$ on top of switches $S_3$, $S_4$, $S_7$, $S_8$.

Another way to reduce such parasitic quantities arises from recognizing that switches in a switching network 12A are usually active devices that are implemented with transistors. The switching network 12A may be integrated on a single monolithic semiconductor substrate or on multiple monolithic semiconductor substrates, or formed using discrete devices. Furthermore, since the device is a power converter, each switch may be expected to carry a large amount of current. A switch that carries a great deal of current is often implemented by numerous current paths connected in parallel to a common terminal.

Figure 109:
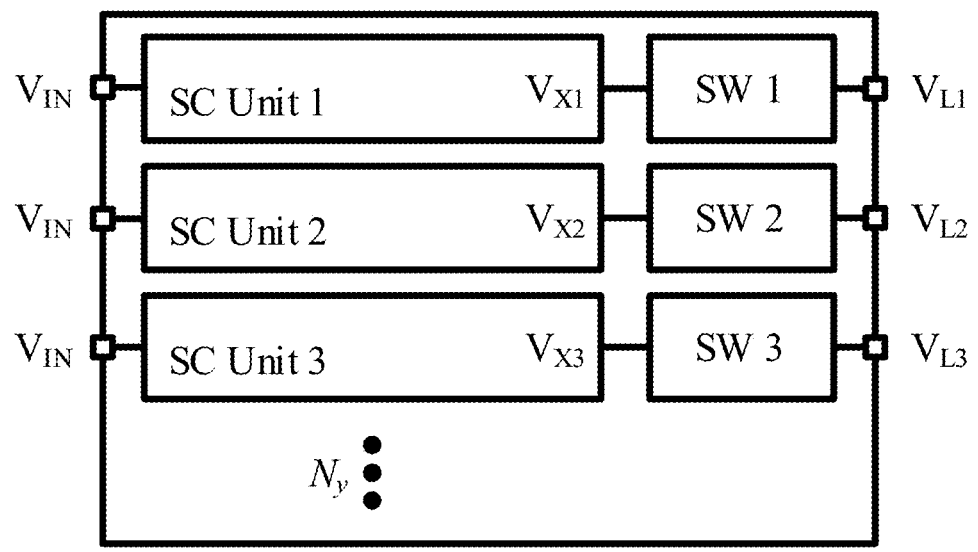
FIG. 109 shows three partitioned current paths of a switching network.
Figure 112:
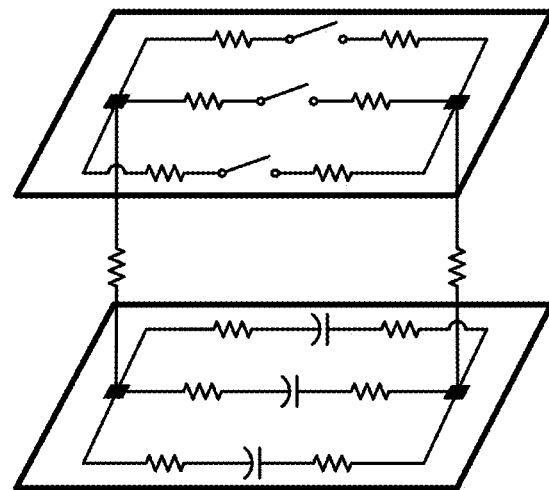
FIG. 112 shows a divided switching but not partitioned switch and capacitor.

In a switch as described above, the current paths that make up the switch are physically located side-by-side and thus occupy a space having a non-zero width. These current paths all connect to a terminal that is itself connected to a conducting path. An example of this configuration is shown in FIG. 109 and FIG. 112. In particular, FIG. 112 shows a transistor on a first layer and a capacitor on a lower layer. The transistor has first, second, and third current paths with the second current path being between the first and third. The three current paths extend between one source terminal and one drain terminal of the transistor.

Some current entering the source terminal shown in FIG. 112 goes straight ahead into the second current path. But some of it turns left or right before turning again to proceed down the first and third current paths. At the other end of the transistor's channel, current that traversed the first and third current paths must again make a turn to reach the drain terminal. These currents are referred to as "lateral" current.

Similarly, the lower layer of FIG. 112 shows a capacitor that has three separate current paths connected to first and second capacitor terminals. In the course of being charged and discharged, some lateral current is inevitable for reasons discussed in connection with the transistor in the upper layer.

Figure 113:
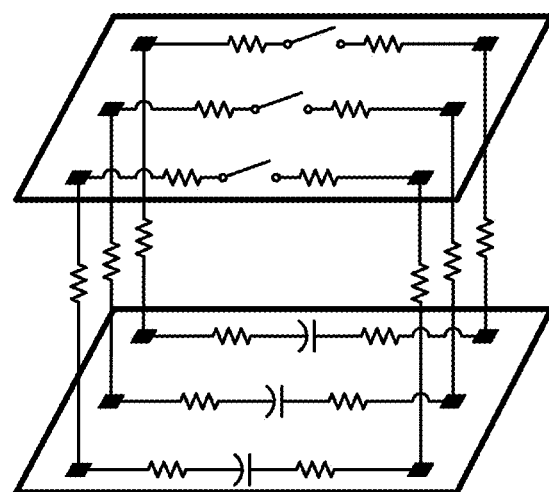
FIG. 113 shows a partitioned switch and capacitor.

One way to reduce this lateral current is to partition the switches and the capacitors into numerous partitions, as shown in FIG. 109 and FIG. 113. This partitioning essentially involves converting an n-terminal device into an (n+m) terminal device where m depends on the number of partitions. Thus, after having been partitioned, the two-terminal capacitor of FIG. 112 is transformed into a six-terminal capacitor in FIG. 113. Similarly, the source terminal and drain terminal of the transistor in FIG. 112 is transformed into three source terminals and three drain terminals in the transistor of FIG. 113.

The difference between FIGS. 112 and 113 is that each current path in FIG. 113 has its own terminal. In contrast, in FIG. 112, all current paths share the same terminals. Thus, FIG. 112 shows three current paths connected in parallel, whereas FIG. 113 shows three current paths that are partitioned and therefore isolated from each other.

The three current paths shown collectively represent a switch on an active layer that is formed by various doping profiles along a piece of silicon to provide charge carriers and then connecting those three lines to a pair of external terminals, as shown in FIG. 112, or connecting each line to its own pair of external terminals, as shown in FIG. 113.

The capacitor represented by the lower layer of FIG. 112 is a two-terminal capacitor like any conventional capacitor. Prior art converters use capacitors of this type. However, unlike prior art converters, which use two-terminal capacitors, a converter as disclosed herein uses a six-terminal capacitor as shown FIG. 113. Although such a capacitor is more complex because it has more terminals that need to be both made and properly aligned, it reduces parasitic effects caused by lateral current.

Similarly, the transistor switch represented by the upper layer of FIG. 112 has one source terminal and one drain terminal. This is the kind of transistor that is used in conventional power converters. In contrast, the transistor represented by the upper layer of FIG. 113 has three source terminals and three drain terminals. Although such a transistor is more complex because it has more terminals that need to be both made and properly aligned, it reduces parasitic effects caused by lateral current.

Figure 111:
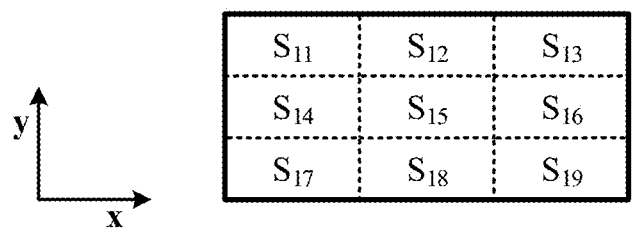
FIG. 111 shows one of the switches in FIG. 110 that has been partitioned into nine partitions.

It should be apparent that the act of partitioning is geometry-independent. Its essence is that of turning an n-terminal device into an (n+m) terminal device in an effort to reduce parasitic effects. There is no requirement that the device be oriented in any particular way. In particular, there is no requirement that the partitioning be carried out in only one dimension as shown in FIG. 113. For example, it is quite possible to partition a component along x and y directions as shown in the nine-partition switch of FIG. 111 and the six-partition capacitor shown in FIG. 114.

Figure 114:
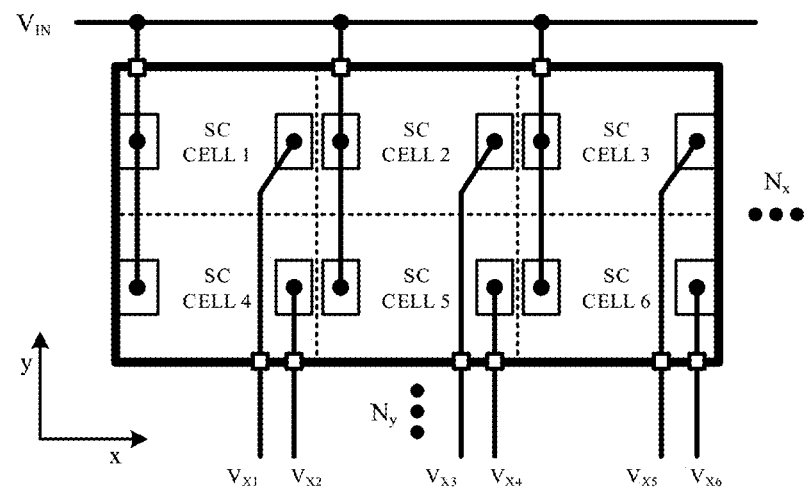
FIG. 114 shows a capacitor partitioned in two dimensions.

Both the techniques shown in FIG. 113 and FIG. 114 reduce the vertical and lateral distance between the active and passive devices while also providing a uniform current distribution to each individual switch and/or switched-capacitor cell. This tends to reduce the parasitic resistance and inductance of the connection between the switches and capacitors. This offers considerable advantages. Parasitic inductance limits the switching speed while parasitic resistance limits the efficiency of the power conversion process.

Figure 115:
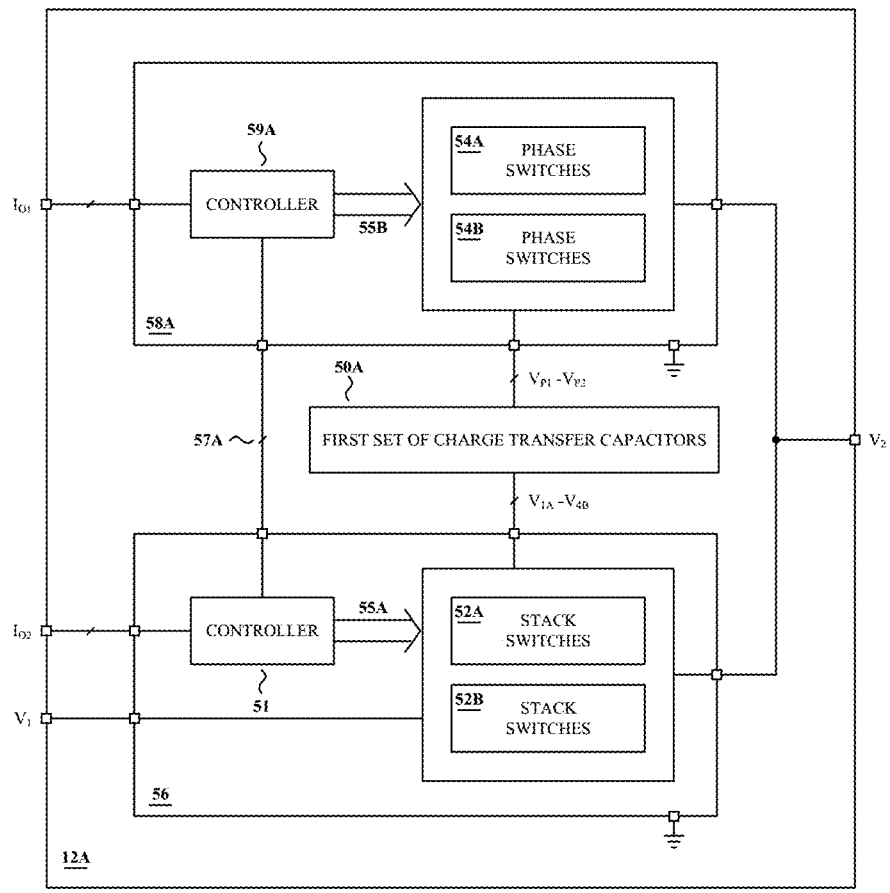
FIG. 115 is a functional block diagram of one embodiment of the switching network shown in FIGS. 13 and 12.

FIG. 115 shows a functional block diagram of the switching network 12A of FIGS. 13 and 12. The illustrated switching network 12A is a two-phase cascade multiplier that transforms a first voltage V1 into a second voltage V2. It does so by choreographing the flow of charge into and out of charge-transfer capacitors (also known as coupling capacitors) in a first charge-transfer capacitor set 50A.

Depending upon the type of capacitor, each charge-transfer capacitor may have a capacitance that is a function of the voltage across it. The charge-transfer capacitors are selected so that they all have the same capacitance at their respective operating voltages. However, at the same voltage, it may well be that the different charge-transfer capacitors will have different capacitances (e.g., MLCC have a strong capacitance dependence upon dc voltage bias).

The switching network 12A includes first and second phase-switch sets 54A, 54B, one for each phase. The switches within each phase-switch set 54A, 54B will be referred to herein as "phase switches." Similarly, the switching network 12A includes first and second stack-switch sets 52A, 52B, again, one for each phase. The switches within each stack-switch set 52A, 52B will be referred to herein as "stack switches."

Each of the switches takes up a certain amount of area on semiconductor substrate (e.g., silicon, GaAs, GaN, and SiC). The areas taken up by each switch need not be the same, however. In general, it is useful to have switches that are expected to carry considerable amounts of current be larger than those that carry less current. This permits the overall circuit to be smaller, while avoiding excessive conductive losses.

One or more of the switches can be partitioned to discourage lateral flow of current within the area defined by the switch. This can be carried out by having multiple terminals on each end of the switch. With such multiple terminals, current entering through any one terminal will be more likely to flow to a terminal directly opposite, thus reducing the extent of lateral current flow within the switch.

To control operation of the phase switches and the stack switches, the switching network 12A features two separate and distinct controllers: a phase controller 59A to control the phase switches and a stack controller 51 to control the stack switches.

The phase controller 59A controls the phase switches based at least in part on a phase-controller input signal $I_{O1}$. It does so through a phase control path 55B that connects the phase controller 59A to the phase switches. Meanwhile, the stack controller 51 controls the stack switches based at least in part on a stack-controller input signal $I_{O2}$. It does so through a stack control path 55A that connects the stack controller 51 to the stack switches. An inter-controller commissure 57 provides communication between the phase controller 59A and the stack controller 51. This permits the phase controller 59A and the stack controller 51 to control the phase switches and stack switches in a coordinated fashion rather than independently.

An advantage of the manufacturing procedures used in integrated circuits is the ability to integrate many components on a single die. This makes it easier to manufacture many components at once, and to thus reduce the manufacturing cost per component.

One way to manufacture the switching network 12A shown in FIG. 115 is to place the first and second stack-switch sets 52A, 52B and the first and second phase-switch sets 54A, 54B on the same die. Since only one die has to be manufactured, the cost of manufacture on a per switch basis would be expected to be reduced.

Because of their roles in the circuit, the stack switches and the phase switches have different requirements. In particular, the phase switches do not experience such high voltages or currents. As a result, the phase switches are relatively simple and inexpensive to manufacture. On the other hand, the stack switches are regularly exposed to fairly high voltage differences across them. Because of these special needs, the stack switches require different manufacturing steps.

The more complex procedure used to manufacture stack switches can be used to also manufacture phase switches. Thus, it is feasible to manufacture the first and second stack-switch sets 52A, 52B and the first and second phase-switch sets 54A, 54B on the same integrated circuit. This offers the advantage of having to carry out only one manufacturing procedure.

The switching network 12A shown in FIG. 115 avoids this advantage by having the first and second stack-switch sets 52A, 52B and the first and second phase-switch sets 54A, 54B be on different dies instead of on the same die. As a result, it becomes necessary to use two manufacturing steps instead of a single manufacture step.

Specifically, FIG. 115 shows a first phase-die 58A and a stack-die 56. The first phase-die 58A contains the first and second phase-switch sets 54A, 54B and the phase controller 59A. The stack-die 56 contains the first and second stack-switch sets 52A, 52B and the stack controller 51.

In some embodiments, one or both of the phase controller 59A and the stack controller 51 are also on separate controller dies, thus further increasing the number of separate manufacturing operations that must be carried out to construct the switching network 12A.

In the embodiment shown in FIG. 115, the first and second phase-switch sets 54A, 54B are both on the first phase-die 58A and the first and second stack-switch sets 52A, 52B are on a separate stack-die 56. Thus, each die is associated with both phases. However, it is also possible to place each phase on its own die.

Figure 116:
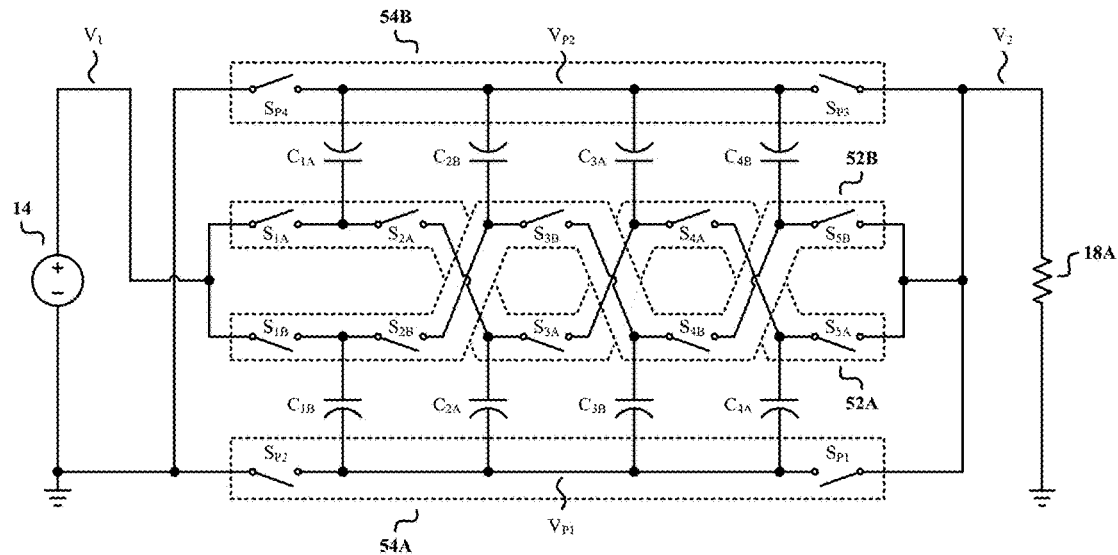
FIG. 116 shows an exemplary circuit of the switching network shown in FIG. 115.

For example, FIG. 116 shows a circuit that transforms a first voltage $V_1$ into a second voltage $V_2$, which it provides to the load 18A. The circuit has four separate dies: a first phase-die for the first phase-switch set 54A, a second phase-die for the second phase-switch set 54B, a first stack-die for the first stack-switch set 52A, and a fourth stack-die for the second stack-switch set 52B. In this embodiment, the first phase-switch set 54A and the first stack-die are associated with the first phase, and the second phase-switch set 54B and the second stack-switch set 52B are associated with the second phase.

In FIG. 116, the phase controller 59A and the stack controller 51 have been omitted to promote clarity. The switches are also shown schematically instead of as transistors. Had they been shown as transistors, the phase controller 59A and the stack controller 51 would connect to the gate terminals of those transistors.

The first phase-switch set 54A in FIG. 115 corresponds to first and second phase switches $S_{P1}$, $S_{P2}$ in FIG. 116. The second phase-switch set 54B in FIG. 115 correspond to third and fourth switches $S_{P3}$, $S_{P4}$ in FIG. 116. These are placed together on the same first phase-die 58A in FIG. 115.

The first stack-switch set 52A in FIG. 115 corresponds to the switches $S_{1A}$, $S_{2A}$, $S_{3A}$, $S_{4A}$ in FIG. 116. The second stack-switches 52B in FIG. 115 correspond to the switches $S_{1B}$, $S_{2B}$, $S_{3B}$, $S_{4B}$ in FIG. 116. These are all placed together on the same stack-die 56 in FIG. 115.

In connecting the various switches to the corresponding charge-transfer capacitors $C_{1A}$, $C_{2A}$, $C_{3A}$, $C_{4A}$, $C_{1B}$, $C_{2B}$, $C_{3B}$, $C_{4B}$ of the first charge-transfer capacitor set 50A, it is useful to avoid excessive path lengths between the charge-transfer capacitors $C_{1A}$, $C_{2A}$, $C_{3A}$, $C_{4A}$, $C_{1B}$, $C_{2B}$, $C_{3B}$, $C_{4B}$ and the stack switches $S_{1A}$, $S_{2A}$, $S_{3A}$, $S_{4A}$, $S_{1B}$, $S_{2B}$, $S_{3B}$, $S_{4B}$, $S_{P1}$, $S_{P2}$, $S_{P3}$, $S_{P4}$. Excessive path lengths are undesirable because they increase resistance between components. These path lengths can be reduced by suitably arranging the dies and the locations of the terminals on each die.

Figure 117:
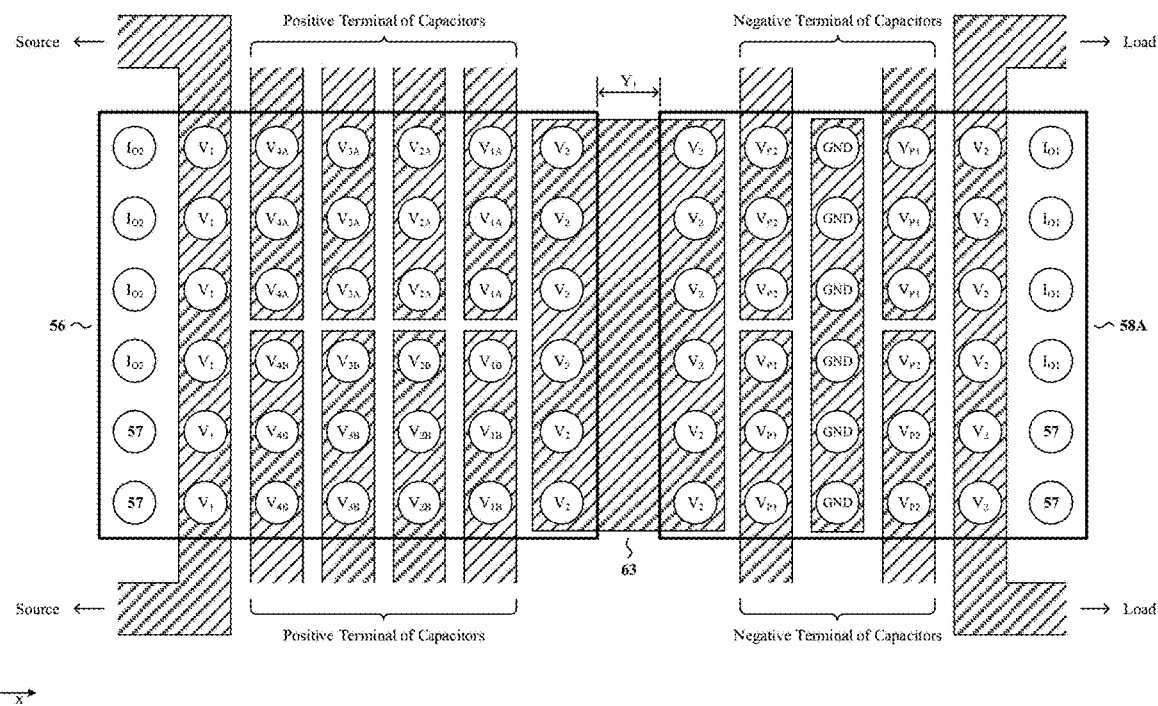
FIG. 117 shows a particular terminal layout for implementation of the switching network shown in FIG. 115.

FIG. 117 shows a particular implementation of terminals on the stack-die 56 and terminals on the first phase-die 58A for the embodiment shown in FIG. 115. Charge-transfer capacitors from the first charge-transfer capacitor set 50A extend between the stack-die 56 and the first phase-die 58A. The terminals shown in FIG. 116 have been configured so that those that connect to the positive terminals of the charge-transfer capacitors are all on one side and those that connect to the negative terminals of the charge-transfer capacitors are all on the other side. This reduces path length between the stack switches, the phase switches, and the charge-transfer capacitors.

As shown in FIG. 115, both the stack-die 56 and the first phase-die 58A connect to the output of the switching network 12A. In FIG. 117, a conducting interdie commissure 63 of length Y1 connects the output terminal of the switching network 12A to both the stack-die 56 and the first phase-die 58A. This length $Y_1$ is tuned to the length of the capacitors in the first charge-transfer capacitor set 50A.

The embodiment shown in FIG. 117 results in the stack-die 56 being coplanar with the first phase-die 58A. However, it is possible to further reduce conducting path lengths by having the stack-die 56 and first phase-die 58A on different planes. This can be achieved by folding the layout shown in FIG. 117 about a vertical line extending down the middle of the interdie commissure 63. Alternatively, it is possible to have different phases on different levels by folding along a horizontal axis of symmetry.

In the embodiment of FIG. 116, each charge-transfer capacitor $C_{1A}$, $C_{2A}$, $C_{3A}$, $C_{4A}$, $C_{1B}$, $C_{2B}$, $C_{3B}$, $C_{4B}$ will at some point be connected to the first phase-switch set 54A and to the second phase-switch set 54B. It is possible, however, to arrange the components to form a switching network 12A that has first and second charge-transfer capacitor sets 50A, 50B, each of which connects to only one of the first and second phase-switch sets 54A, 54B. An example of this topology can be seen in FIG. 118.

Figure 118:
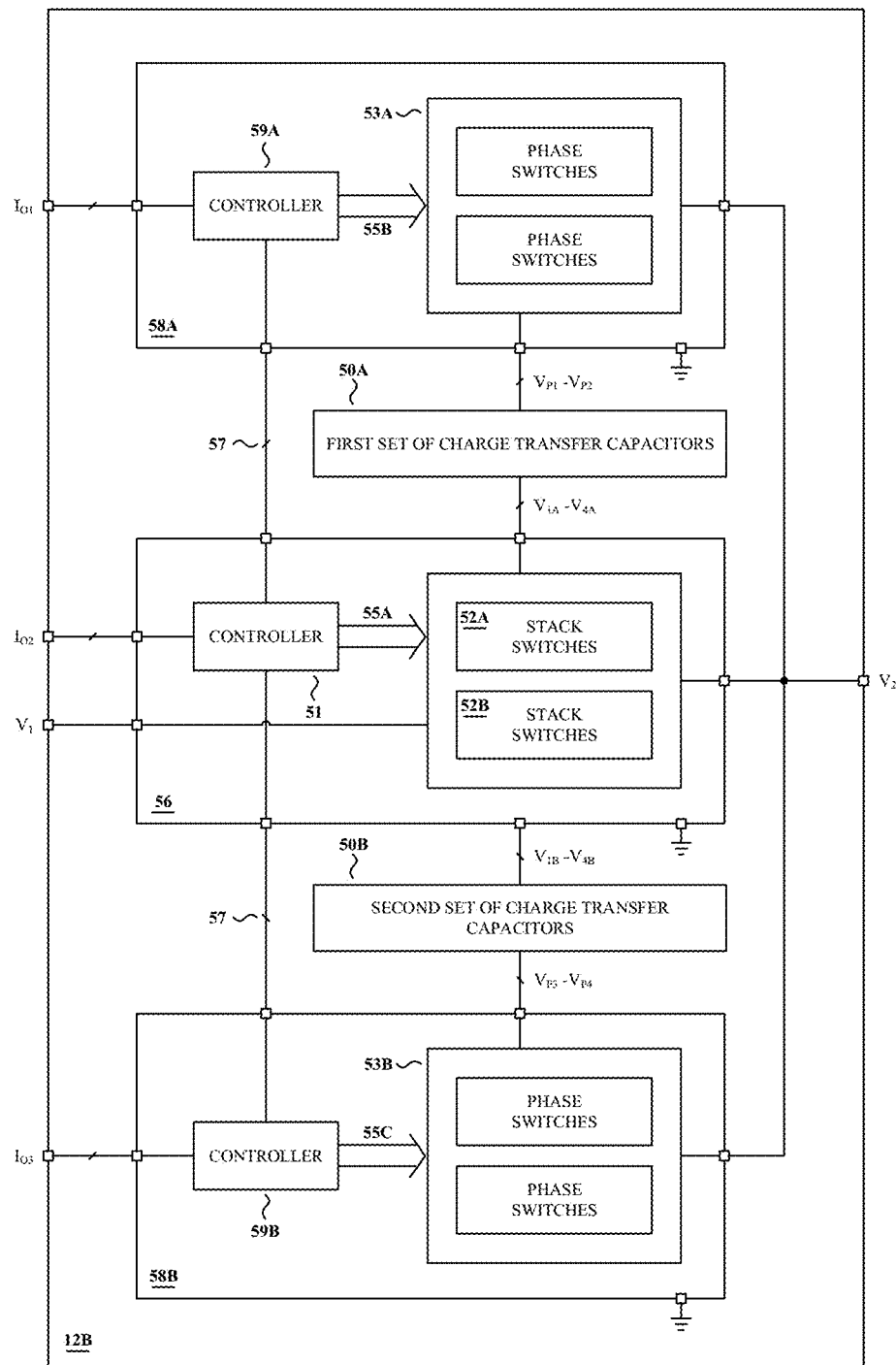
FIG. 118 is a functional block diagram of another embodiment of the switching network shown in FIGS. 13 and 12.

FIG. 118 shows a functional block diagram of a two-phase switching network 12A that transforms a first voltage $V_1$ into a second voltage $V_2$. It does so by choreographing the flow of charge into and out of charge-transfer capacitors.

The switching network 12A of FIG. 118 has first and second phase-switch sets 53A, 53B, one for each phase, and first and second stack-switch sets 52A, 52B, one for each phase. To control operation of these switches, the switching network 12A features three separate and distinct controllers: a first phase-controller 59A to control phase switches in the first phase-switch set 53A, a stack controller 51 to control stack switches in the first and second stack-switch sets 52A, 52B, and a second phase-controller 59B to control phase switches in the second phase-switch set 53B.

The first phase-controller 59A controls the operation of the phase switches in the first phase-switch set 53A based in part on a first-phase-controller input signal $I_{O1}$. It does so through a first phase-control path 55B that connects the phase controller 59A to the phase switches. The second phase-controller 59B controls the operation of the phase switches in the second phase-switch set 53B based at least in part on a second-phase-controller input signal $I_{O3}$. It does so through a second phase-control path 55C that connects the second phase controller 59B to the second phase-switch set 53B.

The stack controller 51 receives a stack-control input signal $I_{O2}$ and uses that to control the operation of the stack switches in the first and second stack-switch sets 52A, 52B. It does so via a stack control path 55A. The first phase-controller 59A, the second phase-controller 59B, and the stack controller 51 all communicate via an inter-controller commissure 57.

Figure 119:
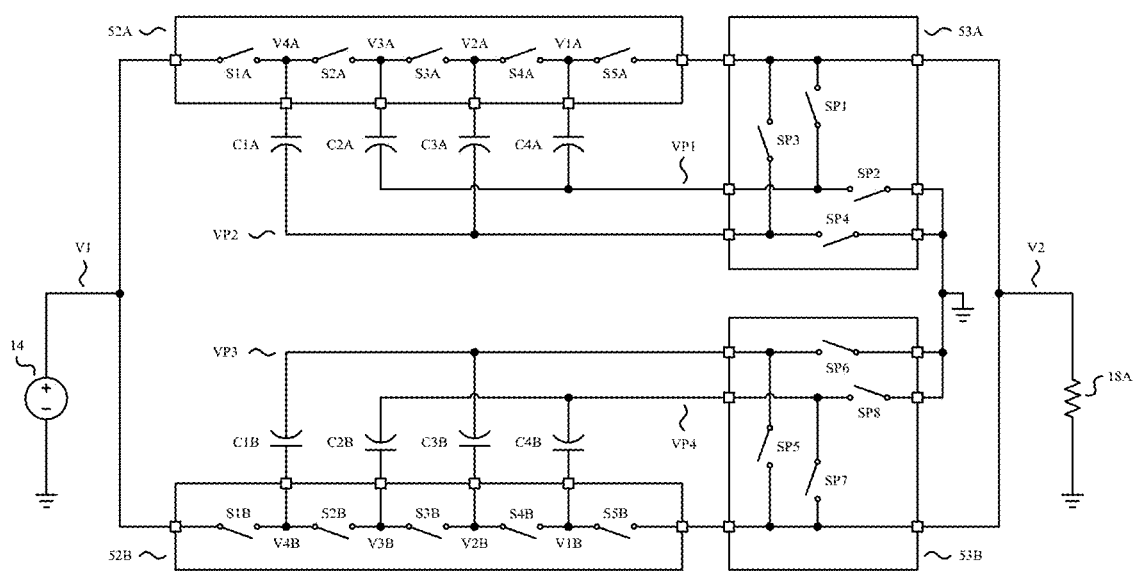
FIG. 119 shows an exemplary circuit of the switching network shown in FIG. 118.

FIG. 119 shows a circuit with four separate dies: a first phase-die for the first phase-switch set 53A, a second phase-die for the second phase-switch set 53B, a first stack-die for the first stack-switch set 52A, and a fourth stack-die for the second stack-switch set 52B.

In this embodiment, the first phase-switch set 54A and the first stack-die are associated with the first phase, and the second phase-switch set 54B and the second stack-switch set 52B are associated with the second phase. The first and second phase-controllers 59A, 59B and the stack controller 51 have been omitted to promote clarity. The switches are also shown schematically instead of as transistors.

The circuit shown in FIG. 119 includes a voltage source 14 and a load 18A. The voltage source 14 provides the first voltage $V_1$ in FIG. 118. The load 18A connects to the second voltage $V_2$ in FIG. 118.

The first phase-switch set 53A in FIG. 118 corresponds to first, second, third, and fourth phase switches $S_{P1}$, $S_{P2}$, $S_{P3}$, $S_{P4}$ in FIG. 119. The second phase-switch set 53B correspond to fifth, sixth, seventh, and eighth switches $S_{P5}$, $S_{P5}$, $S_{P7}$, $S_{P8}$ in FIG. 119. These are placed on first and second phase-dies 58A, 58B in FIG. 118.

The first stack-switch 52A in FIG. 118 corresponds to the first, second, third, fourth, and fifth switches $S_{1A}$, $S_{2A}$, $S_{3A}$, $S_{4A}$, $S_{5A}$ in FIG. 119. The second stack switches 52B in FIG. correspond to the sixth, seventh, eighth, ninth, and tenth switches $S_{1B}$, $S_{2B}$, $S_{3B}$, $S_{4B}$, $S_{5B}$ in FIG. 119. These are all placed together on the same stack-die 56 in FIG. 118.

Figure 120:
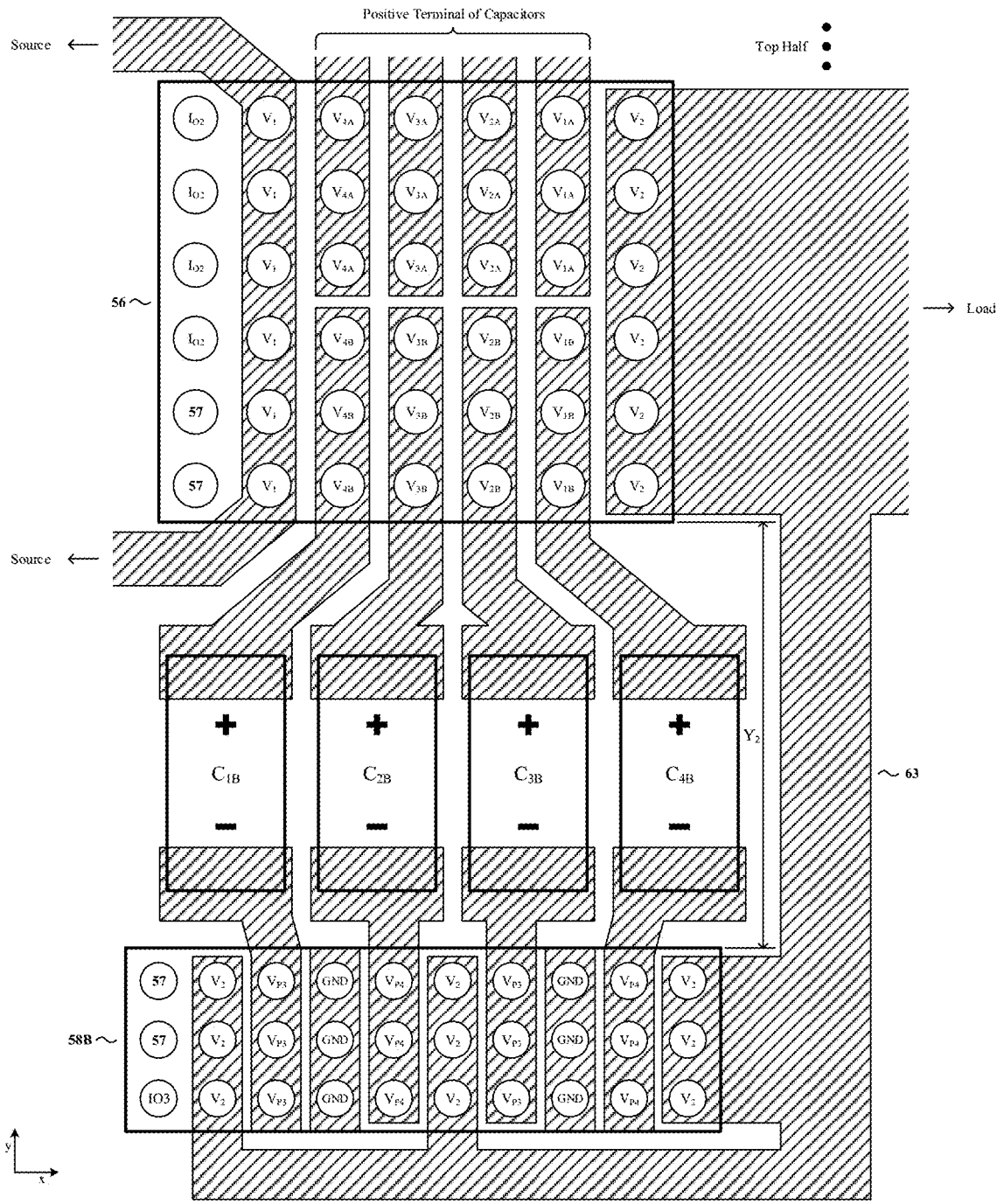
FIG. 120 shows a particular terminal layout for implementation of the switching network shown in FIG. 118.
Figure 121:
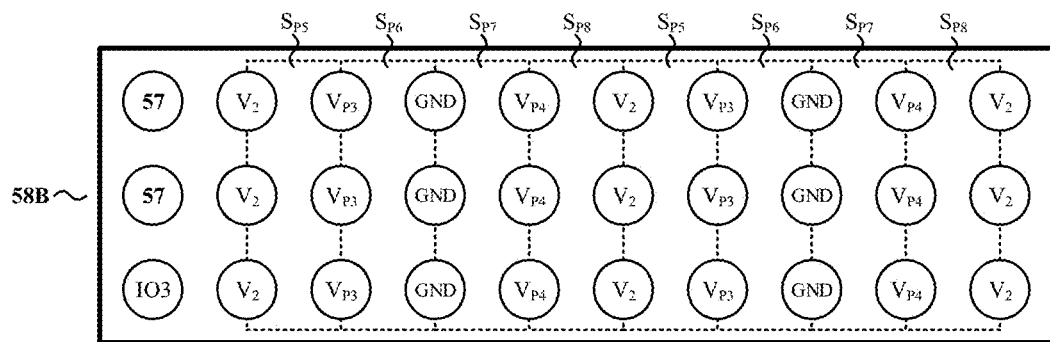
FIG. 121 shows the terminal layout for the phase-die in FIG. 120 with the locations of the phase switches in FIG. 119 explicitly shown therein.

FIG. 120 shows a particular implementation of terminals on the stack-die 56, terminals on the second phase-die 58B, and the charge-transfer capacitors $C_{1B}$, $C_{2B}$, $C_{3B}$, $C_{4B}$ for the switching network 12A shown in FIG. 118. The locations at which the phase switches $S_{P5}$, $S_{P6}$, $S_{P7}$, $S_{P8}$ from the second phase-switch set 53B connect to the terminals of the second phase-die 58B can be seen in FIG. 121.

The terminals on the second phase-die 58B are laid out in a manner similar to that shown for the first phase-die 58A and have thus been omitted for clarity. Similarly, the interconnections between the charge-transfer capacitors $C_{1A}$, $C_{2A}$, $C_{3A}$, $C_{4A}$ and both the stack-die 56 and the first phase-die 58A are similar to those shown in FIG. 120 and are omitted for clarity.

Referring back to FIG. 120, an interdie commissure 63 again connects the second phase-switch die 58B to the stack-die 56. The interdie commissure 63 has a bridge section having a length $Y_2$ that depends on the physical size of the charge-transfer capacitors $C_{1B}$, $C_{2B}$, $C_{3B}$, $C_{4B}$ from the second charge-transfer capacitor set 50B. The dimensions of the interdie commissure 63 are enlarged at selected locations to avoid excessive build-up of current density. As a result, the interdie commissure 63 is wider at locations where considerable current is expected to flow, but narrower at locations where smaller currents are expected to flow. This avoids having an excessively large footprint while also avoiding resistive losses.

Figure 122:
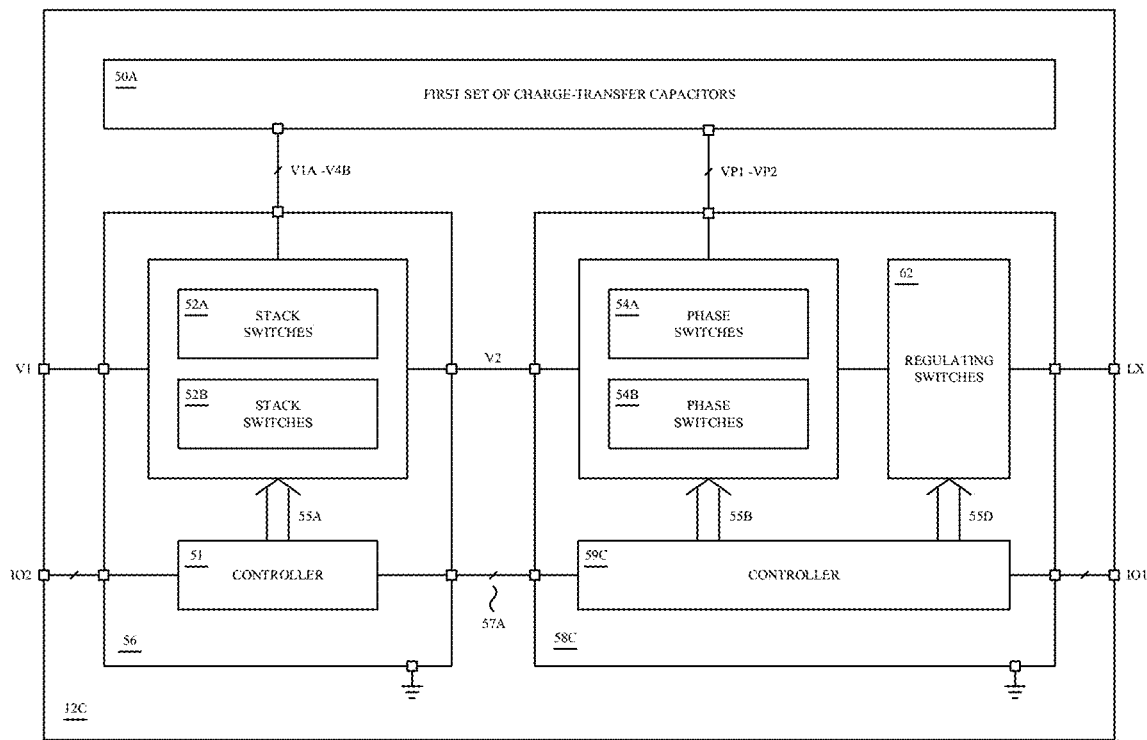
FIG. 122 is a functional block diagram of another embodiment of the switching network shown in FIGS. 13 and 12, but the inclusion of switches for a regulator to which the switching network is to be connected.

In many cases, the switching network 12A is to be connected to a regulator (also known as regulating circuit). Under these circumstances, it is useful to include a regulator-switch set 65 within the phase-die 58C as shown in FIG. 122. It is expedient to integrate the first and second phase-switch sets 54A, 54B and the regulator-switch set 65 in the phase-die 58C since the regulator switches and the phase switches have similar performance requirements. Both the phase switches and the regulator switches are intended to sustain essentially the same voltage. As such, the same manufacturing process can be used for both kinds of switch.

The regulator that is to be coupled to the regulator-switch set 65 introduces an inductive load, which in turn introduces considerable noise in the substrate of any die that contains the regulator-switch set 65. Since, during operation, the substrate of the phase-die 58C is inherently noisier than the substrate of the stack-die 56, it is advantageous to include the regulator-switch set 65 in the phase-die 58C so that operation of the stack-die 56 can proceed with minimal disturbance due to electrical noise.

In the embodiment shown in FIG. 122, the phase controller is replaced by a hybrid controller 59C configured to control both the regulator-switch set 65 and the phase-switch set 54A, 54B via a phase control path 55B, which extends from the hybrid controller 59C to the phase-switch set 54A, 54B, and a regulator control path 55D, which extends from the hybrid controller 59C to the regulator-switch set 65.

An advantage of placing the phase switches and stack switches on separate dies instead of integrating them into the same die is that doing so reduces the area of the die that holds the stack switches. Since this die must undergo a more expensive manufacturing process, and since the manufacturing cost is a function of die area, it is advantageous to reduce the die area. Since only the stack switches actually require the more expensive manufacturing process, it is advantageous to omit the phase switches and to place them on a separate die, which can then be manufactured more inexpensively.

Another advantage that arises is that having stack switches and phase switches on separate dies provides more flexibility in routing between components. This is because when all the components are on the same die, the components and the interconnections are confined to a two-dimensional space. In contrast, when a third dimension becomes available, there is an extra degree of freedom that can be used to optimize placement of the dies relative to each other to minimize path lengths.

FIGS. 123-128 collectively illustrate the flexibility associated with having a separate phase-die 58 and stack-die 56.

Figure 123:
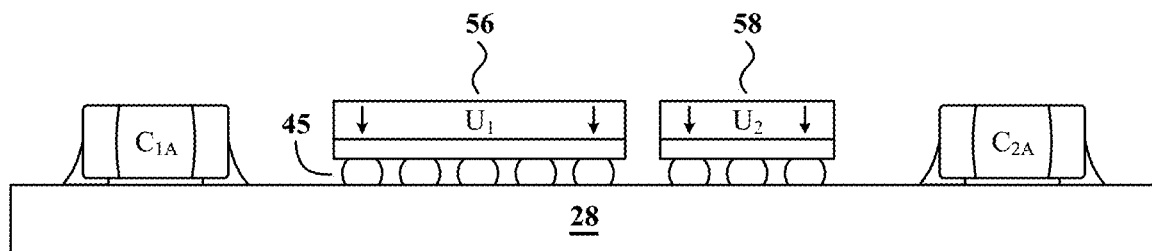
FIG. 123 shows a substrate bearing components for implementing a switching network.

FIG. 123 shows a substrate 28 supporting charge-transfer capacitors $C_{1A}$, $C_{2A}$, a first die $U_1$ and a second die $U_2$. In the embodiment shown, the first die U1 corresponds to the stack-die 56 and the second die $U_2$ corresponds to the phase-die 58. The first and second dies $U_1$, $U_2$ are side-by-side with their respective device faces both facing the substrate 28. Electrically-conductive bumps 45 provide electrical communication between the first and second dies $U_1$, $U_2$ and the charge-transfer capacitors $C_{1A}$, $C_{2A}$.

Figure 124:
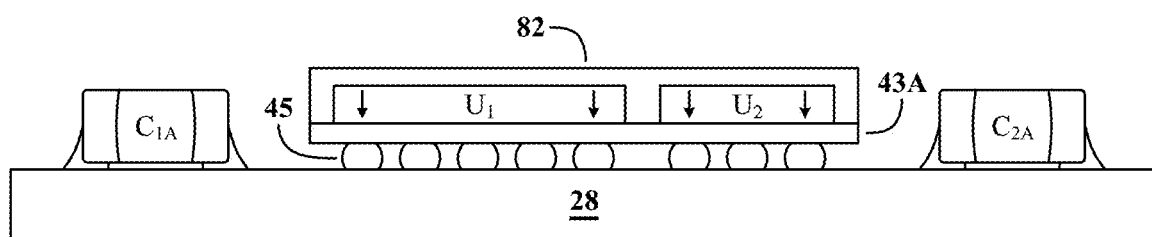
FIG. 124 shows the phase die and stack die of FIG. 123 within the same package.

FIG. 124 shows a substrate 28 supporting charge-transfer capacitors $C_{1A}$, $C_{2A}$, a first die $U_1$, and a second die $U_2$. The first and second dies $U_1$, $U_2$ are side-by-side inside a package 82 with their respective device faces both facing the substrate 28. Within the package 82, a first electrical interconnect layer 43A provides interconnection between the first and second dies $U_1$, $U_2$. Electrically-conductive bumps 45 provide electrical communication between the package 82 and the charge-transfer capacitors $C_{1A}$, $C_{2A}$.

Figure 125:
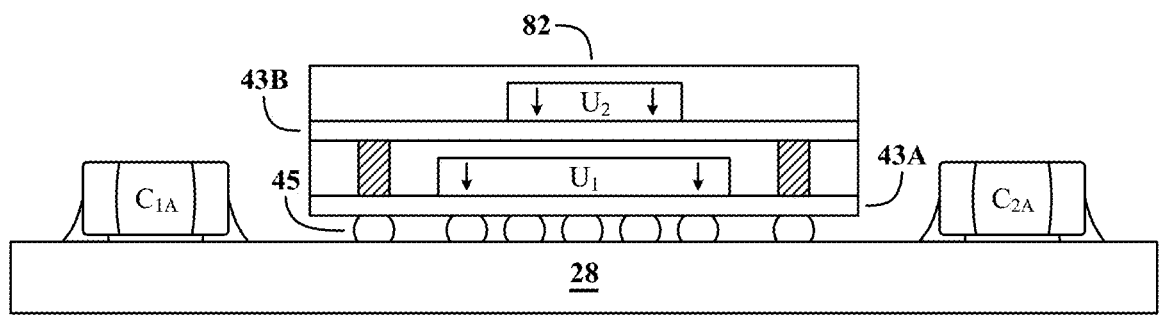
FIG. 125 shows a stacked phase die and stack die.

FIG. 125 shows the substrate 28 supporting a package 82 in which the second die $U_2$ is stacked on top of the first die $U_1$. A first interconnect layer 43A connects the first die $U_1$ with the rest of the switching network 12A and a second interconnect layer 43B connects the second die $U_2$ with the rest of the switching network 12A. Electrically-conductive bumps 45 provide electrical communication between the package 82 and the charge-transfer capacitors $C_{1A}$, $C_{2A}$.

Figure 126:
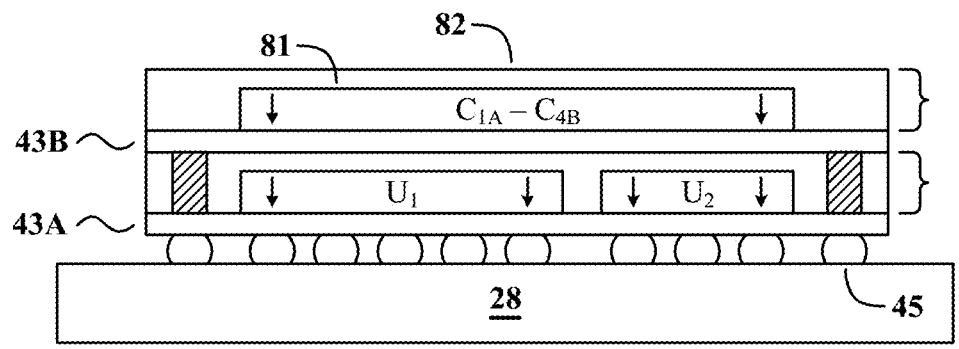
FIG. 126 shows the circuit of FIG. 124 but with the charge-transfer capacitors now being on their own capacitor die and included on their own layer in the package.

FIG. 126 shows the substrate 28 supporting a package 82 having a passive device layer 41A and an active device layer 42A. The charge-transfer capacitors $C_{1A}$-$C_{4B}$ are integrated into their own capacitor die 81, which is in the passive device layer 41A. The first and second dies $U_1$, $U_2$ are in the active device layer 42A. In this embodiment, the passive device layer 41A can be viewed as a charge-transfer layer and the active device layer 42A can be viewed as a switching layer. Electrically-conductive bumps 45 provide electrical communication between the package 82 and any external components.

Figure 127:
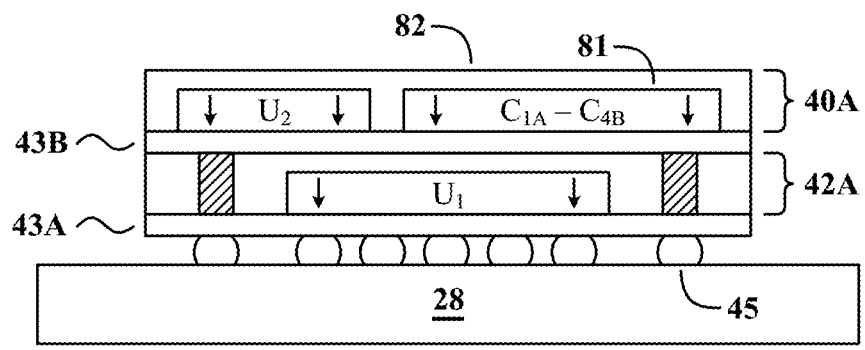
FIG. 127 shows the circuit of FIG. 124 but with the charge-transfer capacitors now being on their own capacitor die, included in the package, and occupying the same layer as the phase die.

FIG. 127 shows the substrate 28 supporting a package 82 having a mixed device layer 40A, which is a hybrid layer that serves as both a switching layer and a charge-transfer layer, and an active device layer 42A, which is only a switching layer. The charge-transfer capacitors $C_{1A}$-$C_{4B}$ are integrated into their own capacitor die 81, which is in the mixed device layer 40A, along with the second die $U_2$. The first die $U_1$ is in the active device layer 42A, but laterally offset from the second die $U_2$. This provides a shorter path length for connections between the first and second dies $U_1$, $U_2$. Electrically-conductive bumps 45 provide electrical communication between the package 82 and any external components.

Yet another advantage of having the various components of a switched-capacitor circuit be on separate dies is that doing so can promote heat dissipation. This is because there will be more surface area available to radiate heat. The ability to efficiently dissipate heat is particularly important for a power converter, since a power converter has a tendency to run hot. An example of how to arrange dies to promote cooling is shown in FIG. 128.

Figure 128:
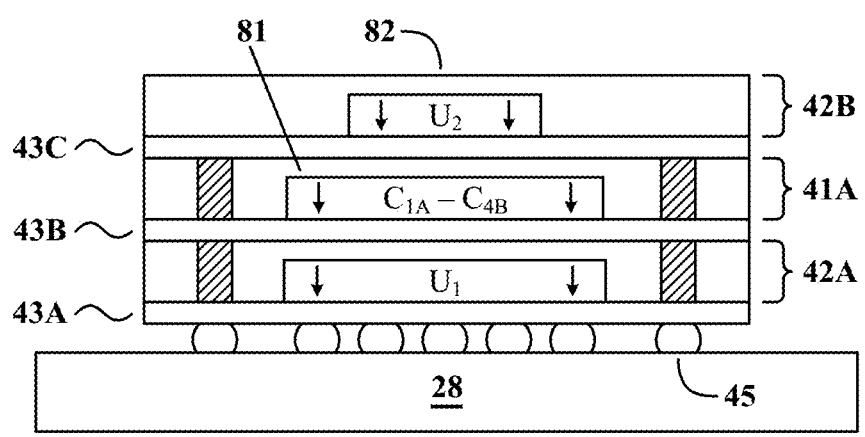
FIG. 128 shows a package in which the charge-transfer capacitor die is sandwiched between the phase die and the stack die.

FIG. 128 shows the substrate 28 supporting a package 82 having a first active device layer 42A, a second active device layer 42B, and a passive device layer 41A between the first active device layer 42A and the second active device layer 42B. The charge-transfer capacitors $C_{1A}$-$C_{4B}$ are integrated into their own capacitor die 81, which is in the passive device layer 41A. The second die $U_2$ is in the second active device layer 42B and the first die $U_1$ is in the first active device layer 42A. In this embodiment, the passive device layer 41A is the charge-transfer layer and the first and second active device layers 42A, 42B are both switching layers. Electrically-conductive bumps 45 provide electrical communication between the package 82 and any external components.

An advantage of the embodiment shown in FIG. 128 is that the hottest components of the circuit, namely the active device layers 42A, 42B, are outside, whereas the passive device layer 41A, which stays cooler, is in the inside. This configuration thus promotes cooling.

Figure 129:
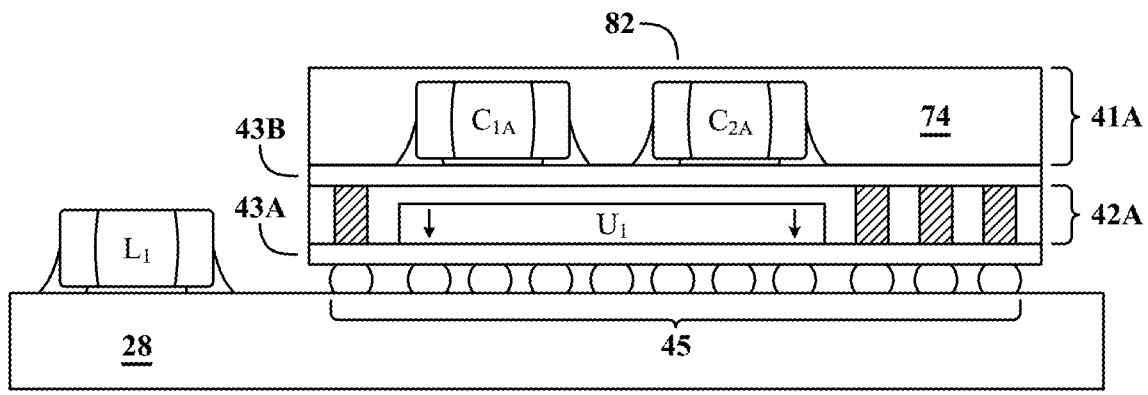
FIGS. 129-133 show embodiments of a circuit that also includes an inductor.

FIG. 129 shows the substrate 28 supporting an inductor $L_1$ and a package 82 having a passive device layer 41A and an active device layer 42A. Charge-transfer capacitors $C_{1A}$, $C_{2A}$ are disposed in the passive device layer 41A. The charge-transfer capacitors $C_{1A}$, $C_{2A}$ are discrete elements that, in some embodiments, are surrounded by a matrix 74 to mechanically support them. The first die $U_1$ is in the active device layer 42A with its device face facing electrically conductive bumps 45 that provide electrical communication between the package 82 and external components, including the inductor $L_1$. In this embodiment, the passive device layer 41A is the charge-transfer layer and the active device layer 42A is the switching layer. First and second interconnect layers 43A, 43B provide electrical communication between the charge-transfer capacitors $C_{1A}$, $C_{2A}$ and the first die $U_1$.

Figure 130:
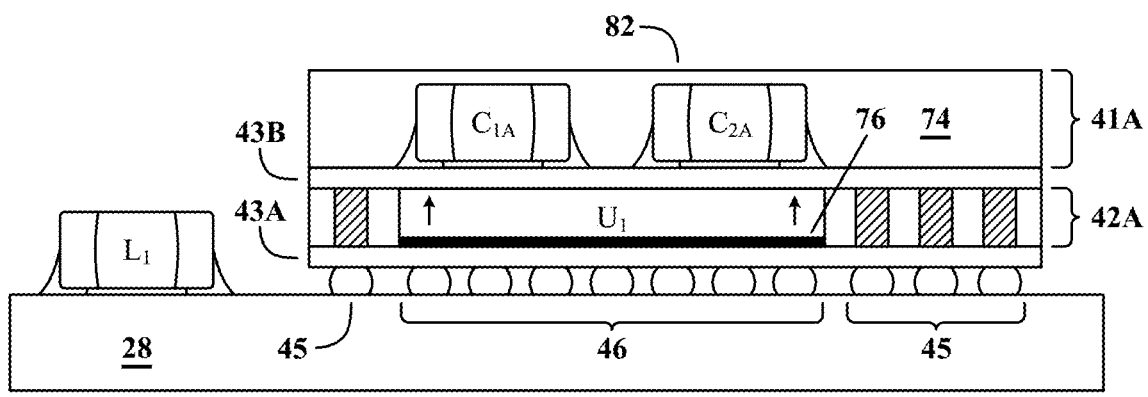

FIG. 130 shows the substrate 28 supporting an inductor $L_1$ and a package 82. The package 82 has a passive device layer 41A and an active device layer 42A. A first interconnect layer 43A resting on electrically-conductive bumps 45 provides electrical communication between the package 82 and external components, including the inductor $L_1$. Charge-transfer capacitors $C_{1A}$, $C_{2A}$ are disposed in the passive device layer 41A. These charge-transfer capacitors $C_{1A}$, $C_{2A}$ are discrete elements that, in some embodiments, are surrounded by a matrix 74 to mechanically support them. The first die $U_1$ is in the active device layer 42A with its device face facing a second interconnect layer 43B at the passive device layer 41A. The switching layer thus corresponds to the active device layer 42A and the charge-transfer layer is the passive device layer 41A. The second interconnect layer 43B provides electrical communication between the first die $U_1$ and the charge-transfer capacitors $C_{1A}$, $C_{2A}$. A heatsink 76 opposite the device face contacts thermally-conductive bumps 46. Unlike the electrically-conductive bumps 45, which conduct both heat and electricity, the thermally-conductive bumps 46 are dedicated to heat transfer only.

Figure 131:
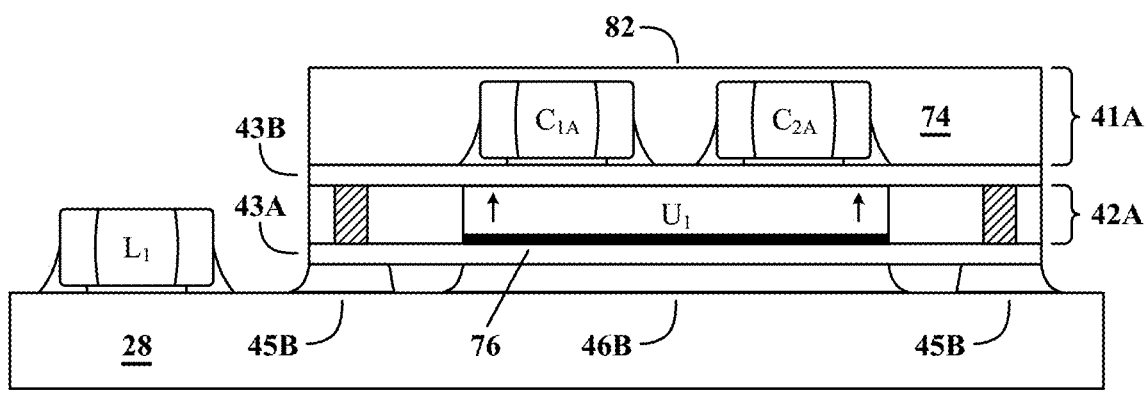

FIG. 131 shows the substrate 28 supporting an inductor L1 and a package 82. The package 82 has a passive device layer 41A, which serves as the charge-transfer layer, and an active device layer 42A, which serves as a switching layer. A first interconnect layer 43A rests on an electrically-conductive pad 45B. This first interconnect layer 43A provides electrical communication between the package 82 and external components, including the inductor $L_1$. Charge-transfer capacitors $C_{1A}$, $C_{2A}$ are disposed in the passive device layer 41A. These charge-transfer capacitors $C_{1A}$, $C_{2A}$ are discrete elements that, in some embodiments, are surrounded by a matrix 74 to mechanically support them. The first die $U_1$ is in the active device layer 42A with its device face facing a second interconnect layer 43B at the passive device layer 41A. This second interconnect layer 43B provides electrical communication between the first die $U_1$ and the charge-transfer capacitors $C_{1A}$, $C_{2A}$. A heatsink 76 opposite the device face contacts a thermally-conductive pad 46B. Unlike the electrically-conductive pad 45B, which conducts both heat and electricity, the thermally-conductive pad 46B is dedicated to heat transfer only.

Figure 132:
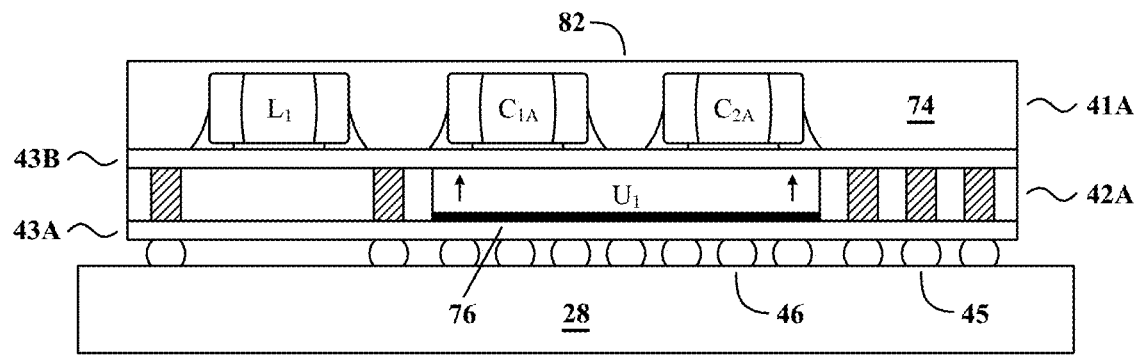

FIG. 132 shows the substrate 28 supporting a package 82 having a passive device layer 41A and an active device layer 42A. The pass device layer 41A serves as the charge-transfer layer, and the active device layer 42A serves as a switching layer. A first interconnect layer 43A resting on electrically-conductive bumps 45 provides electrical communication between the package 82 and external components. An inductor $L_1$ and charge-transfer capacitors $C_{1A}$, $C_{2A}$ are disposed in the passive device layer 41A. These are discrete elements that, in some embodiments, are surrounded by a matrix 74 to mechanically support them. The first die $U_1$ is in the active device layer 42A with its device face facing a second interconnect layer 43B at the passive device layer 41A. This second interconnect layer 43B provides electrical communication between the first die $U_1$, the charge-transfer capacitors $C_{1A}$, $C_{2A}$, and the inductor $L_1$. A heatsink 76 opposite the device face contacts thermally-conductive bumps 46. Unlike the electrically-conductive bumps 45, which conduct both heat and electricity, the thermally-conductive bumps 46 are dedicated to heat transfer only.

Figure 133:
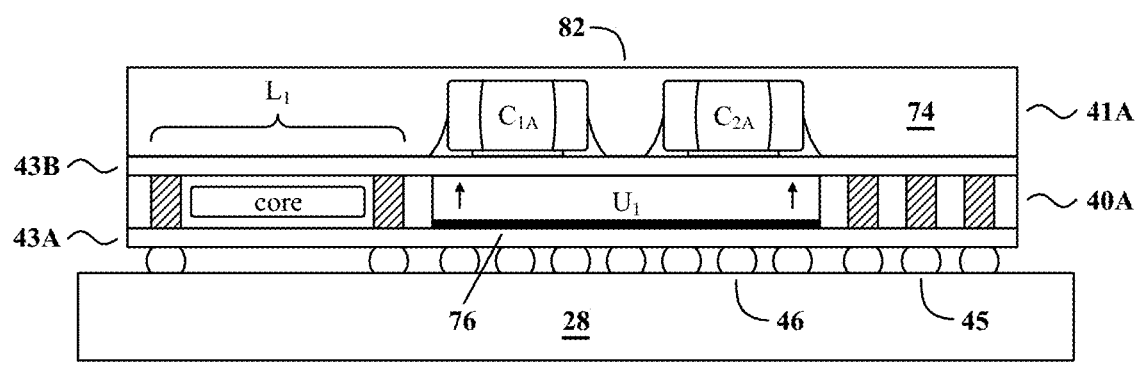

FIG. 133 shows the substrate 28 supporting a package 82 having a passive device layer 41A and a mixed device layer 40A. The passive device layer 41A serves as the charge-transfer layer, and the mixed device layer 40A serves as a switching layer. A first interconnect layer 43A resting on electrically-conductive bumps 45 provides electrical communication between the package 82 and external components. Charge-transfer capacitors $C_{1A}$, $C_{2A}$ are disposed in the passive device layer 41A. These are discrete elements that, in some embodiments, are surrounded by a matrix 74 to mechanically support them. An inductor $L_1$ and the first die $U_1$ are side-by-side in the mixed device layer 40A. The inductor $L_1$ is formed by metallic traces wound around a core in the mixed device layer 40A. The first die $U_1$ has its device face facing a second interconnect layer 43B at the passive device layer 41A. This second interconnect layer 43B provides electrical communication between the first die $U_1$, the charge-transfer capacitors $C_{1A}$, $C_{2A}$, and the inductor $L_1$. A heatsink 76 opposite the device face contacts thermally-conductive bumps 46. Unlike the electrically-conductive bumps 45, which conduct both heat and electricity, the thermally-conductive bumps 46 are dedicated to heat transfer only.

Another advantage of using different dies to build a switching network 12A is that come components are not good neighbors on the same die.

Since all components on a die share a common substrate, all components are inherently coupled. This means that activity at one end of the die may significantly affect activity at the other end of the die.

The stack switches handle considerable amounts of power. As a result, the stack switches do not always make good neighbors on the same die. In particular, when the stack switches and phase switches are on the same die, the phase switch operation can be adversely affected by stack switch operation.

In some embodiments, the stack controller 51 is integrated into the stack-die. This reduces overall pin count and also avoids the need to fabricate a separate die. However, the very high currents associated with the operation of the stack switches may interfere with operation of the stack controller 51, both because of EMI and because of electrical coupling. Thus, in some embodiments, the stack controller 51 is on a separate die.

Among other advantages, the arrangements described above avoid the component and pin count penalty, reduce the energy loss in the parasitic interconnect structures, and reduces the total footprint of power converters that use capacitors to transfer energy.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. An apparatus for power conversion, the apparatus comprising:
    a transformation stage for transforming a first voltage into a second voltage;
    wherein the transformation stage comprises a switching network having a plurality of switches, each of which transitions between first and second states, the plurality of switches being independently controlled so as to cause the switching network to assume at least first and second switching arrangements;
    a filter and a controller; and a first die and a second die, wherein the plurality of switches comprise phase switches and stack switches, wherein the phase switches are on the first die and the stack switches are on the second die;

wherein the filter is configured to connect the transformation stage to a load, wherein as a result of the filter, during an interval in which the switching network is in one of the first or the second switching arrangements, current to the load is a rectified current, and wherein the controller controls the switching network by causing the switching network to assume the first and second switching arrangements.

2. The apparatus of claim 1, wherein the filter comprises an LC filter.

3. The apparatus of claim 2, wherein the filter is configured to connect the transformation stage to more than one regulator.

4. The apparatus of claim 1, wherein the filter comprises an inductance that, in operation at a particular switching frequency, sustains a peak-to-peak voltage ripple and supports an inductor current that passes into the load, the inductor current defining an average inductor current.

5. The apparatus of claim 4, wherein the inductance is proportional to a value selected by dividing the peak-to-peak voltage ripple by a product of the average inductor current and the particular switching frequency.

6. The apparatus of claim 5, wherein a constant of proportionality by which the value is multiplied to obtain the inductance is 13/24.

7. The apparatus of claim 1, wherein the load comprises a regulator.

8. The apparatus of claim 1, further comprising plural regulating circuits, wherein the filter connects the transformation stage to all of the regulating circuits regulators.

9. The apparatus of claim 1, wherein the transformation stage comprises plural switching networks, and wherein the filter is configured to connect all of the switching networks to a regulating circuit.

10. The apparatus of claim 1, wherein the transformation stage comprises a plurality of units in series, each unit comprising a switching network in series with a filter.

11. The apparatus of claim 1, wherein the filter comprises an inductance that constrains a rate at which an amount of charge stored in a capacitor in the transformation stage changes in response to the plurality of switches having assumed the second switching arrangement.

12. The apparatus of claim 1, wherein there exists at least one capacitor in the transformation stage such that when an amount of charge stored in the at least one capacitor changes, a corresponding amount of current passes through an inductance of the filter.

13. The apparatus of claim 1, wherein the phase switches are on the first die and the controller is on the second die.

14. The apparatus of claim 1, wherein the filter comprises energy-storage means.

15. The apparatus of claim 1, wherein the transformation stage is a constituent of a resonant converter.

16. The apparatus of claim 1, wherein the filter comprises a capacitor across the load and an inductive circuit between the capacitor and the plurality of switches.

17. The apparatus of claim 1, wherein the rectified current is a rectified sinusoid.

18. The apparatus of claim 1, wherein the rectified current rises to a maximum within a first portion of the interval and falls from the maximum during a second portion of the interval.

19. A method for operating a power converter, the method comprising:

providing a first voltage to a transformation stage;

causing the transformation stage to charge some capacitors and to discharge other capacitors to transform the first voltage into a second voltage; and filtering current that passes from the transformation stage to a load, thereby causing the current to be a rectified sinusoid, the power converter having a first die and a second die, wherein the power converter comprises phase switches and stack switches, wherein the phase switches are on the first die and the stack switches are on the second die.

20. The method of claim 19, wherein the filtering is configured to connect the transformation stage to more than one regulator.

21. A power converter for transforming a first voltage into a second voltage, the power converter comprising:

a transformation stage comprising switches, each of which transitions between first and second states, the switches being independently controlled so as to assume first and second switching arrangements;

a controller that causes the switches to assume the first and second switching arrangements, and a filter configured to connect the transformation stage to a load such that a current to the load is a rectified current that is periodic; and a first die and a second die, wherein the switches comprise phase switches and stack switches, wherein the phase switches are on the first die and the stack switches are on the second die.

* * * * *